(12) United States Patent
Suzaki et al.

(10) Patent No.: US 7,551,366 B2
(45) Date of Patent: Jun. 23, 2009

(54) ZOOM LENS AND IMAGE CAPTURE APPARATUS

(75) Inventors: Mitsuhiro Suzaki, Tokyo (JP); Yusuke Nanjo, Kanagawa (JP); Shinichi Arita, Tokyo (JP); Koji Toyoda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/000,605

(22) Filed: Dec. 14, 2007

(65) Prior Publication Data

US 2008/0151384 A1 Jun. 26, 2008

(30) Foreign Application Priority Data

Dec. 21, 2006 (JP) ............................. 2006-344505

(51) Int. Cl.
*G02B 15/14* (2006.01)

(52) U.S. Cl. ....................................... 359/687; 359/683

(58) Field of Classification Search ................. 359/683, 359/687, 684
See application file for complete search history.

(56) References Cited

U.S. PATENT DOCUMENTS

| | | | |
|---|---|---|---|
| 5,414,562 A | | 5/1995 | Ueda et al. |
| 5,537,255 A | * | 7/1996 | Tochigi ........................ 359/684 |
| 5,933,283 A | | 8/1999 | Hamano et al. |
| 5,969,879 A | | 10/1999 | Park et al. |
| 6,342,973 B1 | | 1/2002 | Kikuchi et al. |

FOREIGN PATENT DOCUMENTS

| | | |
|---|---|---|
| JP | 04-358108 | 12/1992 |
| JP | 2000-330018 | 11/2000 |
| JP | 2001-033700 | 2/2001 |
| JP | 2003-005071 | 1/2003 |

OTHER PUBLICATIONS

European Search Report with Written Opinion dated Apr. 9, 2008 for corresponding European Application No. 07 25 4799.
European Patent Office Communication pursuant to Article 94(3) EPC issued Jan. 21, 2009 for corresponding European Application No. 07 254 799.5.
Japanese Office Action issued Oct. 9, 2008 for corresponding Japanese Application No. 2006-344505.

* cited by examiner

*Primary Examiner*—Scott J Sugarman
(74) *Attorney, Agent, or Firm*—Rader Fishman & Grauer PLLC; Ronald P. Kananen

(57) ABSTRACT

A zoom lens includes, in order from an object side, a first lens group having a positive refractive power and fixed in an optical axis direction, a second lens group having a negative refractive power and moving along an optical axis to zoom, a third lens group having a positive refractive power and fixed in the optical axis direction, and a fourth lens group having a positive refractive power and moving in a non straight line along the optical axis to compensate variations of an image formation position and compensate change of the image formation position caused by changes of an object distance.

4 Claims, 39 Drawing Sheets

100···DIGITAL VIDEO CAMERA (IMAGE CAPTURE APPARATUS)
11···ZOOM LENS
12···IMAGING DEVICE

ZOOM LENS AND IMAGE CAPTURE APPARATUS

BACKGROUND OF THE INVENTION

1. Field of the Invention

The present invention relates to a zoom lens and an image capture apparatus. In particular, it relates to a zoom lens which is suitably used for electronic cameras, such as a video camera and a digital still camera, and cameras for films and includes a fewer number of lenses with a high zoom ratio approximately between 30 times and 50 times, and to an image capture apparatus using this zoom lens.

2. Description of the Related Art

In recent years, there is a need for miniaturization of a zoom lens as a home video camera, a digital still camera, etc. are miniaturized. Further, in order to cope with market competition, there is a need for a zoom lens which may be manufactured at low cost while having high resolution and high zoom ratio.

Examples of a high magnification zoom lens are those disclosed in Japanese Patent Application Publication No. JP 2001-33700, in which a zoom lens of four groups (positive-negative-positive-positive) is disclosed to attain a zoom ratio of a zoom ratio of 25 times.

SUMMARY OF THE INVENTION

As for such a zoom lens, there is a strong demand for a higher zoom ratio, while it is also required to reduce size and weight of a lens system and its costs. Further, in the various related art technologies, an issue arises in that if the zoom ratio is increased to approximately 20 times, it is also necessary to increase an amount of movement of the fourth lens group in accordance with an increasing amount of movement of the second lens group. Accordingly, since variations in aberration become large, it becomes more difficult to compensate for the aberration over the whole zooming range, and it is difficult to realize high performance and a high zoom ratio with a small number of lenses.

Further, the zoom lens as disclosed in Japanese Patent Application Publication No. JP 2001-33700 has a zoom ratio of approximately 25 times, and it may not be arranged to a higher zoom ratio.

Accordingly, it is desirable to provide a zoom lens and an image capture apparatus using the zoom lens where size of the whole lens system is reduced, and a higher zoom ratio as compared with the related art technologies is provided, while having a high optical performance in spite of a high zoom ratio.

The zoom lens in accordance with an embodiment of the present invention includes, in order from an object side, a first lens group having a positive refractive power and fixed in an optical axis direction, a second lens group having a negative refractive power and moving along the optical axis to zoom, a third lens group having a positive refractive power and fixed in the optical axis direction, and a fourth lens group having a positive refractive power and moving in a non-straight-line along the optical axis to compensate for variations of an image formation position and compensate for variations of the image formation position caused in accordance with changes of an object distance. The first lens group includes cemented lenses of a first lens of a concave meniscus lens whose convex surface faces toward the object side and a second lens of a convex lens, and a third lens of a convex meniscus lens whose convex surface faces toward the object side, in which the lenses are located in order from the object side. The second lens group includes cemented lenses of a fourth lens of a concave meniscus lens whose convex surface faces toward the object side, a fifth lens of a biconcave lens, and a sixth lens of a convex lens, in which the lenses are located in order from the object side. The third lens group includes a seventh lens of a convex lens. The fourth lens group includes at least two or more cemented lenses. The third lens group and fourth lens group include at least one surface formed of an aspheric surface. The zoom lens satisfies each of the following conditional expressions (1), (2), (3), and (4).

$$1.9 < f3/f4 < 5.1 \tag{1}$$

$$1.5 < |f2/fw| < 2.5 \tag{2}$$

$$7.5 < dz/fw < 12.5 \tag{3}$$

$$1.3 < Lz/Lf < 2.2, \tag{4}$$

where f2: combined focal distance of second lens group,
f3: combined focal distance of third lens group,
f4: combined focal distance of fourth lens group,
dz: amount of movements of second lens group due to zooming action,
fw: focal distance of whole lens system in wide angle end state,
Lz: distance between surface closest to object side and surface closest to image plane side in second lens group in whole lens system at telephoto end, and
Lf: distance between surface closest to image plane side and image plane of whole lens system in third lens group.

Further, the image capture apparatus in accordance with an embodiment of the present invention has a zoom lens and an imaging device for converting an optical image formed by the zoom lens into an electric signal. The zoom lens includes, in order from the object side, a first lens group having a positive refractive power and fixed in an optical axis direction, a second lens group having a negative refractive power and moving along an optical axis to perform a zooming action, a third lens group having a positive refractive power and fixed in the optical axis direction, and a fourth lens group having a positive refractive power and moving nonlinearly along the optical axis to compensate for variations of an image formation position and compensate for variations of the image formation position caused by changes of an object distance. The first lens group includes cemented lenses of a first lens of a concave meniscus lens whose convex surface faces toward the object side and a second lens of a convex lens, and a third lens of a convex meniscus lens whose convex surface faces toward the object side, in which the lenses are located in order from the object side. The second lens group includes cemented lenses of a fourth lens of a concave meniscus lens whose convex surface faces toward the object side, a fifth lens of a biconcave lens, and a sixth lens of a convex lens, in which the lenses are located in order from the object side. The third lens group includes a seventh lens of a convex lens. The fourth lens group includes six at least two or more cemented lenses. The third lens group and fourth lens group include at least one surface formed of an aspheric surface. The zoom lens satisfies each of the following conditional expressions (1), (2), (3), and (4).

$$1.9 < f3/f4 < 5.1 \tag{1}$$

$$1.5 < |f2/fw| < 2.5 \tag{2}$$

$$7.5 < dz/fw < 12.5 \tag{3}$$

$$1.3 < Lz/Lf < 2.2, \tag{4}$$

where
f2: combined focal distance of second lens group,
f3: combined focal distance of third lens group,
f4: combined focal distance of fourth lens group,
dz: amount of movements of second lens group due to zooming action,
fw: focal distance of whole lens system in wide angle end state,
Lz: distance between surface closest to object side and surface closest to image plane side in second lens group in whole lens system at telephoto end, and
Lf: distance between surface closest to image plane side and image plane of whole lens system in third lens group.

BRIEF DESCRIPTION OF THE DRAWINGS

FIG. 3 shows a spherical aberration, astigmatism, distortion aberration, and a coma aberration in a wide angle end state.

FIG. 4 shows a spherical aberration, astigmatism, a distortion aberration, and a coma aberration in a middle focal distance state.

FIG. 5 shows a spherical aberration, astigmatism, a distortion aberration, and a coma aberration in a telephoto end state.

FIG. 7 shows a spherical aberration, astigmatism, a distortion aberration, and a coma aberration in the wide angle end state.

FIG. 8 shows a spherical aberration, astigmatism, a distortion aberration, and a coma aberration in a middle focal distance state.

FIG. 9 shows a spherical aberration, astigmatism, a distortion aberration, and a coma aberration in a telephoto end state.

FIG. 11 shows a spherical aberration, astigmatism, a distortion aberration, and a coma aberration in the wide angle end state.

FIG. 12 shows a spherical aberration, astigmatism, a distortion aberration, and a coma aberration in a middle focal distance state.

FIG. 13 shows a spherical aberration, astigmatism, a distortion aberration, and a coma aberration in a telephoto end state.

FIG. 15 shows a spherical aberration, astigmatism, a distortion aberration, and a coma aberration in the wide angle end state.

FIG. 16 shows a spherical aberration, astigmatism, a distortion aberration, and a coma aberration in a middle focal distance state.

FIG. 17 shows a spherical aberration, astigmatism, a distortion aberration, and a coma aberration in a telephoto end state.

FIG. 19 shows a spherical aberration, astigmatism, a distortion aberration, and a coma aberration in the wide angle end state.

FIG. 20 shows a spherical aberration, astigmatism, a distortion aberration, and a coma aberration in a middle focal distance state.

FIG. 21 shows a spherical aberration, astigmatism, a distortion aberration, and a coma aberration in a telephoto end state.

FIG. 23 shows a spherical aberration, astigmatism, a distortion aberration, and a coma aberration in the wide angle end state.

FIG. 24 shows a spherical aberration, astigmatism, a distortion aberration, and a coma aberration in a middle focal distance state.

FIG. 25 shows a spherical aberration, astigmatism, a distortion aberration, and a coma aberration in a telephoto end state.

FIG. 27 shows a spherical aberration, astigmatism, a distortion aberration, and a coma aberration in the wide angle end state.

FIG. 28 shows a spherical aberration, astigmatism, a distortion aberration, and a coma aberration in a middle focal distance state.

FIG. 29 shows a spherical aberration, astigmatism, a distortion aberration, and a coma aberration in a telephoto end state.

FIG. 31 shows a spherical aberration, astigmatism, a distortion aberration, and a coma aberration in the wide angle end state.

FIG. 32 shows a spherical aberration, astigmatism, a distortion aberration, and a coma aberration in a middle focal distance state.

FIG. 33 shows a spherical aberration, astigmatism, a distortion aberration, and a coma aberration in a telephoto end state.

FIG. 35 shows a spherical aberration, astigmatism, a distortion aberration, and a coma aberration in the wide angle end state.

FIG. 36 shows a spherical aberration, astigmatism, a distortion aberration, and a coma aberration in a middle focal distance state.

FIG. 37 shows a spherical aberration, astigmatism, a distortion aberration, and a coma aberration in a telephoto end state.

DETAILED DESCRIPTION OF THE EMBODIMENT

Figure 1:
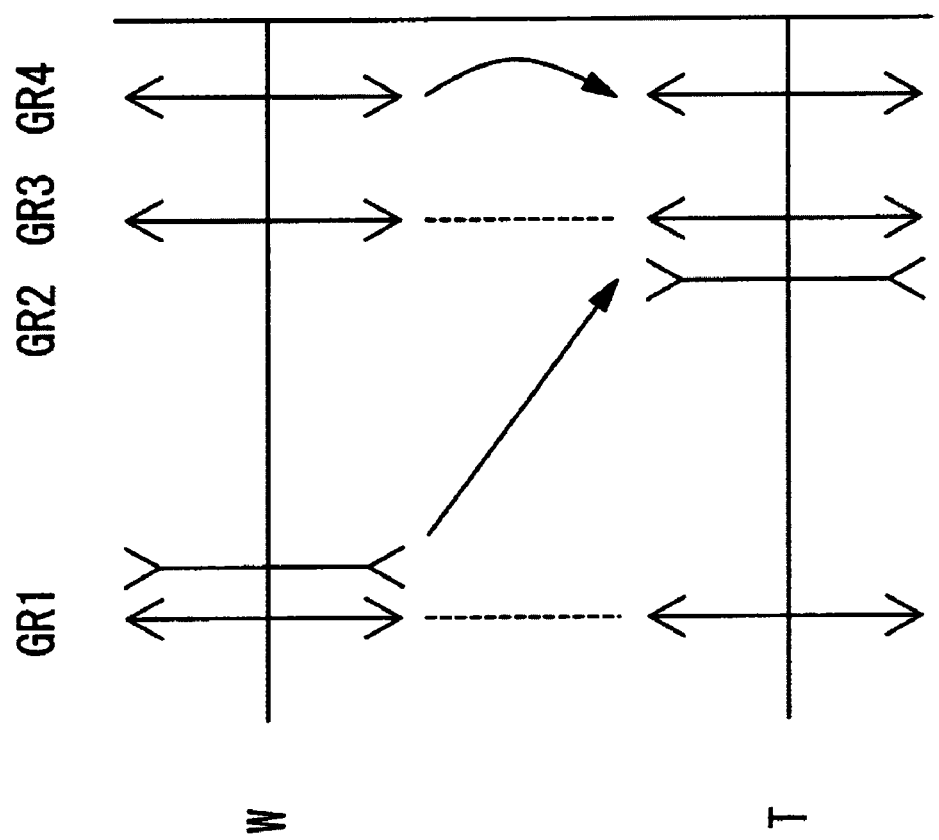
FIG. 1 is a view showing refractive power distribution of an embodiment of a zoom lens of the present invention.

Hereafter, the best mode for implementing a zoom lens and an image capture apparatus in the present invention will be described with reference to the drawings.

First, the zoom lens in an embodiment of the present invention will be described.

The zoom lens in an embodiment of the present invention includes, in order from the object side, a first lens group having a positive refractive power and fixed in an optical axis direction, a second lens group having a negative refractive power and moving along an optical axis to perform a zooming action, a third lens group having a positive refractive power and fixed in the optical axis direction, and a fourth lens group having a positive refractive power and moving nonlinearly along the optical axis to compensate for variations of an image formation position and compensate for variations of the image formation position caused by changes of an object distance. The first lens group includes lenses which are combination of a first lens of a concave meniscus lens whose convex surface faces toward the object side and a second lens of a convex lens, and a third lens of a convex meniscus lens whose convex surface faces toward the object side, in which the lenses are located in order from the object side. The second lens group includes lenses which are a combination of a fourth lens of a concave meniscus lens whose convex surface faces toward the object side, a fifth lens of a biconcave lens, and a sixth lens of a convex lens, in which the lenses are located in order from the object side. The third lens group includes a seventh lens of a convex lens. The fourth lens group includes at least two or more cemented lenses. The third lens group and fourth lens group include at least one surface formed of an aspheric surface. The zoom lens satisfies each of the following conditional expressions (1), (2), (3), and (4).

$$1.9 < f3/f4 < 5.1 \quad (1)$$

$$1.5 < |f2/fw| < 2.5 \quad (2)$$

$$7.5 < dz/fw < 12.5 \quad (3)$$

$$1.3 < Lz/Lf < 2.2, \quad (4)$$

where
f2: combined focal distance of second lens group,
f3: combined focal distance of third lens group,
f4: combined focal distance of fourth lens group,
dz: amount of movements of second lens group in accordance with zooming action,
fw: focal distance of whole lens system in wide angle end state,
Lz: distance between surface closest to object side and surface closest to image plane side in second lens group in whole lens system at telephoto end, and
Lf: distance between surface closest to image plane side and image plane of whole lens system in third lens group.

Thus, in the zoom lens of the present invention, the whole lens system is reduced in size, the high zooming of the zooming ratio of approximately 30 to 50 times is provided, and a good optical performance can be obtained over the whole zooming range from a wide angle end to a telephoto end, and over the whole object distance from an object at infinity to a very near object.

In the zoom lens of the present invention, when zooming from the wide angle end to the telephoto end, the second lens group is moved toward the image plane side, and the fourth lens group is moved toward the object side by forming a convex-like locus, such that an image plane variation in accordance with the zooming is compensated, and the fourth lens group is moved to perform focusing. Thus, the space between the third lens group and the fourth lens group may be effectively used to effectively shorten the overall lens length.

Further, it is possible to shorten the overall lens length and compensate for aberrations at the wide angle end, and a middle focal range by satisfying the conditional expressions (1) to (4).

The conditional expression (1) specifies the refractive power of the third lens group which is the positive refractive power and is constantly fixed, compensation for the focal position due to the zooming, and the refractive power of the fourth lens group which moves for focusing. If the value is less than a lower limit value of the conditional expression (1), the refractive power of the third lens group becomes too strong, or the refractive power of the fourth lens group becomes too weak. If the refractive power of the third lens group becomes too strong, the spherical aberration compensation on the wide angle side becomes insufficient and it becomes difficult to compensate for variations in the spherical aberration at the time of focusing in a zoom intermediate position. If the refractive power of the fourth lens group becomes too weak, an amount of movement at the time of focusing increases, and thus an aberration variation of an image plane curve, a coma aberration, etc. become large. Further, a back focus becomes longer than necessary range and is not suitable to downsize the overall optical length. Conversely, if the value exceeds an upper limit value of the conditional expression (1), the refractive power of the third lens group becomes weak, or the refractive power of the fourth lens group becomes too strong. If the refractive power of the third lens group is too weak, the spherical aberration on the wide angle side is over-compensated. Further, if the refractive power of the fourth lens group becomes too strong, the spherical aberration on the wide angle side is insufficiently compensated.

The conditional expression (2) specifies a relationship between the focal distance of the second lens group and the focal distance of the whole lens system at the wide angle end. If the value is less than a lower limit value of the conditional expression (2), aberration degradation due to assembly errors at the time of manufacturing the second lens group etc. appears significantly, and it is not possible to obtain a stable optical performance. On the contrary, if the value exceeds an upper limit value of the conditional expression (2), at the time of zooming an amount of movement of the second lens group increases, thus reduction of the overall length may be prevented.

The conditional expression (3) specifies a relationship between a movement distance of the second lens group for varying the power from the wide angle end to the telephoto end, and the focal distance at the wide angle end of the whole lens system. If the value is less than a lower limit value of the conditional expression (3), it is necessary to increase the refractive power of the second lens group in order to obtain a zoom ratio of 30 times or more. Accordingly, the Petzval sum is over-compensated toward the negative side, and it becomes impossible to compensate for an image plane curve of the whole system only by selecting a glass material. On the contrary, if the value exceeds an upper limit value of the conditional expression (3), the overall length of the zoom lens becomes long, and it becomes difficult to move the second lens group without causing it to be decentralized, thus being less practical.

In order to reduce useless space to realize the miniaturization while maintaining the zooming ratio to have a high magnification of approximately 30 to 50 times, the conditional expression (4) specifies the requirements for an amount of movement and compensation for the second lens group at the time of varying the power as well as an amount of movement of the fourth lens group at the time of focusing. In other words, if the value is less than a lower limit value of the conditional expression (4), the amount of movement of the second lens group must be reduced compared to the amount of movement of the fourth lens group. Thus, it is necessary to increase the refractive power of the second lens group in order to obtain a desired zooming ratio. For this reason, the Petzval sum is over-compensated toward the negative side, and it becomes impossible to compensate for the image plane curve of the whole lens system only by selecting a glass material. On the contrary, if the value exceeds an upper limit value of the conditional expression (4), the amount of movement of the second lens group increases compared to the amount of movement of the fourth lens group, the overall length of the zoom lens is long, and a front lens system becomes large, thus being impractical.

In the zoom lens in accordance with an embodiment of the present invention, it is desirable that the fourth lens group includes lenses which are combination of an eighth lens of a convex lens whose convex surface faces toward the object side, a ninth lens of a concave lens, and a tenth lens of a convex lens, which are located in order from the object side, and at least a surface closest to the object side is formed as an aspheric surface.

As a result, an exit pupil position is lengthened, so that an emergent beam from a lens system may be telecentric, whereby incidence angle of a beam to the imaging device is sagged when the imaging device is arranged behind the lens system, thus avoiding the problems, such as shading. Further, by respectively joining the front and the back of the ninth lens to the eighth lens (convex lens) and the tenth lens (convex lens), it becomes possible to freely set the curvature radius provided for the ninth lens as compared with the related art ones, and it becomes possible to improve remarkably a bend in color of the spherical aberration generated from this surface. Furthermore, by arranging the surface closest to the object side to be an aspheric surface, high order spherical aberration and coma aberration may be generated to improve an image formation performance.

It is desirable that the zoom lens in accordance with an embodiment of the present invention satisfies a conditional expression (5). In the expression, β2w is an image formation magnification of the second lens group in the wide angle end state.

$$0.18 < |\beta 2w| < 0.21 \quad (5)$$

Thus, it is possible to secure the desired zooming ratio and balance the size of the whole lens system.

The conditional expression (5) specifies a range of the magnification (image formation magnification) of the second lens group. If the value exceeds an upper limit value of the conditional expression (5) and the magnification increases at the wide angle end of the second lens group, the focal distance of the whole lens system becomes closer to the telephoto end side. Thus, it becomes difficult to obtain the desired zooming ratio. On the other hand, if the value is less than the lower limit value of the conditional expression (5), it is advantageous in increasing the magnification, but the focal distance of the whole lens system shifts toward the wide angle end side. Accordingly, a front lens diameter of the first lens group increases and the whole lens system increases in size.

It is desirable that the zoom lens in accordance with an embodiment of the present invention satisfies a conditional expression (6). In the expression, ft is the focal distance in the whole lens system in the telephoto end state.

$$0.28 < |f2/(fw-ft)^{1/2}| < 0.39 \quad (6)$$

Thus, it is possible to reduce the overall lens length while allowing good aberration compensation over the whole zooming range.

The conditional expression (6) is a conditional expression for adjusting the focal distance of the second lens group. If the value exceeds an upper limit value of the conditional expression (6) and the focal distance of the second lens group becomes too long, although it may be desirable for aberration compensation, the amount of movement of the second lens group must be increased in order to obtain a high zoom ratio, causing the whole lens system to be too long. Conversely, if the value becomes less than a lower limit value of the conditional expression (6), the Petzval sum increases in a negative direction and image plane falls, and it becomes difficult to maintain the good optical performance.

It is desirable that the zoom lens in accordance with an embodiment of the present invention satisfies a conditional expression (7). In the expression, H1' is an interval between a top of a surface closest to the image side in the first lens group and a main point on the image side in the first lens group ("−" indicates the object side and "+" indicates the image side), and f1 is a combined focal distance of the first lens group.

$$-0.11 < H1'/f1 < -0.05 \quad (7)$$

Thus, it is possible to reduce the overall lens length, while widening the angle of the focal distance in the wide angle end.

The conditional expression (7) is a conditional expression which specifies the interval between the top of the surface closest to the image side in the first lens group and the main point on the image side of the first lens group, and the length of the focal distance of the first lens group. and the equation is required to shorten a main point interval between the first lens group and the second lens group. If the value is less than a lower limit value of the conditional expression (7), the main point position of the first lens group becomes too close to the object side, and it becomes impossible to shorten the main point interval between the first lens group and the second lens group, and thus, the wide angle can not be obtained. If the value exceeds an upper limit value of the conditional expression (7), the interval between the first lens group and the second lens group is widened, the front lens diameter becomes large, and thus the whole lens system is enlarged.

It is desirable that the zoom lens in accordance with an embodiment of the present invention satisfies conditional expressions (8) and (9). In the expression, vdL1 is the Abbe number at d-line of the first lens of the first lens group, vdL2 is the Abbe number at d-line of the second lens of the first lens group, and θgFL2 is a partial dispersion ratio of the second lens in the first lens group (where a partial dispersion ratio θgF is taken as θgF=(Ng−NF)/(NF−NC) when refractive indices at C-line, F-line, and g-line are respectively NC, NF, and Ng).

$$vdL1 < 24 \quad (8)$$

$$\theta gFL2 > -0.0019 vdL2 + 0.6643 \quad (9)$$

Thus, it is possible to realize the reduced-size zoom lens in which a second order spectrum is well corrected without increasing the costs.

The conditional expression (8) is a conditional expression which specifies the Abbe number of the first lens (negative lens) in the first lens group. If the value exceeds an upper limit value of the conditional expression (8) and the Abbe number of the first lens (negative lens) of the first lens group becomes large, then dispersion becomes too small and it becomes difficult to compensate for the primary chromatic aberration generated by the second lens (positive lens) of the first lens group. In order to perform primary achromatism, without increasing the refractive power of the first lens (negative lens) of the first lens group extremely, it is desirable to use a high dispersion material within the range of the conditional expression (8).

Figure 38:
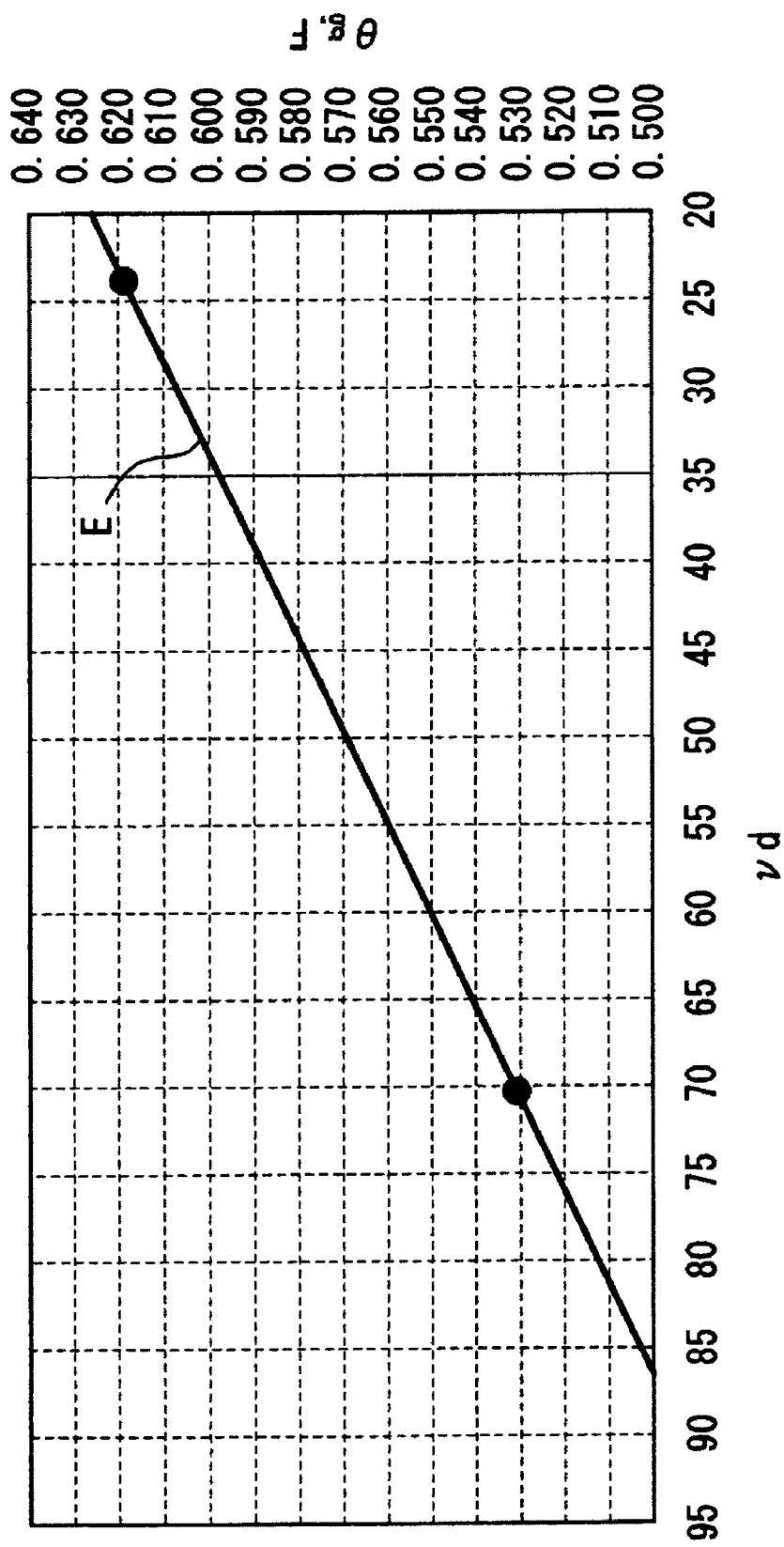
FIG. 38 is a graph showing a relation between an Abbe number and a partial dispersion ratio.

The conditional expression (9) is an equation which specifies the partial dispersion ratio of the second lens (positive lens) in the first lens group. In FIG. 38, a line segment E shows a position where θgFL2=−0.0019vdL2+0.6643, and the conditional expression (9) means that θgFL2 is located above the line segment E of FIG. 38. A material satisfying the conditional expression (9) has a certain amount of anomalous dispersion compared to materials near a base line. If such a material having a large partial dispersion ratio is used for the second lens (positive lens) in the first lens group, it is possible to attain the reduction of the secondary spectrum on the telephoto side. A material outside the range of the conditional expression (9) does not have the anomalous dispersion required to reduce the secondary spectrum. Therefore, by selecting the combination of the negative lens (the first lens) and the positive lens (the second lens) in the first lens group having an arrangement which satisfies the conditional expressions (8) and (9), the compensation ability of the secondary spectrum is raised than related art ones.

Next, particular embodiments of the zoom lens of the present invention and Numerical Examples in which particular numerical values are applied to the particular embodiments will be described with reference to the drawings and Tables.

It should be noted that the aspheric surface is introduced in each embodiment, and the aspheric surface shape shall be defined by the following equation 1.

$$x = \frac{cy^2}{1 + \sqrt{1 - (1+\kappa)c^2 y^2}} + Ay^4 + By^6 + \ldots \qquad \text{[Equation 1]}$$

where "x" is a sag, "y" is a height from the optical axis, "c" is a curvature, "κ" is a cone constant, and "A" and "B" are aspheric surface coefficients.

FIG. 1 shows refractive power distribution of the zoom lens in accordance with each embodiment of the present invention. The zoom lens includes, in order from the object side to the image side, a first lens group GR1 having a positive refractive power, a second lens group GR2 having a negative refractive power, a third lens group GR3 having a positive refractive power, and a fourth lens group GR4 having a positive refractive power. When zooming from the wide angle end state to the telephoto end state, the second lens group GR2 moves along the optical axis to the image side such that an air gap between the first lens group GR1 and the second lens group GR2 may increase and an air gap between the second lens group GR2 and the third lens group GR3 may decrease. At this time, the first lens group GR1 and the third lens group GR3 are fixed in the optical axis direction. The fourth lens group GR4 moves along the optical axis to compensate for a variation of the image plane position caused by the movement of the second lens group GR2, and moves along the optical axis toward the object side at the time of short-distance focusing.

Figure 2:
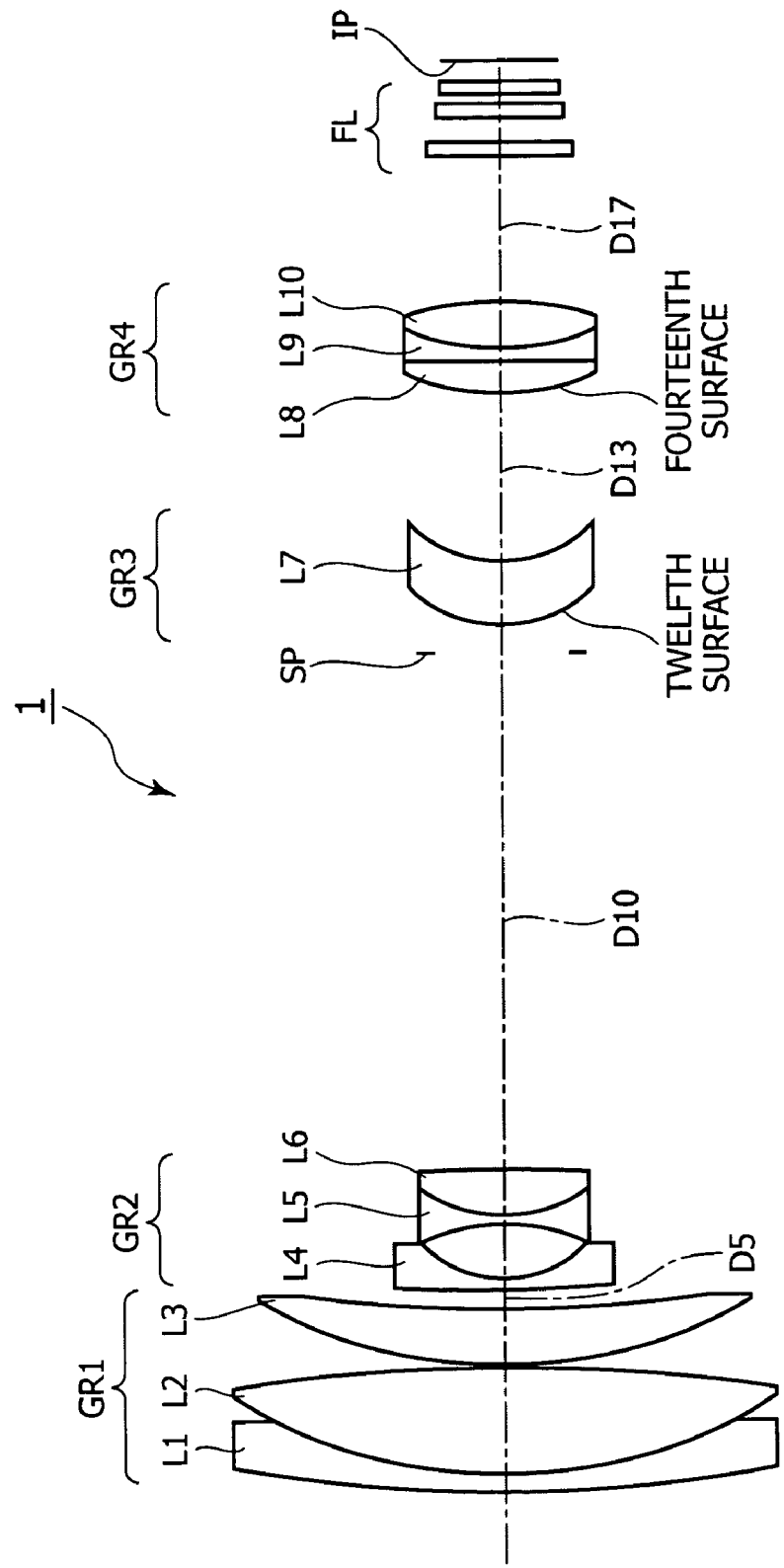
FIG. 2 shows a lens arrangement of a first embodiment of the zoom lens in the present invention.

FIG. 2 shows a lens arrangement of a zoom lens 1 in accordance with a first embodiment of the present invention. A first lens group GR1 includes lenses which are combination of a meniscus-like negative lens L1 whose convex surface faces toward the object side and a positive lens L2 whose convex surface faces toward the object side, and a positive lens L3 whose convex surface faces toward the object side, the lenses being located in order from the object side to the image side. A second lens group GR2 includes a meniscus-like negative lens L4 whose concave surface faces toward the image side and lenses which are combination of a biconcave lens L5 and a biconvex lens L6, the lenses being located in order from the object side to the image side. A third lens group GR3 includes a positive meniscus lens L7 which has an aspheric surface on the object side and whose convex surface faces toward the object side. A fourth lens group GR4 includes lenses which are combination of following three lenses; a biconvex lens L8 having an aspheric surface on the object side, a biconcave lens L9, and a biconvex lens L10, the lenses being located in order from the object side to the image side. Further, an aperture diaphragm SP is located on the object side of the third lens group GR3, and is fixed in an optical axis direction when zooming from the wide angle end state to the telephoto end state. Furthermore, a filter FL is arranged between the fourth lens group GR4 and an image plane IP.

The lens data of a First Numerical Example in which the particular values are applied to the zoom lens 1 in accordance with the first embodiment are shown in Table 1. It should be noted that, in Table 1 and other tables showing the lens data, "Surface No." indicates the i-th surface counted from the object side, "Curvature Radius" indicates the i-th curvature radius counted from the object side, "Surface Spacing" indicates an axial surface spacing between the i-th surface and the i+1-th surface counted from the object side, "Refractive Index" shows a refractive index of a glass material having the i-th surface to the object side with respect to d-line, and "Abbe No." indicates an Abbe number of the glass material having the i-th surface on the object side with respect to d-line. Further, with respect to the curvature radius, "∞" shows that the relevant surface is flat. With respect to the surface spacing, "(Di)" shows that the relevant surface spacing is adjustable.

TABLE 1

| Surface No. | Curvature Radius | Surface Separation | Refractive Index | Abbe No. |
|---|---|---|---|---|
| 1: | 29.73729 | 0.42688 | 1.84666 | 23.8 |
| 2: | 11.21838 | 2.24893 | 1.48749 | 70.4 |
| 3: | −39.49437 | 0.08538 | | |
| 4: | 10.48764 | 1.23836 | 1.83500 | 43.0 |
| 5: | 37.75876 | (D5) | | |
| 6: | 24.16569 | 0.25613 | 1.88300 | 40.8 |
| 7: | 2.29855 | 1.19465 | | |
| 8: | −3.93564 | 0.22767 | 1.72342 | 38.0 |
| 9: | 3.01556 | 0.97534 | 1.92286 | 20.9 |
| 10: | −40.61705 | (D10) | | |
| 11: | ∞ | 0.62609 | (aperture diaphragm) | |
| 12: | 2.55050 | 1.37120 | 1.52470 | 56.2 |
| 13: | 2.65948 | (D13) | | |
| 14: | 4.58999 | 0.69451 | 1.58313 | 59.4 |
| 15: | ∞ | 0.25613 | 1.92286 | 20.9 |
| 16: | 4.86763 | 1.01097 | 1.83500 | 43.0 |

TABLE 1-continued

| Surface No. | Curvature Radius | Surface Separation | Refractive Index | Abbe No. |
|---|---|---|---|---|
| 17: | −7.39313 | (D17) | | |
| 18: | ∞ | 0.34720 | 1.55232 | 63.4 |
| 19: | ∞ | 0.51226 | | |
| 20: | ∞ | 0.26751 | 1.55232 | 63.4 |
| 21: | ∞ | 0.22767 | | |
| 22: | ∞ | 0.28459 | 1.51680 | 64.2 |
| 23: | ∞ | (Bf) | | |

In the zoom lens 1, the object side (the twelfth surface) of the positive meniscus lens L7 of the third lens group GR3 and the object side surface (the fourteenth surface) of the three cemented lenses of the fourth lens group GR4 are arranged to be aspheric surfaces. Then, the fourth order, sixth order, eighth order, and tenth order aspheric surface coefficients A, B, C, and D of the respective surfaces in First Numerical Example are shown in Table 2 together with a cone constant κ. It should be noted that, in Table 2 and a table showing the following aspheric surface coefficients, "E-i" expresses an exponential notation which uses 10 as a base, i.e., "$10^{-i}$", for example, "0.12345E−05" expresses "$0.12345 \times 10^{-5}$".

TABLE 2

| 12th Surface | κ = 0.000000 | A = −0.336924E−02 |
| | B = −0.574140E−03 | C = −0.266821E−04 |
| | D = −0.693959E−05 | |
| 14th Surface | κ = 0.000000 | A = −0.406810E−02 |
| | B = 0.247737E−03 | C = −0.728966E−04 |
| | D = 0.777200E−05 | |

In the zoom lens 1, a surface spacing D5 between the first lens group GR1 and the second lens group GR2, a surface spacing D10 between the second lens group GR2 and the third lens group GR3 (aperture diaphragm SP), a surface spacing D13 between the third lens group GR3 and the fourth lens group GR4, and a surface spacing D17 between the fourth lens group GR4 and Filter FL change when zooming from the wide angle end state to the telephoto end state. Then, respective values in the wide angle end state (f=1.000), a middle focal distance state (f=6.234), and the telephoto end state (f=38.867) of the respective surface spacing in First Numerical Example are shown in Table 3 together with the focal distances f, the F numbers FNO, and the angles of field 2ω.

TABLE 3

(Table of Variable Separations)

| f | 1.000 | 6.234 | 38.867 |
|---|---|---|---|
| FNO | 1.870 | 2.187 | 4.132 |
| 2ω | 69.157 | 12.235 | 2.422 |
| D5 | 0.387 | 7.893 | 11.313 |
| D10 | 11.381 | 3.875 | 0.455 |
| D13 | 3.676 | 1.967 | 5.275 |
| D17 | 3.139 | 4.847 | 1.539 |
| Bf | 0.455 | 0.455 | 0.455 |

Values of the First Numerical Example corresponding to the conditional expressions (1) to (9) and a partial dispersion ratio θgFL1 of the first lens L1 of the first lens group GR1 are shown in Table 4.

TABLE 4

| (1) | f3/f4 = 4.603 |
| (2) | |f2/fw| = 2.141 |

TABLE 4-continued

| (3) | dz/fw = 10.926 |
| (4) | Lz/Lf = 1.653 |
| (5) | |β2w| = 0.195 |
| (6) | |f2/(fw · ft) 1/2| = 0.343 |
| (7) | H1'/f1 = −0.062 |
| (8) | νdL1 = 23.78 |
| (9) | θgFL2 = 0.5305, νdL2 = 70.44 |
| (10) | θgFL1 = 0.6191 |

Figure 3:
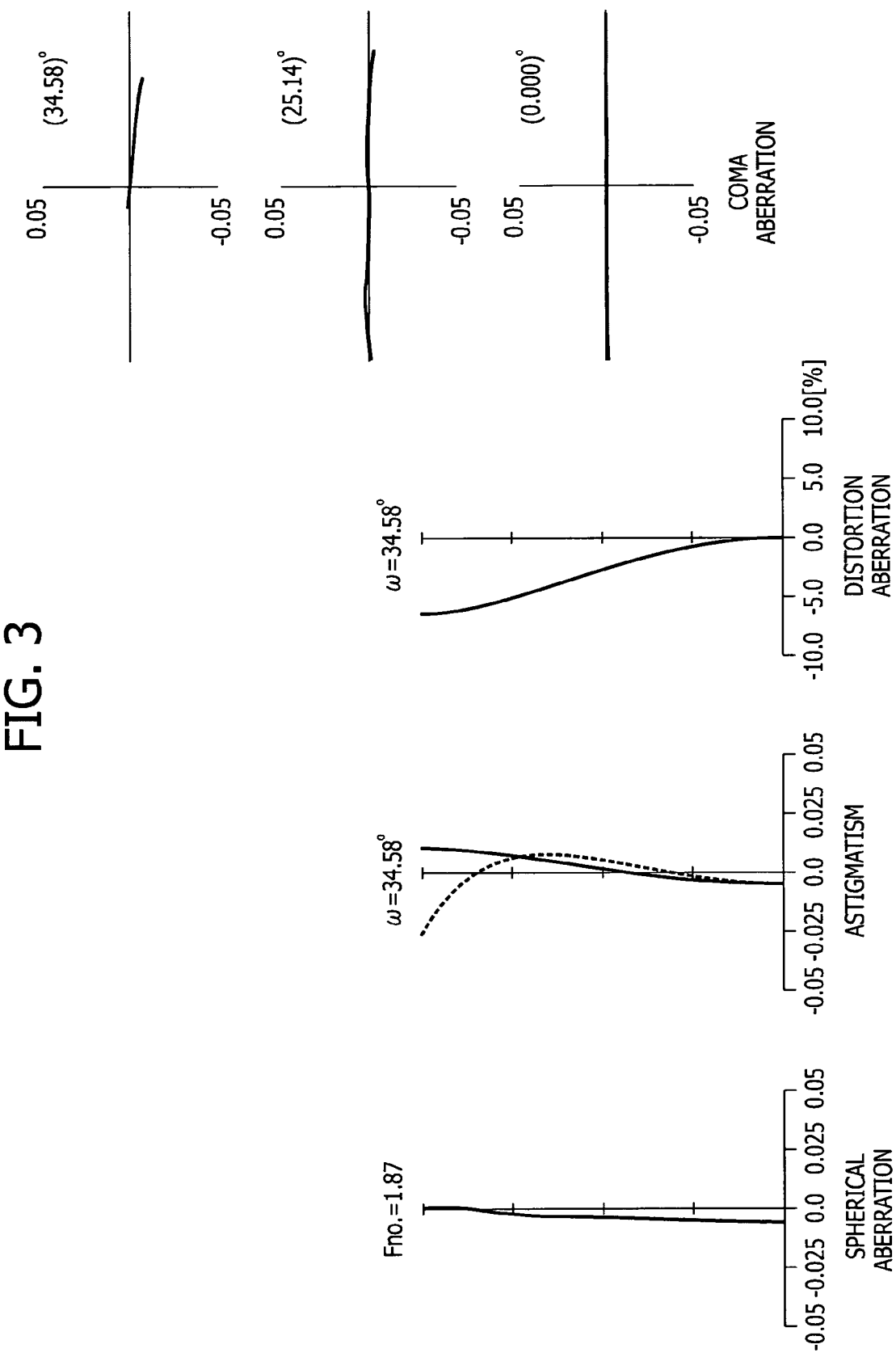
FIGS. 3 to 5 show aberration graphs of a First Numerical Example in which particular values are applied to the first embodiment.
Figure 4:
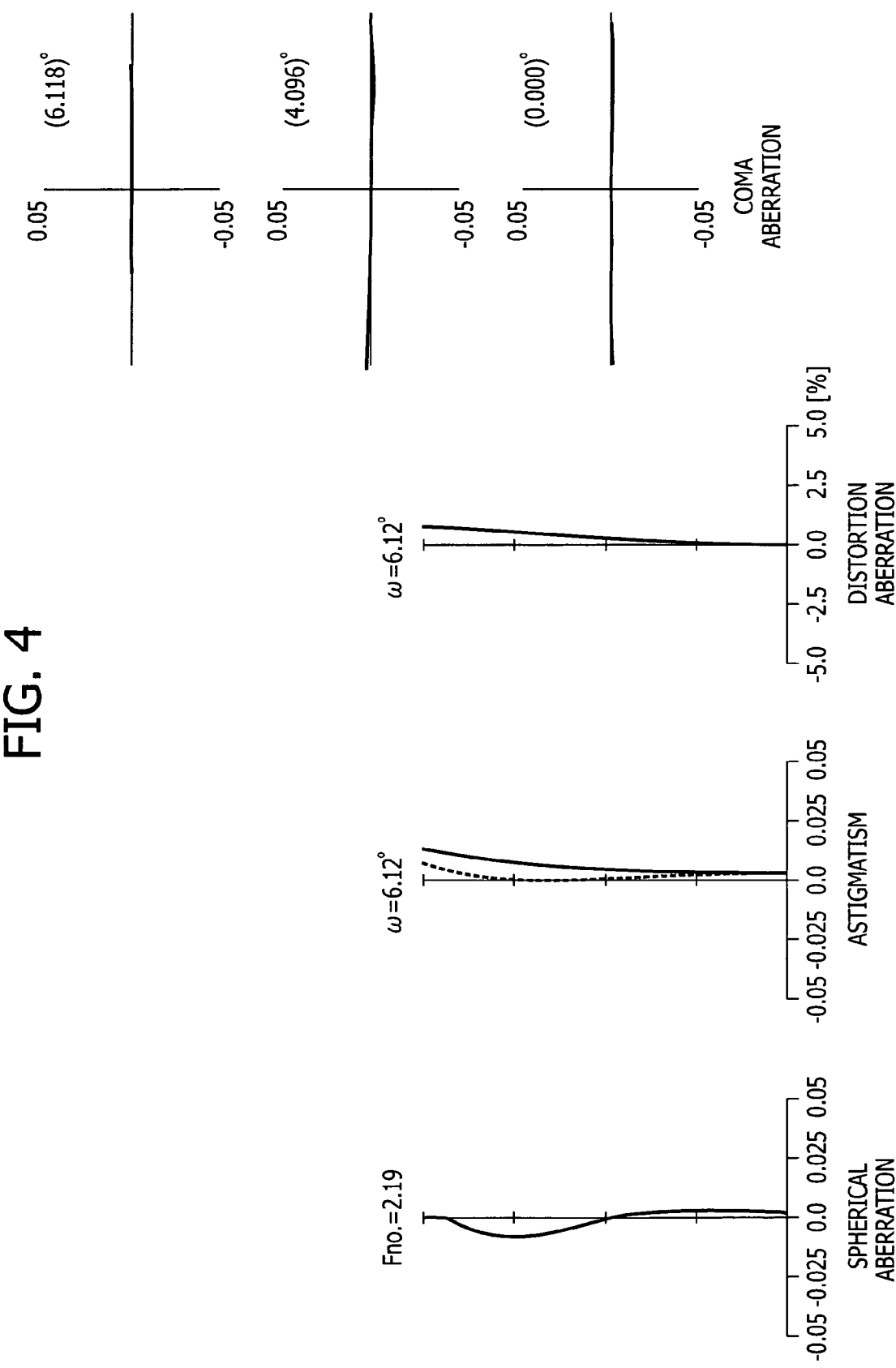
Figure 5:
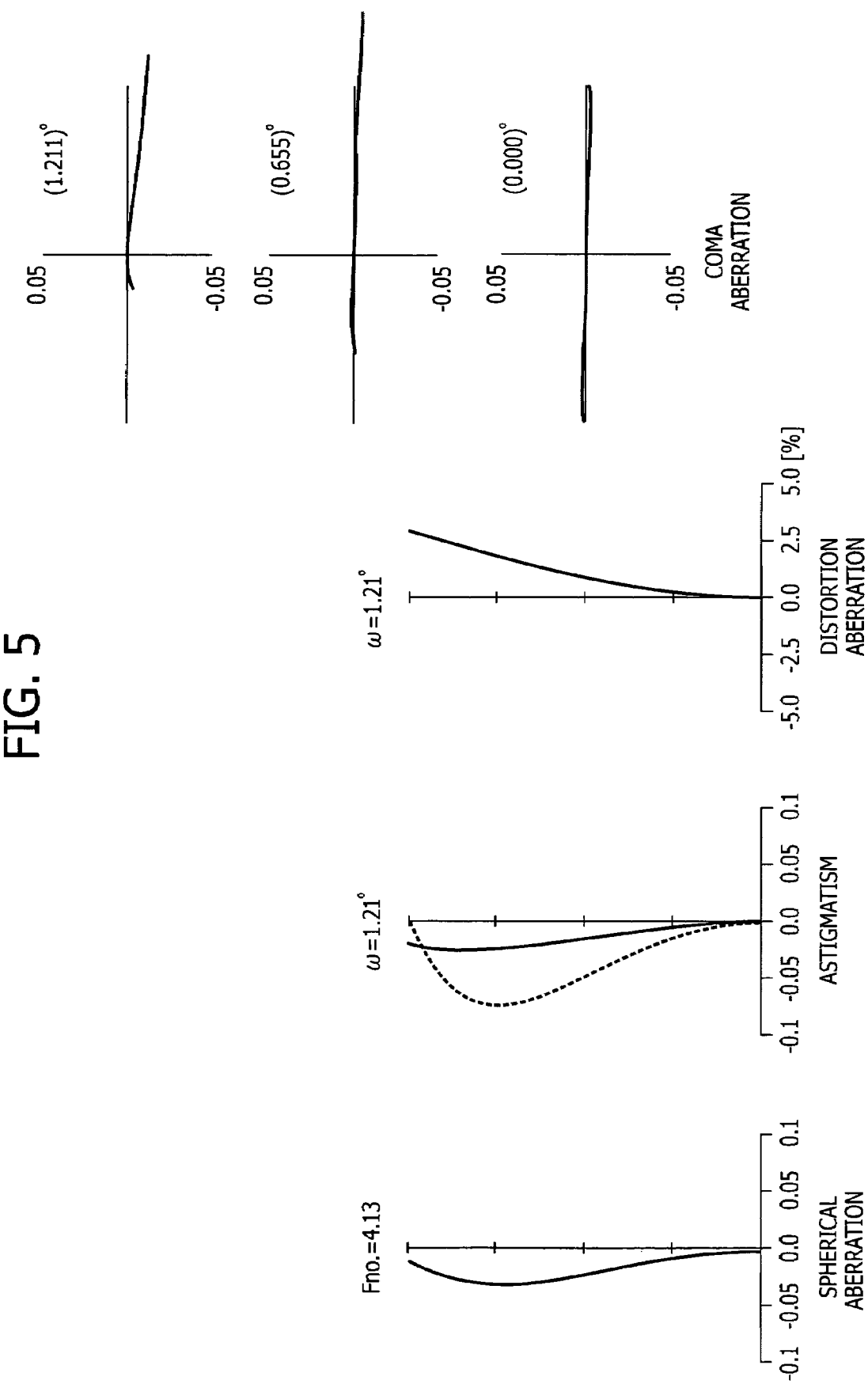

FIGS. 3 to 5 show respective aberration graphs in the infinity focusing state of the First Numerical Example, in which FIG. 3 to 5 show the respective aberration graphs, in which FIG. 3 shows the wide angle end state (f=1.000), FIG. 4 shows the middle focal distance state (f=6.234), and FIG. 5 shows the telephoto end state (f=38.867).

In the respective aberration graphs of FIGS. 3 to 5, solid lines in the spherical aberration graphs show spherical aberrations, solid lines in the astigmatic graphs show sagittal image planes and broken lines show meridional image planes. In the coma aberration graphs, "A" shows the angle of field and "y" shows an image height, respectively.

It is clear from the respective aberration graphs that the First Numerical Example allows the respective aberrations to be compensated well and has an excellent image forming performance.

Figure 6:
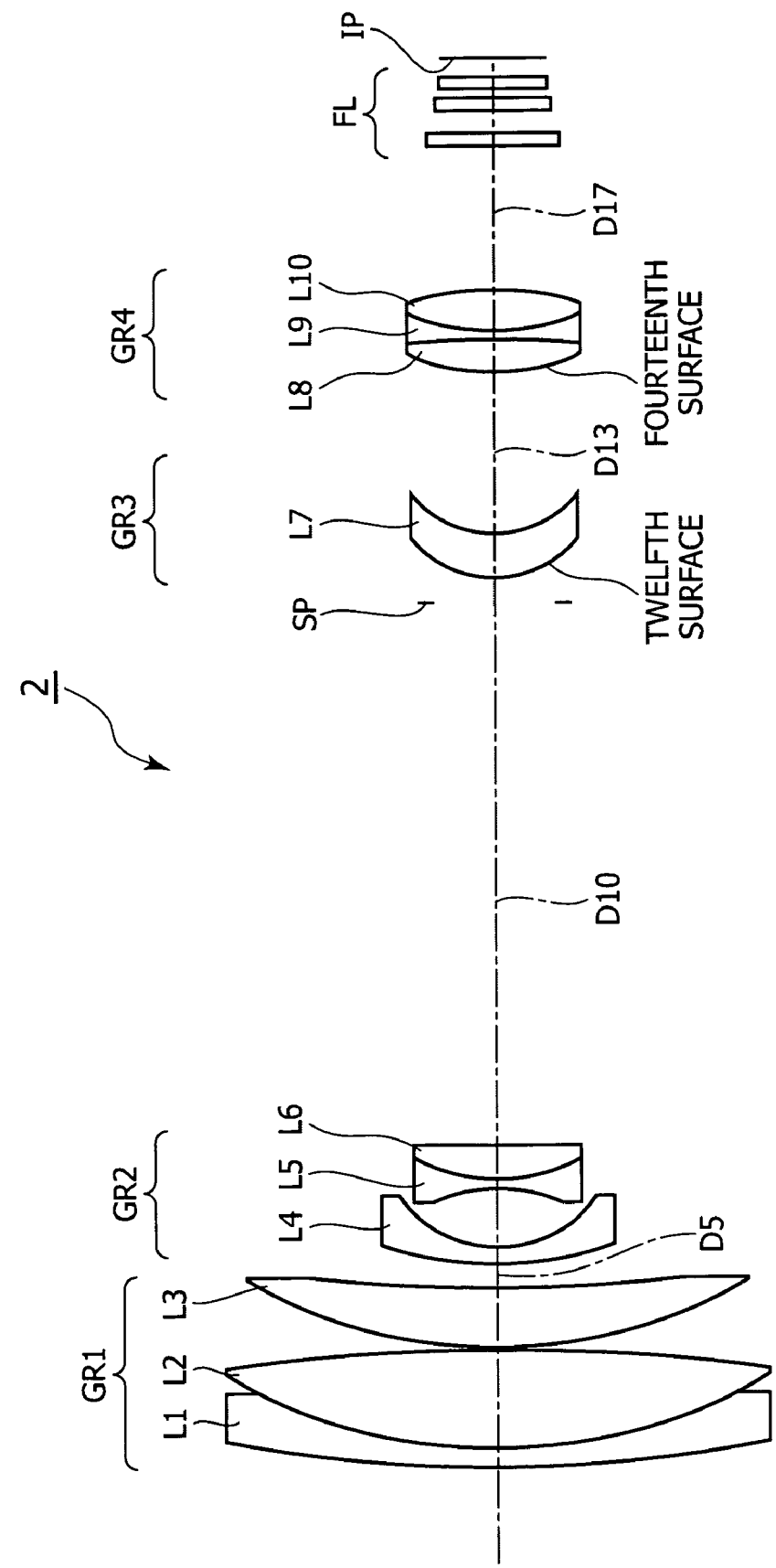
FIG. 6 is a view showing a lens arrangement in a second embodiment of the zoom lens according to the present invention.

FIG. 6 shows a lens arrangement of a zoom lens 2 in accordance with a second embodiment of the present invention.

A first lens group GR1 includes lenses which are combination of a meniscus-like negative lens L1 whose convex surface faces toward the object side and a positive lens L2 whose convex surface faces toward the object side, and a positive lens L3 whose convex surface faces toward the object side, the lenses being located in order from the object side to the image side. A second lens group GR2 includes a meniscus-like negative lens L4 whose concave surface faces toward the image side and lenses which are combination of a biconcave lens L5 and a biconvex lens L6, the lenses being located in order from the object side to the image side. A third lens group GR3 includes a positive meniscus lens L7 which has an aspheric surface on the object side and whose convex surface faces toward the object side. A fourth lens group GR4 includes lenses which are a combination of the following three lenses; a biconvex lens L8 having an aspheric surface on the object side surface, a biconcave lens L9, and a biconvex lens L10, the lenses being located in order from the object side to the image side. Further, an aperture diaphragm SP is located on the object side of the third lens group GR3, and is fixed in an optical axis direction when zooming from the wide angle end state to the telephoto end state. Furthermore, a filter FL is arranged between the fourth lens group GR4 and an image plane IP.

The lens data of the Second Numerical Example in which particular values are applied to the zoom lens 2 in accordance with the second embodiment are shown in Table 5.

TABLE 5

| Surface No. | Curvature Radius | Surface Spacing | Refractive Index | Abbe No. |
|---|---|---|---|---|
| 1: | 30.17084 | 0.41133 | 1.84666 | 23.8 |
| 2: | 11.67801 | 2.03064 | 1.48749 | 70.4 |
| 3: | −48.93443 | 0.10283 | | |
| 4: | 11.19589 | 1.26983 | 1.83500 | 43.0 |
| 5: | 42.05779 | (D5) | | |

TABLE 5-continued

| Surface No. | Curvature Radius | Surface Spacing | Refractive Index | Abbe No. |
|---|---|---|---|---|
| 6: | 7.86079 | 0.35991 | 1.88300 | 40.8 |
| 7: | 2.60430 | 1.27456 | | |
| 8: | −3.40060 | 0.20567 | 1.77250 | 49.6 |
| 9: | 3.62270 | 0.72482 | 1.92286 | 20.9 |
| 10: | ∞ | (D10) | | |
| 11: | ∞ | 0.56558 | | |
| 12: | 2.23980 | 0.92796 | 1.52470 | 56.2 |
| 13: | 2.35166 | (D13) | | |
| 14: | 4.46440 | 0.63407 | 1.58313 | 59.4 |
| 15: | −60.59831 | 0.23137 | 1.92286 | 20.9 |
| 16: | 5.26940 | 0.83156 | 1.83500 | 43.0 |
| 17: | −6.86481 | (D17) | | |
| 18: | ∞ | 0.31364 | 1.55232 | 63.4 |
| 19: | ∞ | 0.46275 | | |
| 20: | ∞ | 0.24166 | 1.55232 | 63.4 |
| 21: | ∞ | 0.20567 | | |
| 22: | ∞ | 0.25708 | 1.51680 | 64.2 |
| 23: | ∞ | (Bf) | | |

In the zoom lens 2, the object side (the twelfth surface) of the positive meniscus lens L7 in the third lens group GR3 and the object side surface (the fourteenth surface) of the three cemented lenses of the fourth lens group GR4 are formed of aspheric surfaces. Then, the fourth order, sixth order, eighth order, and tenth order aspheric surface coefficients A, B, C, and D of the respective surfaces in the Second Numerical Example are shown in Table 6 together with a cone constant κ.

TABLE 6

| 12th surface | κ = 0.000000 | A = −0.456922E−02 |
| | B = −0.906579E−03 | C = −0.234226E−04 |
| | D = −0.397804E−04 | |
| 14th surface | κ = 0.000000 | A = −0.461520E−02 |
| | B = 0.278274E−03 | C = −0.996600E−04 |
| | D = 0.122155E−04 | |

In the zoom lens 2, a surface spacing D5 between the first lens group GR1 and the second lens group GR2, a surface spacing D10 between the second lens group GR2 and the third lens group GR3 (aperture diaphragm SP), a surface spacing D13 between the third lens group GR3 and the fourth lens group GR4, and a surface spacing D17 between the fourth lens group GR4 and Filter FL change when zooming from the wide angle end state to the telephoto end state. Then, respective values in the wide angle end state (f=1.000), the middle focal distance state (f=6.304), and the telephoto end state (f=39.746) of the respective surface spacing in the Second Numerical Example are shown in Table 7 together with the focal distances f, the F numbers FNO, and the angles of field 2ω.

TABLE 7

(Table of Variable Separations)

| f | 1.000 | 6.304 | 39.746 |
|---|---|---|---|
| FNO | 1.870 | 2.288 | 4.157 |
| 2ω | 64.120 | 11.043 | 2.173 |
| D5 | 0.514 | 8.260 | 11.890 |
| D10 | 11.839 | 4.093 | 0.463 |
| D13 | 3.542 | 1.994 | 5.228 |
| D17 | 3.122 | 4.671 | 1.436 |
| Bf | 0.411 | 0.411 | 0.411 |

Values of the Second Numerical Example corresponding to the conditional expressions (1)-(9) and a partial dispersion ratio θgFL1 of the first lens L1 of the first lens group GR1 are shown in Table 8.

TABLE 8

| (1) | f3/f4 = 5.024 |
| (2) | |f2/fw| = 2.217 |
| (3) | dz/fw = 11.376 |
| (4) | Lz/Lf = 1.782 |
| (5) | |β2w| = 0.195 |
| (6) | |f2/(fw · ft) 1/2| = 0.352 |
| (7) | H1'/f1 = −0.060 |
| (8) | νdL1 = 23.78 |
| (9) | θgFL2 = 0.5305, νdL2 = 70.44 |
| (10) | θgFL1 = 0.6191 |

Figure 7:
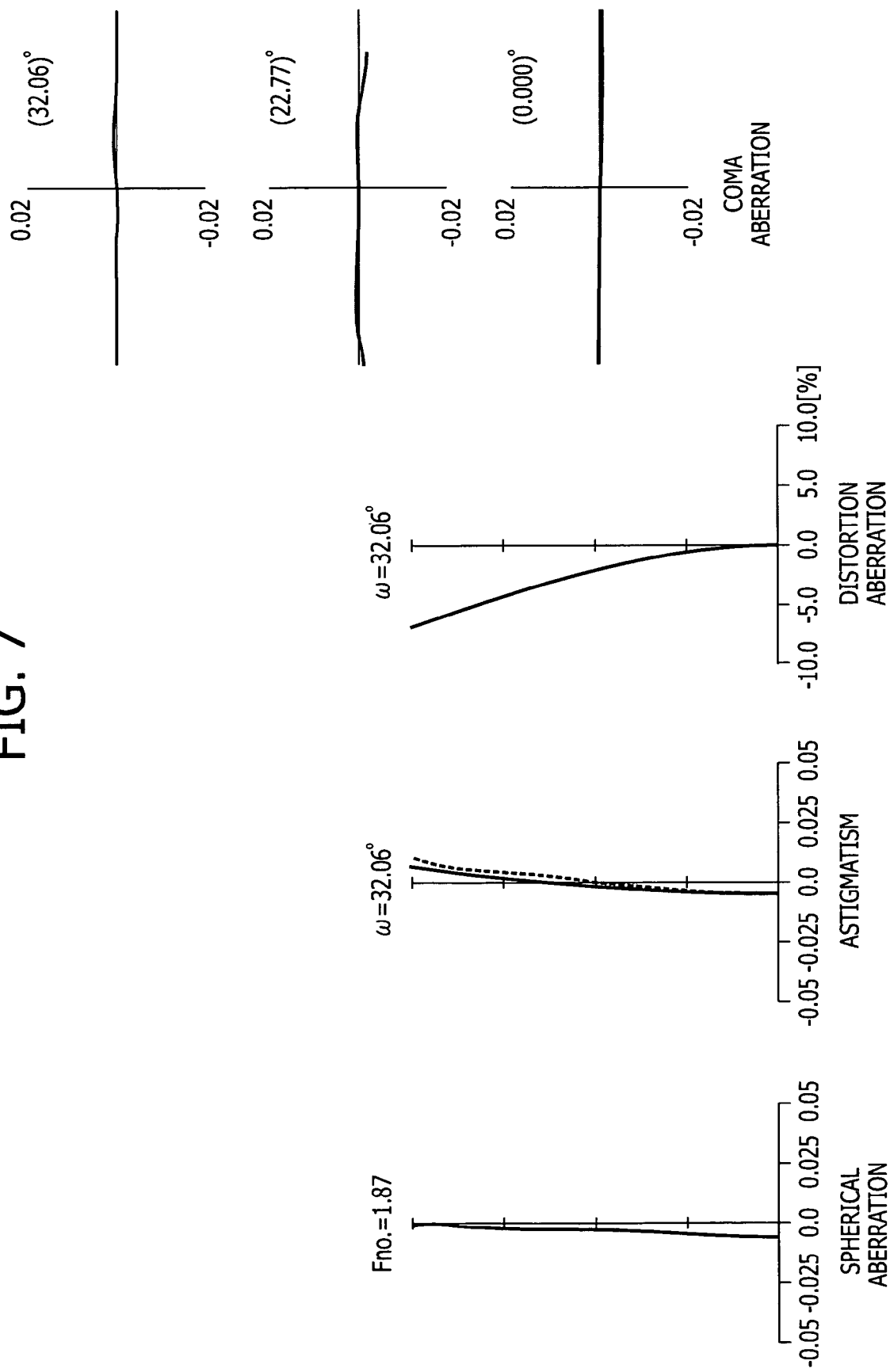
FIGS. 7 to 9 show aberration graphs of a Second Numerical Example in which particular values are applied to the second embodiment.
Figure 8:
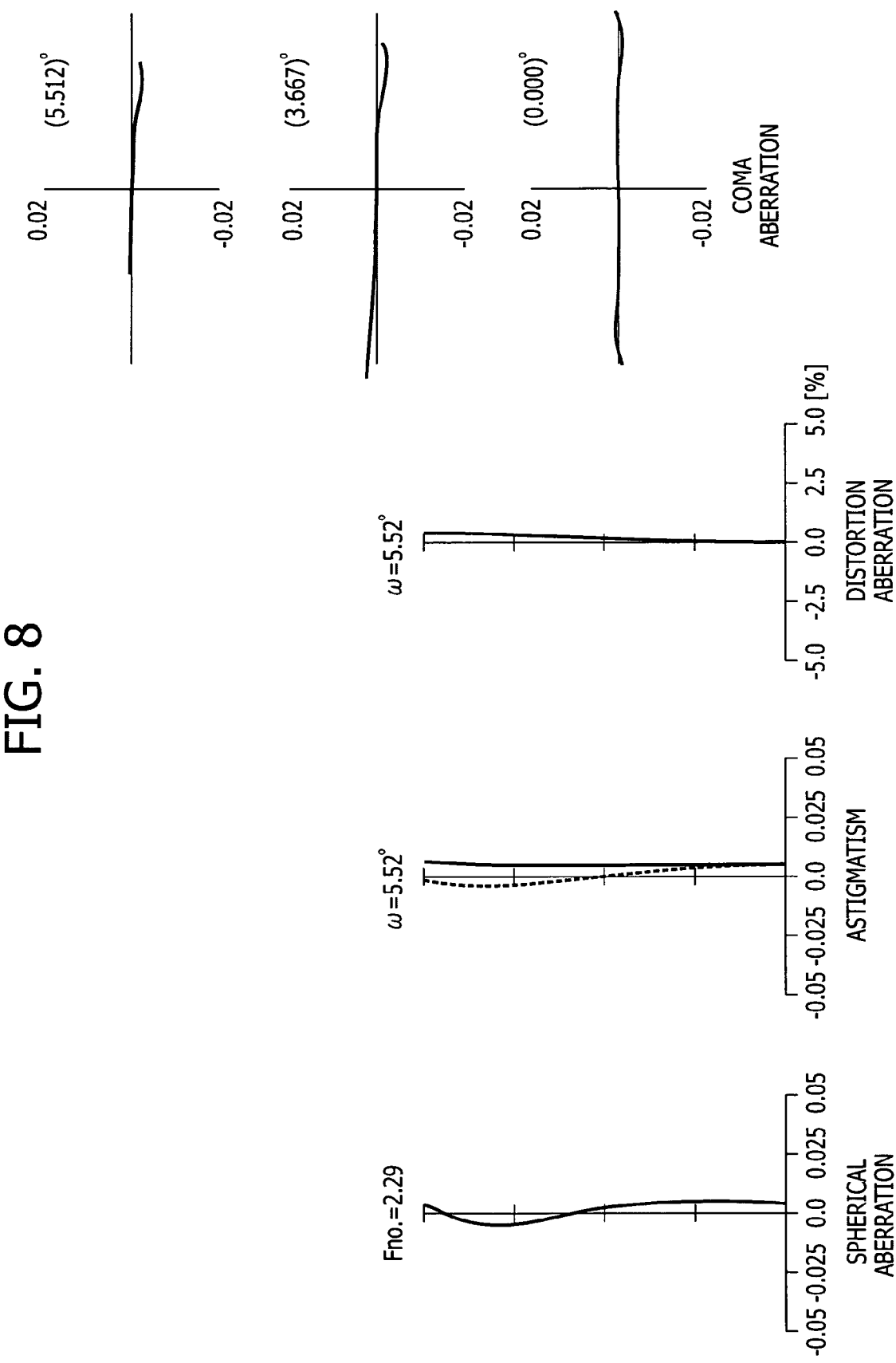
Figure 9:
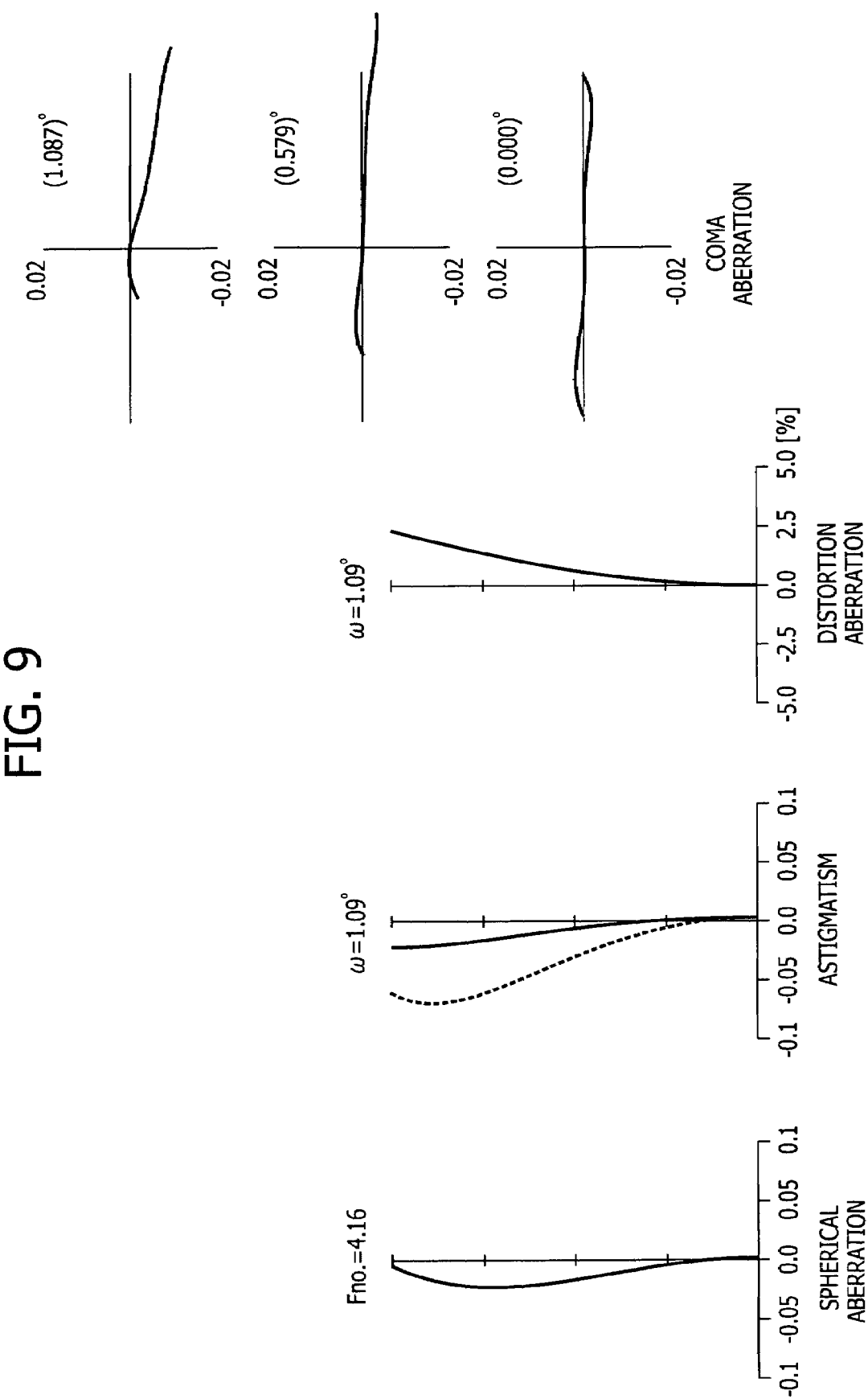

FIGS. 7 to 9 show respective aberration graphs in the infinity focusing state of the Second Numerical Example, in which FIG. 7 shows the respective aberration graphs in the wide angle end state (f=1.000), FIG. 8 shows the middle focal distance state (f=6.304), and FIG. 9 shows the telephoto end state (f=39.746).

In the respective aberration graphs of FIGS. 7 to 9, solid lines in the spherical aberration graphs show spherical aberrations, solid lines in the astigmatic graphs show sagittal image planes and broken lines show meridional image planes. In the coma aberration graphs, "A" shows the angle of field and "y" shows an image height, respectively.

It is clear from the respective aberration graphs that the Second Numerical Example allows the respective aberrations to be compensated well and has an excellent image forming performance.

Figure 10:
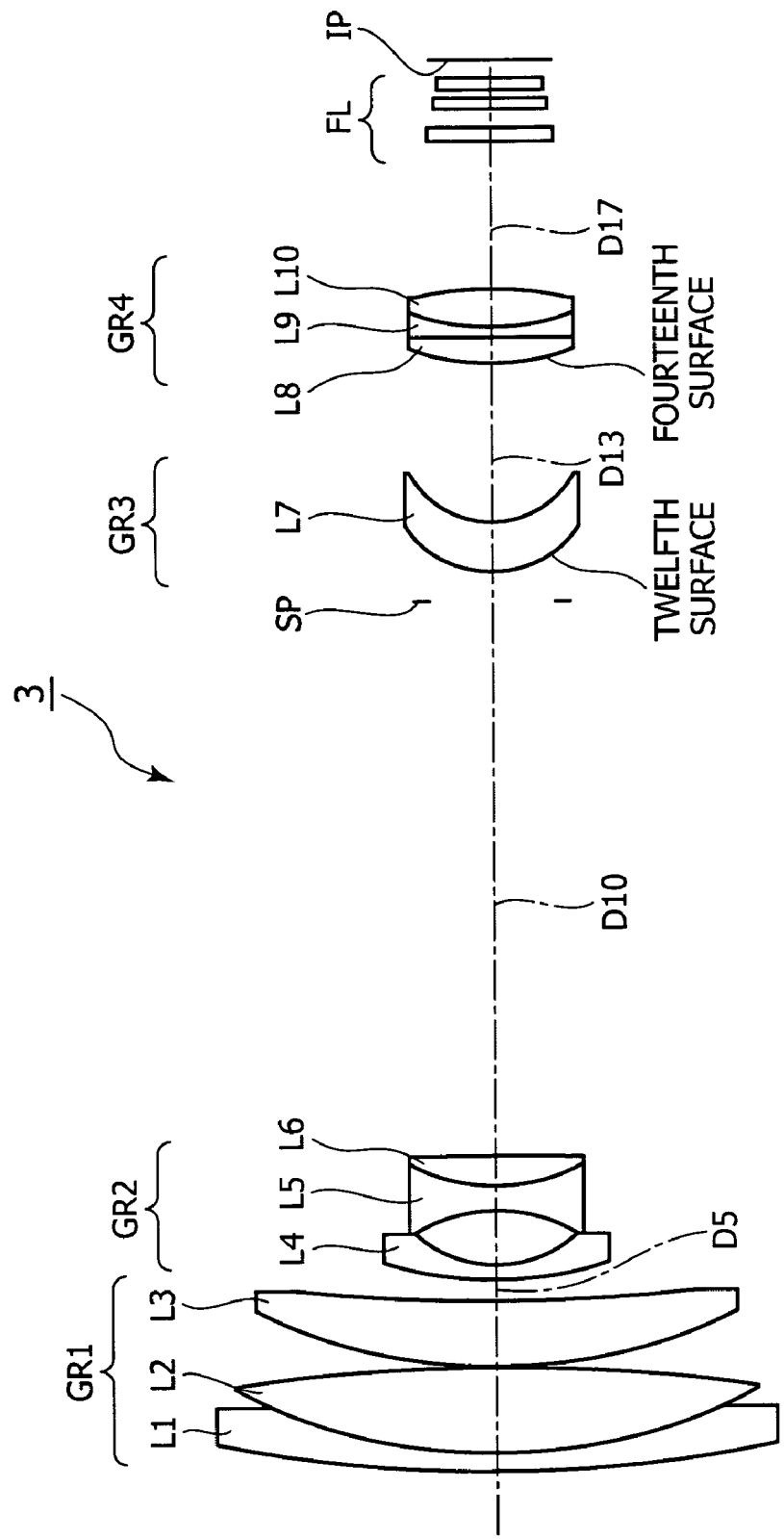
FIG. 10 is a view showing a lens arrangement in a third embodiment of the zoom lens in the present invention.

FIG. 10 shows a lens arrangement of a zoom lens 3 in accordance with a third embodiment of the present invention. A first lens group GR1 includes lenses which are combination of a meniscus-like negative lens L1 whose convex surface faces toward the object side and a positive lens L2 whose convex surface faces toward the object side, and a positive lens L3 whose convex surface faces toward the object side, the lenses being located in order from the object side to the image side. A second lens group GR2 includes a meniscus-like negative lens L4 whose concave surface faces toward the image side, and lenses which are combination of a biconcave lens L5 and a biconvex lens L6, the lenses being located in order from the object side to the image side. A third lens group GR3 includes a positive meniscus lens L7 which has an aspheric surface on the object side surface and whose convex surface faces toward the object side. A fourth lens group GR4 includes lenses which are combination of the following three lens; a biconvex lens L8 having an aspheric surface on the object side surface, a biconcave lens L9, and a biconvex lens L10, the lenses being located in order from the object side to the image side. Further, an aperture diaphragm SP is located on the object side of the third lens group GR3, and is fixed in an optical axis direction when zooming from the wide angle end state to the telephoto end state. Furthermore, a filter FL is arranged between the fourth lens group GR4 and an image plane IP.

The lens data of a Third Numerical Example in which particular values are applied to the zoom lens 3 in accordance with the third embodiment are shown in Table 9.

TABLE 9

| Surface No. | Curvature Radius | Surface Separation | Refractive Index | Abbe No. |
|---|---|---|---|---|
| 1: | 30.36970 | 0.36698 | 1.84666 | 23.8 |
| 2: | 11.84462 | 1.73538 | 1.48749 | 70.4 |
| 3: | −46.45841 | 0.09175 | | |
| 4: | 11.06341 | 1.37619 | 1.83500 | 43.0 |
| 5: | 38.18792 | (D5) | | |
| 6: | 7.97679 | 0.31295 | 1.88300 | 40.8 |
| 7: | 2.60457 | 1.15201 | | |
| 8: | −3.47856 | 0.54997 | 1.77250 | 49.6 |
| 9: | 3.90124 | 0.62773 | 1.92286 | 20.9 |
| 10: | −1606.17265 | (D10) | | |
| 11: | ∞ | 0.61557 | | |
| 12: | 2.01549 | 1.02935 | 1.52470 | 56.2 |
| 13: | 2.01078 | (D13) | | |
| 14: | 4.02203 | 0.56300 | 1.58313 | 59.4 |
| 15: | −1142.24063 | 0.20643 | 1.92286 | 20.9 |
| 16: | 4.54638 | 0.81911 | 1.83500 | 43.0 |
| 17: | −7.43017 | (D17) | | |
| 18: | ∞ | 0.27983 | 1.55232 | 63.4 |
| 19: | ∞ | 0.41286 | | |
| 20: | ∞ | 0.21560 | 1.55232 | 63.4 |
| 21: | ∞ | 0.18349 | | |
| 22: | ∞ | 0.22937 | 1.51680 | 64.2 |
| 23: | ∞ | (Bf) | | |

In the zoom lens 3, the object side (the twelfth surface) of the positive meniscus lens L7 of the third lens group GR3 and the object side surface (the fourteenth surface) of the three cemented lenses of the fourth lens group GR4 are arranged to be aspheric surfaces. Then, the fourth order, sixth order, eighth order, and tenth order aspheric surface coefficients A, B, C, and D of the respective surfaces in the Third Numerical Example are shown in Table 10 together with a cone constant $\kappa$.

TABLE 10

| 12th surface | $\kappa$ = 0.000000 | A = −0.605118E−02 |
|---|---|---|
| | B = −0.143080E−02 | C = 0.146891E−03 |
| | D = −0.168185E−03 | |
| 14th surface | $\kappa$ = 0.000000 | A = −0.471950E−02 |
| | B = 0.507080E−03 | C = −0.348972E−03 |
| | D = 0.726258E−04 | |

In the zoom lens 3, a surface spacing D5 between the first lens group GR1 and the second lens group GR2, a surface spacing D10 between the second lens group GR2 and the third lens group GR3 (aperture diaphragm SP), a surface spacing D13 between the third lens group GR3 and the fourth lens group GR4, and a surface spacing D17 between the fourth lens group GR4 and the filter FL change when zooming from the wide angle end state to the telephoto end state. Then, respective values in the wide angle end state (f=1.000), in the middle focal distance state (f=6.369), and in the telephoto end state (f=40.566) of the respective surface spacing in the Third Numerical Example are shown in Table 11 together with the focal distances f, the F numbers FNO, and the angles of field 2ω.

TABLE 11

(Table of Variable Separations)

| f | 1.000 | 6.369 | 40.566 |
|---|---|---|---|
| FNO | 1.870 | 2.431 | 4.555 |
| 2ω | 61.702 | 10.462 | 2.003 |
| D5 | 0.459 | 8.299 | 11.905 |
| D10 | 11.860 | 4.019 | 0.413 |

TABLE 11-continued (Table of Variable Separations)

| D13 | 3.387 | 1.892 | 5.183 |
|---|---|---|---|
| D17 | 3.076 | 4.571 | 1.280 |
| Bf | 0.367 | 0.367 | 0.367 |

Values of Third Numerical Example corresponding to the conditional expressions (1)-(9) and a partial dispersion ratio θgFL1 of the first lens L1 in the first lens group GR1 are shown in Table 12.

TABLE 12

| (1) | f3/f4 = 4.940 |
|---|---|
| (2) | |f2/fw| = 2.258 |
| (3) | dz/fw = 11.447 |
| (4) | Lz/Lf = 1.860 |
| (5) | |β2w| = 0.197 |
| (6) | |f2/(fw · ft) 1/2| = 0.355 |
| (7) | H1'/f1 = −0.066 |
| (8) | νdL1 = 23.78 |
| (9) | θgFL2 = 0.5305, νdL2 = 70.44 |
| (10) | θgFL1 = 0.6191 |

Figure 11:
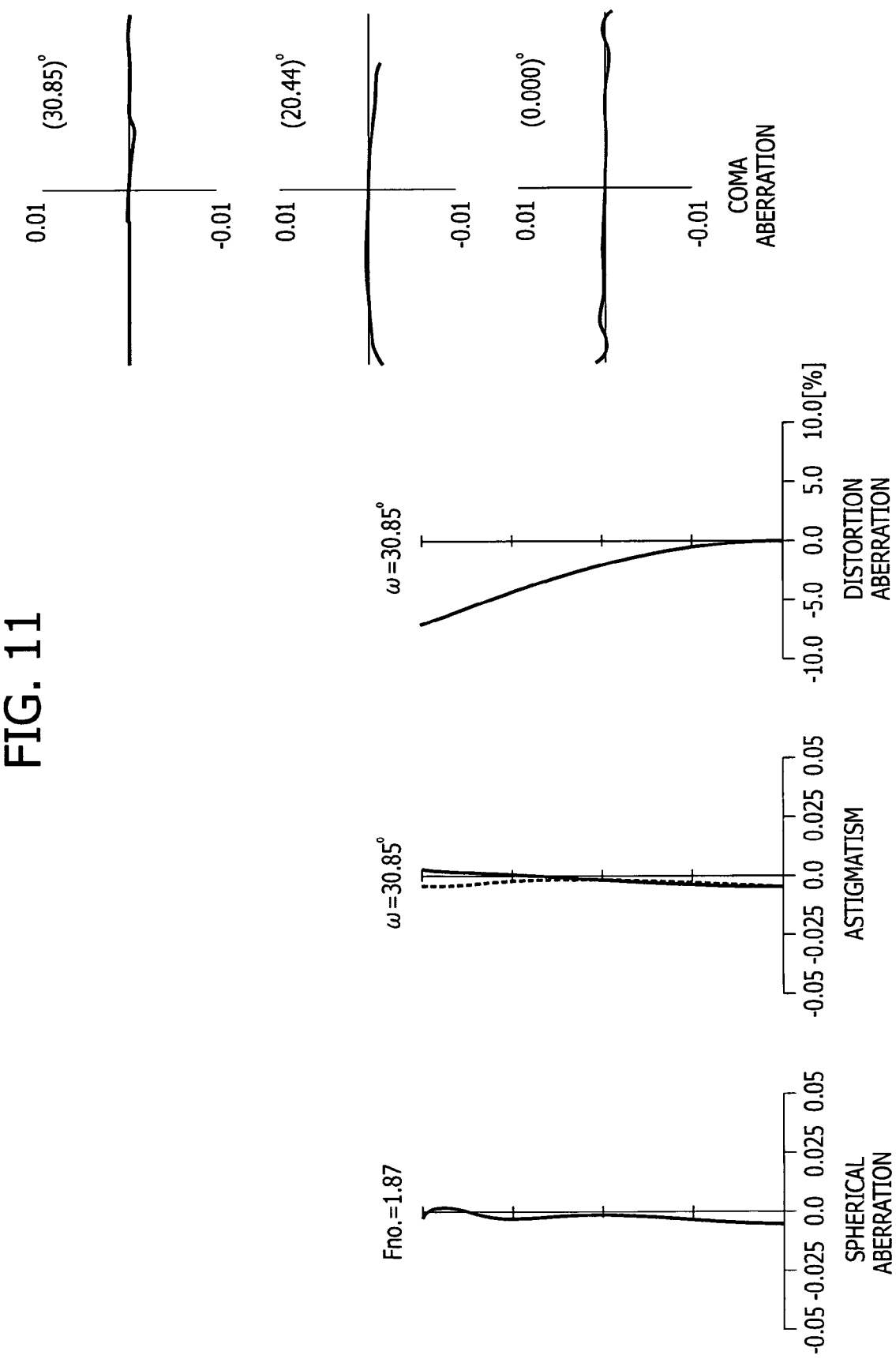
FIGS. 11 to 13 show aberration graphs of a Third Numerical Example in which particular values are applied to the third embodiment.
Figure 12:
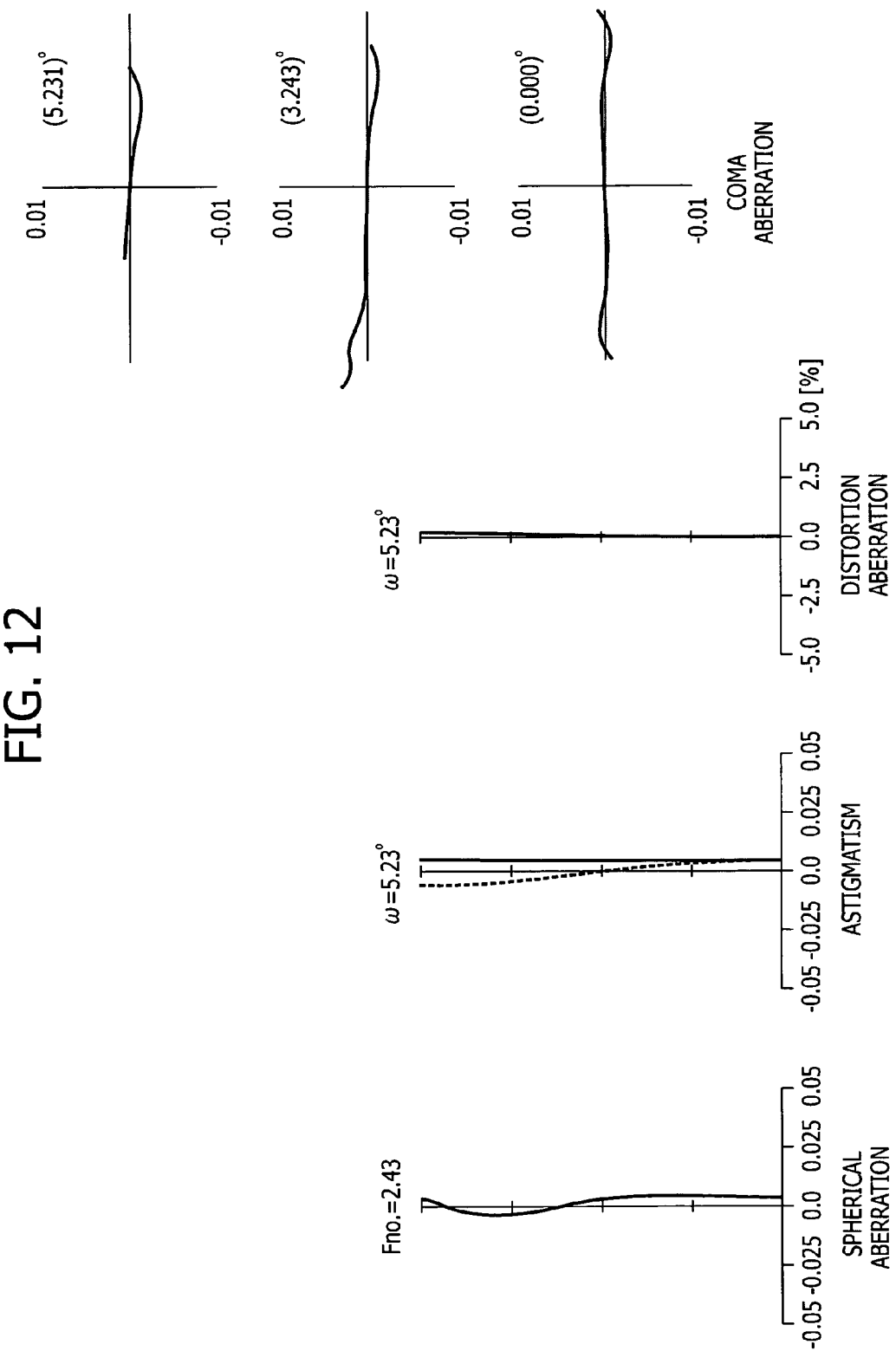
Figure 13:
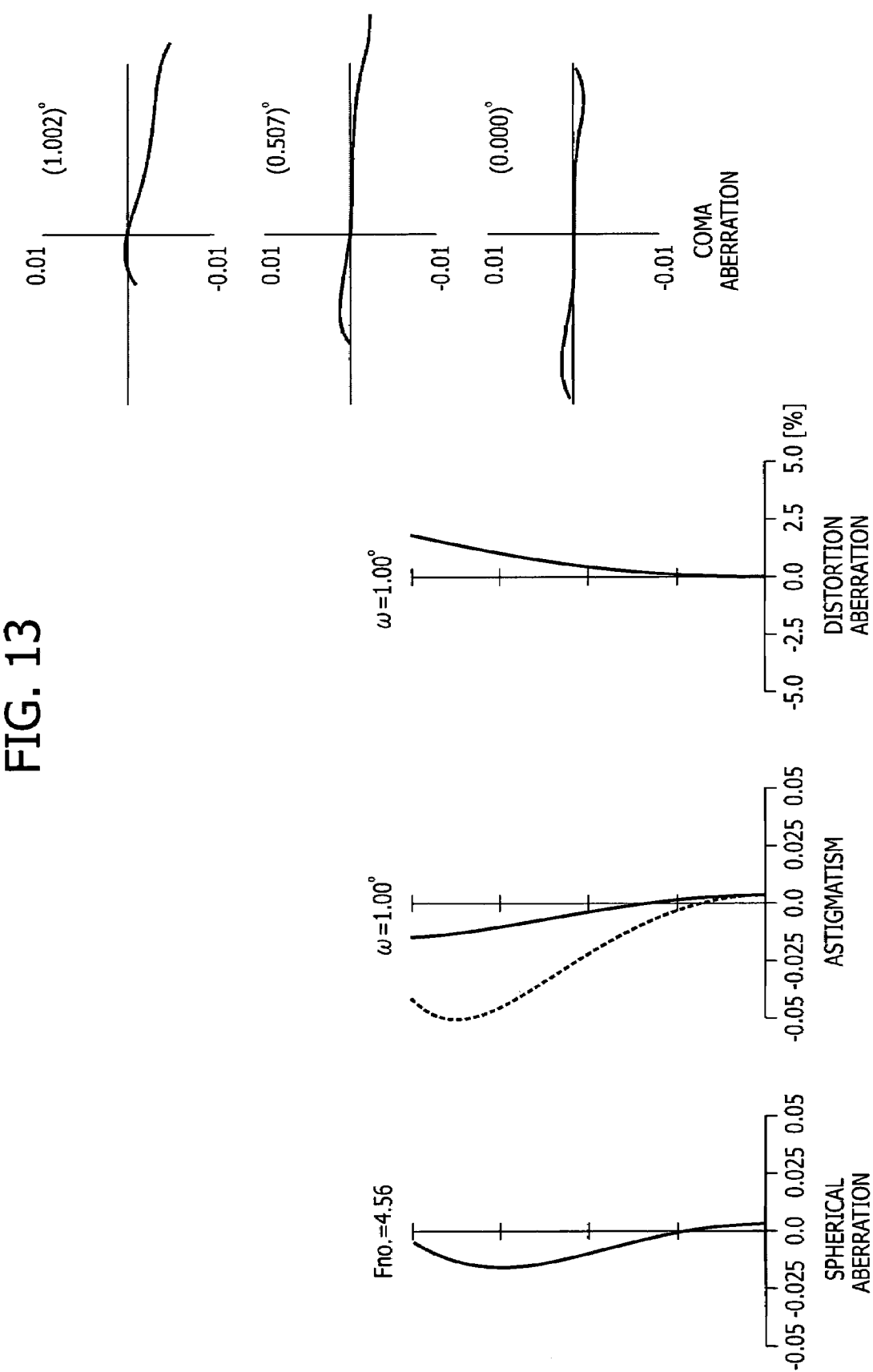

FIGS. 11 to 13 show respective aberration graphs in the infinity focusing state of the Third Numerical Example, in which FIG. 11 shows the respective aberration graphs in the wide angle end state (f=1.000), FIG. 12 shows the middle focal distance state (f=6.369), and FIG. 13 shows the telephoto end state (f=40.566).

In the respective aberration graphs of FIGS. 11 to 13, solid lines in the spherical aberration graphs show spherical aberrations, solid lines in the astigmatic graphs show sagittal image planes and broken lines show meridional image planes. In the coma aberration graphs, "A" shows the angle of field and "y" shows an image height, respectively.

It is clear from the respective aberration graphs that the Third Numerical Example allows the respective aberrations to be compensated well and has an excellent image forming performance.

Figure 14:
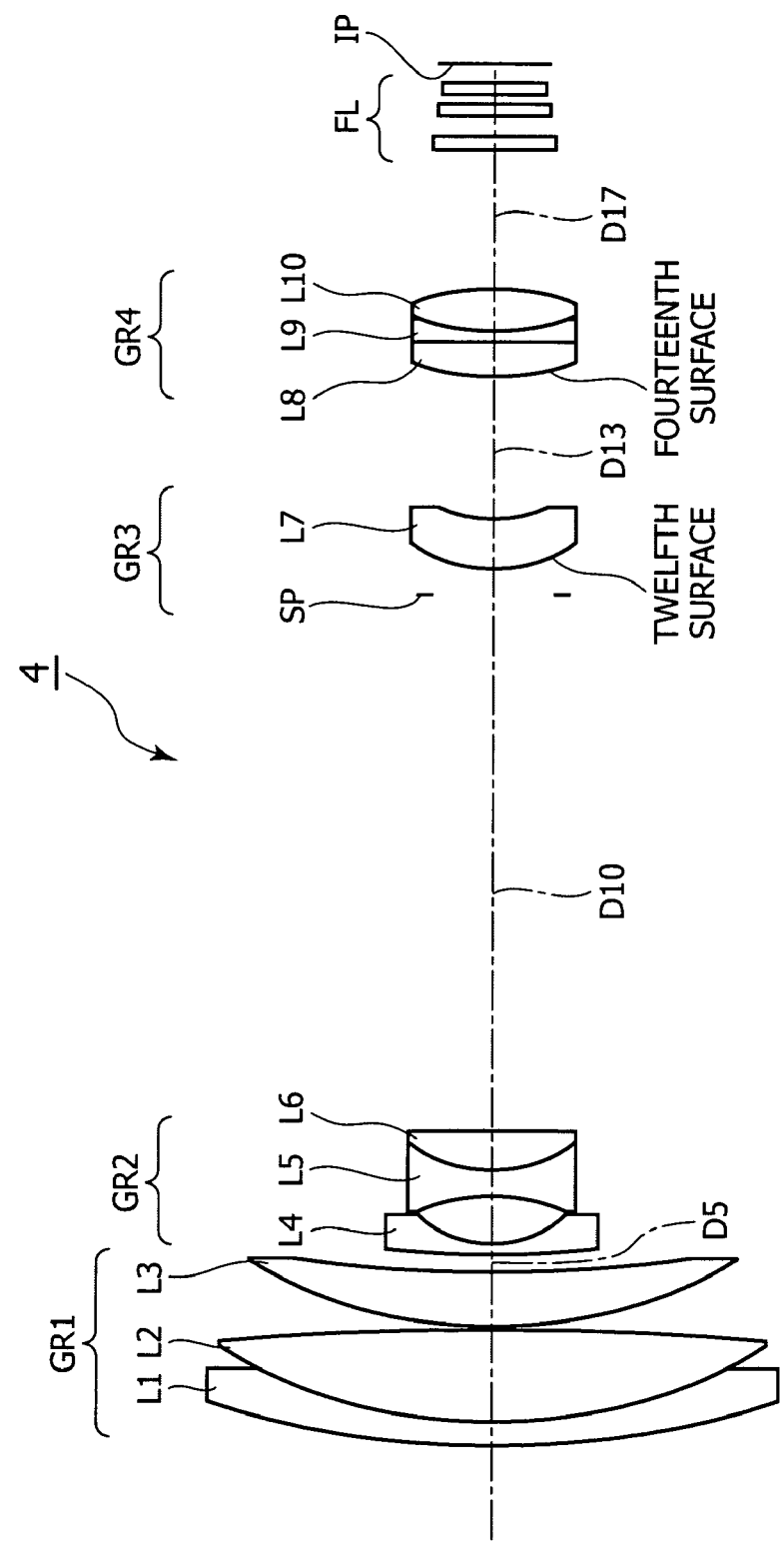
FIG. 14 is a view showing a lens arrangement of a fourth embodiment of the zoom lens in the present invention.

FIG. 14 shows a lens arrangement of a zoom lens 4 in accordance with a fourth embodiment of the present invention. A first lens group GR1 includes lenses which are combination of a meniscus-like negative lens L1 whose convex surface faces toward the object side and a positive lens L2 whose convex surface faces toward the object side, and a positive lens L3 whose convex surface faces toward the object side, the lenses being located in order from the object side to the image side. A second lens group GR2 includes a meniscus-like negative lens L4 whose concave surface faces toward the image side and lenses which are combination of a biconcave lens L5 and a biconvex lens L6, the lenses being located in order from the object side to the image side. A third lens group GR3 includes a positive meniscus lens L7 which has an aspheric surface on the object side surface and whose convex surface faces toward the object side. A fourth lens group GR4 includes lenses which are combination of the following three lenses; a biconvex lens L8 having an aspheric surface on the object side surface, a biconcave lens L9, and a biconvex lens L10, the lenses being located in order from the object side to the image side. Further, an aperture diaphragm SP is located on the object side of the third lens group GR3, and is fixed in an optical axis direction when zooming from the wide angle end state to the telephoto end state. Furthermore, a filter FL is arranged between the fourth lens group GR4 and an image plane IP.

The lens data of a Fourth Numerical Example in which particular values are applied to the zoom lens 4 in accordance with the fourth embodiment are shown in Table 13.

TABLE 13

| Surface No. | Curvature Radius | Surface Separation | Refractive Index | Abbe No. |
|---|---|---|---|---|
| 1: | 22.00467 | 0.53319 | 1.84666 | 23.8 |
| 2: | 12.05005 | 2.10609 | 1.48749 | 70.4 |
| 3: | −61.31662 | 0.07998 | | |
| 4: | 11.16496 | 1.19967 | 1.71300 | 53.9 |
| 5: | 34.97713 | (D5) | | |
| 6: | 22.23394 | 0.23993 | 1.83400 | 37.3 |
| 7: | 2.47399 | 1.10370 | | |
| 8: | −4.17859 | 0.61850 | 1.69680 | 55.5 |
| 9: | 3.27911 | 0.90109 | 1.84666 | 23.8 |
| 10: | −122.63323 | (D10) | | |
| 11: | ∞ | 0.58651 | | |
| 12: | 3.12617 | 1.18901 | 1.52470 | 56.2 |
| 13: | 3.73765 | (D13) | | |
| 14: | 4.99270 | 0.78379 | 1.58313 | 59.4 |
| 15: | ∞ | 0.23993 | 1.84666 | 23.8 |
| 16: | 5.08661 | 0.97040 | 1.69680 | 55.5 |
| 17: | −5.59847 | (D17) | | |
| 18: | ∞ | 0.32524 | 1.55232 | 63.4 |
| 19: | ∞ | 0.47987 | | |
| 20: | ∞ | 0.25060 | 1.55232 | 63.4 |
| 21: | ∞ | 0.21328 | | |
| 22: | ∞ | 0.26659 | 1.51680 | 64.2 |
| 23: | ∞ | (Bf) | | |

In the zoom lens 4, the object side (the twelfth surface) of the positive meniscus lens L7 in the third lens group GR3 and the object side surface (the fourteenth surface) of three cemented lenses of the fourth lens group GR4 are arranged to be aspheric surfaces. Then, the fourth order, sixth order, eighth order, and tenth order aspheric surface coefficients A, B, C, and D of the respective surfaces in Fourth Numerical Example are shown in Table 14 together with a cone constant κ.

TABLE 14

| 12th surface | κ = 0.000000 | A = −0.210101E−02 |
| | B = −0.437849E−03 | C = 0.137094E−04 |
| | D = 0.000000E+00 | |
| 14th surface | κ = 0.000000 | A = −0.493549E−02 |
| | B = 0.615606E−03 | C = −0.198666E−03 |
| | D = 0.220862E−04 | |

In the zoom lens 4, the surface spacing D5 between the first lens group GR1 and the second lens group GR2, the surface spacing D10 between the second lens group GR2 and the third lens group GR3 (aperture diaphragm SP), the surface spacing D13 between the third lens group GR3 and the fourth lens group GR4, and the surface spacing D17 between the fourth lens group GR4 and the filter FL change when zooming from the wide angle end state to the telephoto end state. Then, the respective values in the wide angle end state (f=1.000), the middle focal distance state (f=6.405), and the telephoto end state (f=41.042) of the respective surface spacing in Fourth Numerical Example are shown in Table 15 together with the focal distances f, the F numbers FNO and the angles of view 2ω.

TABLE 15

(Table of Variable Separations)

| f | 1.000 | 6.405 | 41.042 |
|---|---|---|---|
| FNO | 1.875 | 2.298 | 3.989 |
| 2ω | 67.420 | 11.584 | 2.230 |
| D5 | 0.427 | 8.785 | 12.552 |
| D10 | 12.552 | 4.193 | 0.427 |
| D13 | 3.260 | 1.664 | 4.870 |
| D17 | 3.242 | 4.839 | 1.632 |
| Bf | 0.427 | 0.427 | 0.427 |

Values of the Fourth Numerical Example corresponding to the conditional expressions (1)-(9) and a partial dispersion ratio 74 gFL1 of the first lens L1 in the first lens group GR1 are shown in Table 16.

TABLE 16

| (1) | f3/f4 = 4.307 |
| (2) | |f2/fw| = 2.283 |
| (3) | dz/fw = 12.125 |
| (4) | Lz/Lf = 1.849 |
| (5) | |β2w| = 0.188 |
| (6) | |f2/(fw · ft) 1/2| = 0.356 |
| (7) | H1'/f1 = −0.080 |
| (8) | νdL1 = 23.78 |
| (9) | θgFL2 = 0.5305, νdL2 = 70.44 |
| (10) | θgFL1 = 0.6191 |

Figure 15:
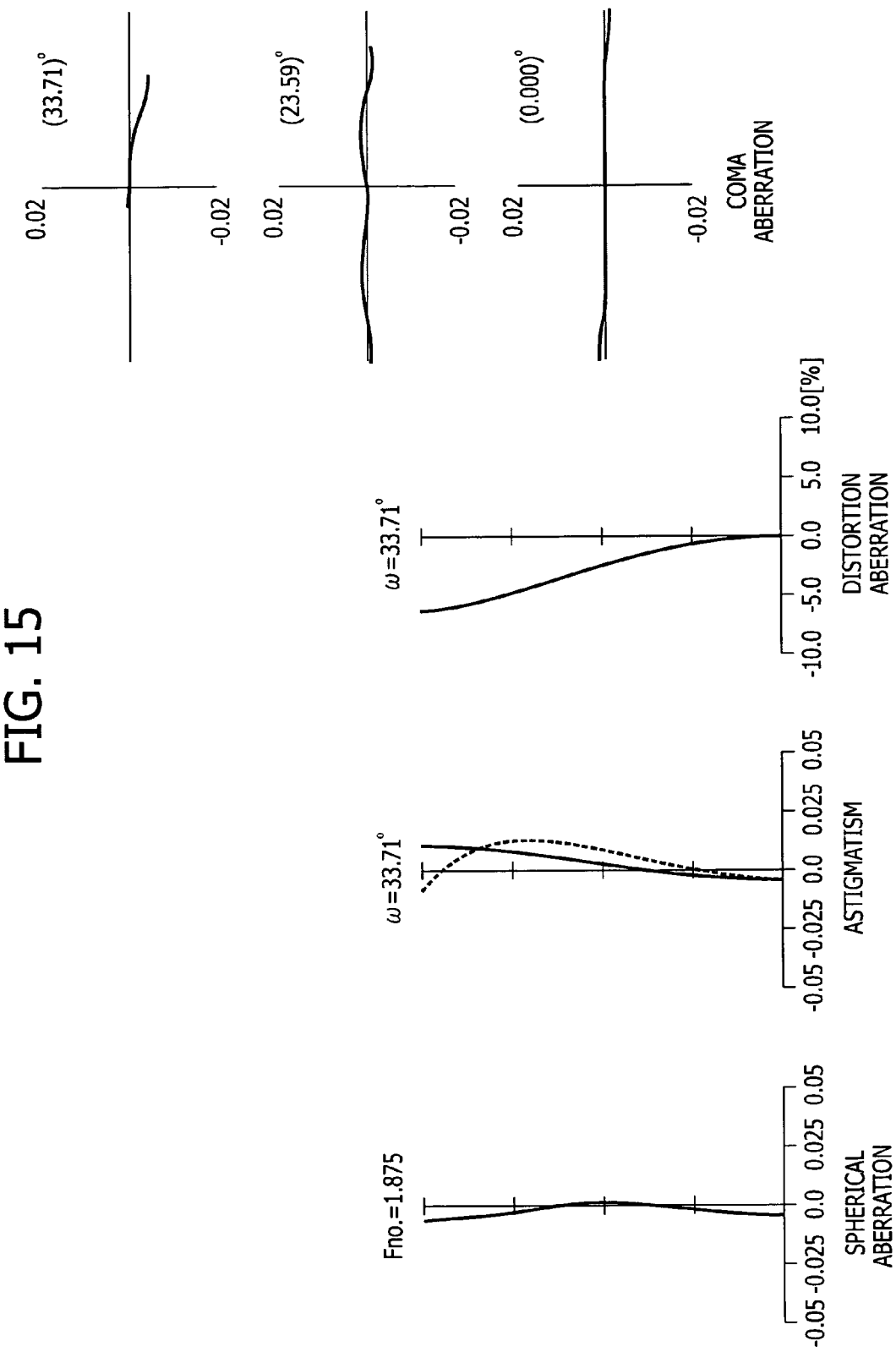
FIG. 15 to 17 show aberration graphs of a Fourth Numerical Example in which particular values are applied to the fourth embodiment.
Figure 16:
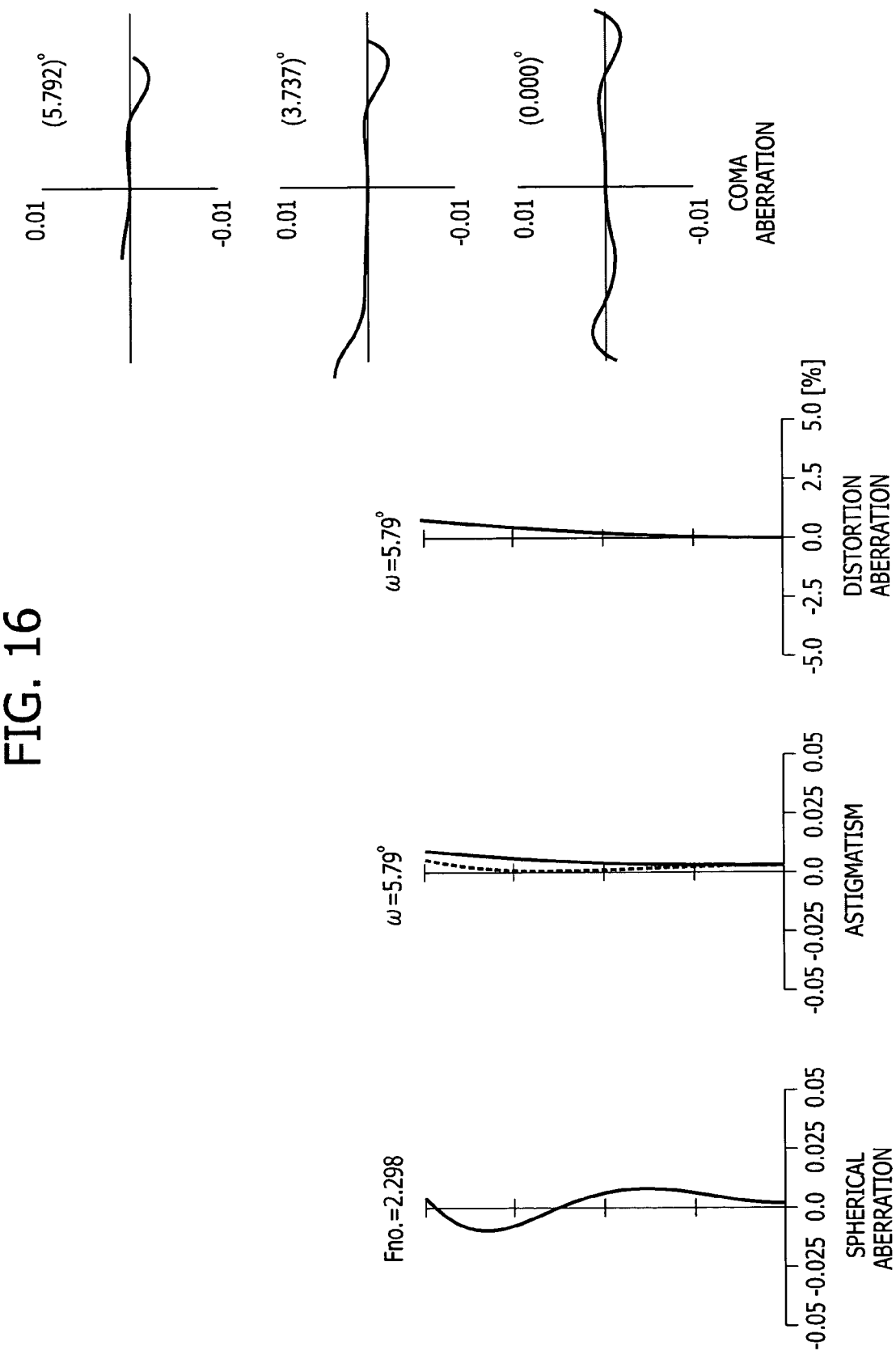
Figure 17:
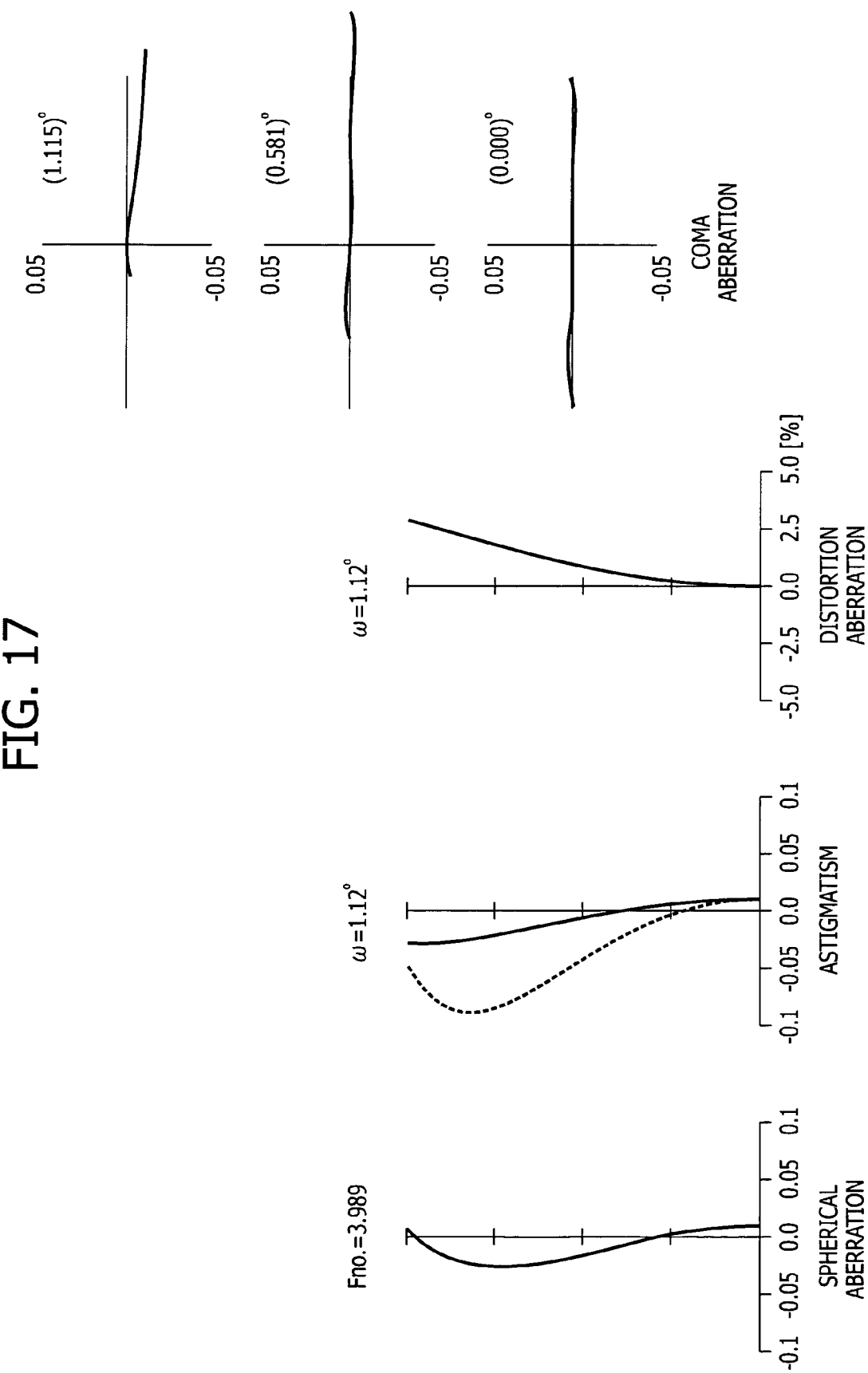

FIGS. 15 to 17 show respective aberration graphs in the infinity focusing state of the Fourth Numerical Example, in which FIG. 15 shows the respective aberration graphs in the wide angle end state (f=1.000), FIG. 16 shows the middle focal distance state (f=6.405), and FIG. 17 shows the telephoto end state (f=41.042).

In the respective aberration graphs of FIGS. 15 to 17, solid lines in the spherical aberration graphs show spherical aberrations, solid lines in the astigmatic graphs show sagittal image planes and broken lines show meridional image planes. In the coma aberration graph, "A" shows the angle of field and "y" shows an image height, respectively.

It is clear from the respective aberration graphs that Fourth Numerical Example allows the respective aberrations to be compensated well and has an excellent image forming performance.

Figure 18:
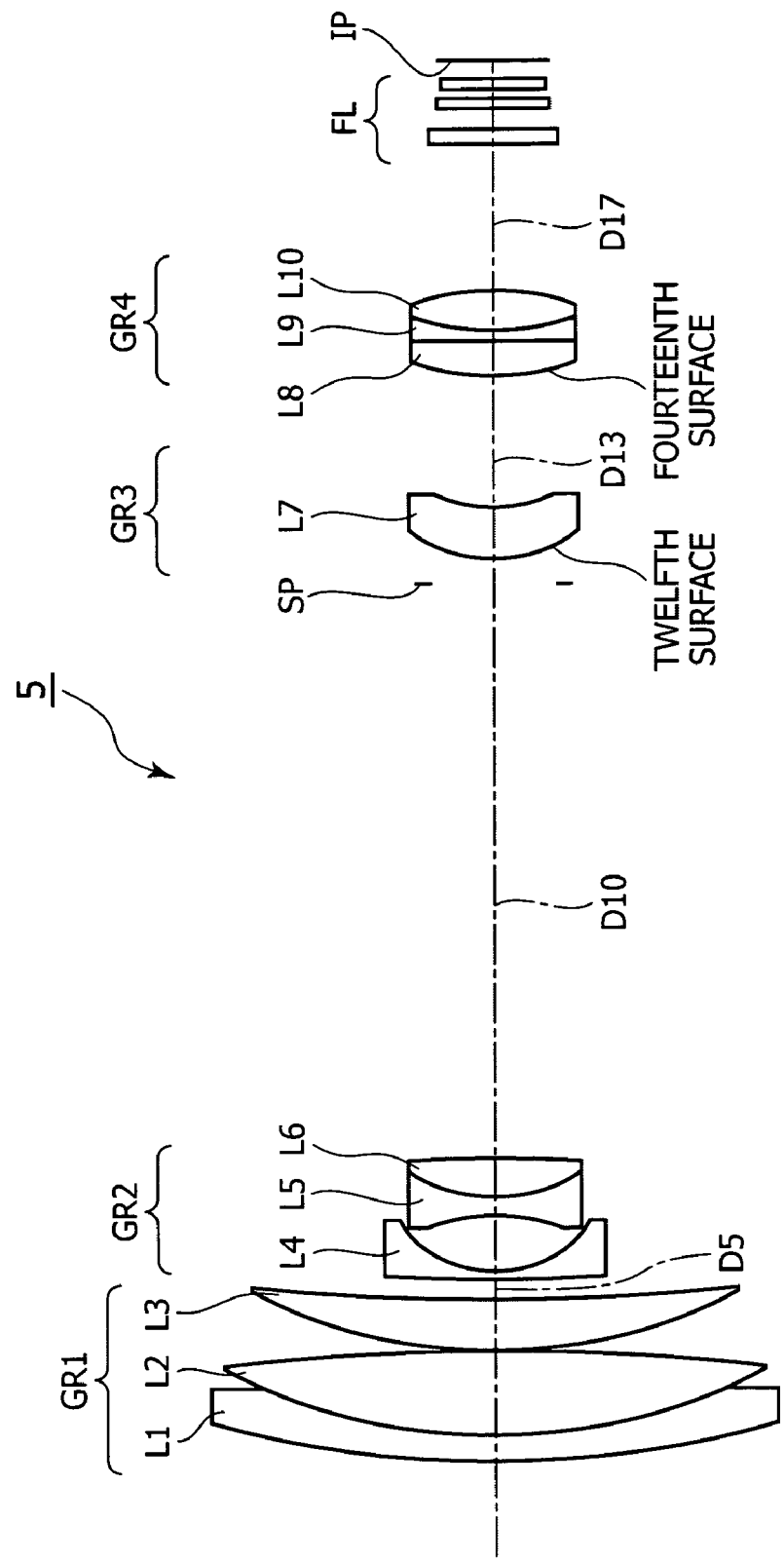
FIG. 18 is a view showing a lens arrangement of a fifth embodiment of the zoom lens in the present invention.

FIG. 18 shows a lens arrangement of a zoom lens 5 in accordance with a fifth embodiment of the present invention. A first lens group GR1 includes lenses which are combination of a meniscus-like negative lens L1 whose convex surface faces toward the object side and a positive lens L2 whose convex surface faces toward the object side, and a positive lens L3 whose convex surface faces toward the object side, the lenses being located in order from the object side to the image side. A second lens group GR2 includes a meniscus-like negative lens L4 whose concave surface faces toward the image side and lenses which are combination of a biconcave lens L5 and a biconvex lens L6, the lenses being located in order from the object side to the image side. A third lens group GR3 includes a positive meniscus lens L7 which has an aspheric surface on the object side surface and whose convex surface faces toward the object side. A fourth lens group GR4 includes lenses which are combination of following three lenses; a biconvex lens L8 having an aspheric surface on the object side surface, a biconcave lens L9, and a biconvex lens L10, the lenses being located in order from the object side to the image side. Further, an aperture diaphragm SP is located on the object side of the third lens group GR3, and is fixed in an optical axis direction when zooming from the wide angle end state to the telephoto end state. Furthermore, a filter FL is arranged between the fourth lens group GR4 and an image plane IP.

The lens data of Fifth Numerical Example in which particular values are applied to the zoom lens 5 in accordance with the fifth embodiment are shown in Table 17.

TABLE 17

| Surface No. | Curvature Radius | Surface Separation | Refractive Index | Abbe No. |
|---|---|---|---|---|
| 1: | 25.14087 | 0.49528 | 1.84666 | 23.8 |
| 2: | 12.30824 | 1.84035 | 1.48749 | 70.4 |
| 3: | −58.47252 | 0.07429 | | |
| 4: | 11.46989 | 1.08104 | 1.77250 | 49.6 |
| 5: | 38.37971 | (D5) | | |
| 6: | 23.33146 | 0.22287 | 1.83400 | 37.3 |
| 7: | 2.55455 | 1.20357 | | |
| 8: | −4.48136 | 0.39622 | 1.69680 | 55.5 |
| 9: | 3.27639 | 0.82493 | 1.84666 | 23.8 |
| 10: | −97.05809 | (D10) | | |
| 11: | ∞ | 0.54481 | | |
| 12: | 2.92975 | 1.11977 | 1.52470 | 56.2 |
| 13: | 3.49321 | (D13) | | |
| 14: | 4.92362 | 0.74004 | 1.58313 | 59.4 |
| 15: | ∞ | 0.22287 | 1.84666 | 23.8 |
| 16: | 4.85443 | 0.88343 | 1.69680 | 55.5 |
| 17: | −5.40274 | (D17) | | |
| 18: | ∞ | 0.30212 | 1.55232 | 63.4 |
| 19: | ∞ | 0.44575 | | |
| 20: | ∞ | 0.23278 | 1.55232 | 63.4 |
| 21: | ∞ | 0.19811 | | |
| 22: | ∞ | 0.24764 | 1.51680 | 64.2 |
| 23: | ∞ | (Bf) | | |

In the zoom lens 5, the object side (the twelfth surface) of the positive meniscus lens L7 of the third lens group GR3 and the object side surface (the fourteenth surface) of the three cemented lenses of the fourth lens group GR4 are arranged to be aspheric surfaces. Then, the fourth order, sixth order, eighth order, and tenth order aspheric surface coefficients A, B, C, and D of the respective surfaces in Fifth Numerical Example are shown in Table 18 together with the cone constant $\kappa$.

TABLE 18

| 12th surface | $\kappa$ = 0.000000 | A = −0.230385E−02 |
| | B = −0.871983E−03 | C = 0.194636E−03 |
| | D = −0.343796E−04 | |
| 14th surface | $\kappa$ = 0.000000 | A = −0.570807E−02 |
| | B = 0.118205E−02 | C = −0.514607E−03 |
| | D = 0.816622E−04 | |

In the zoom lens 5, the surface spacing D5 between the first lens group GR1 and the second lens group GR2, the surface spacing D10 between the second lens group GR2 and the third lens group GR3 (aperture diaphragm SP), the surface spacing D13 between the third lens group GR3 and the fourth lens group GR4, and the surface spacing D17 between the fourth lens group GR4 and the filter FL change when zooming from the wide angle end state to the telephoto end state. Then, respective values in the wide angle end state (f=1.000), the middle focal distance state (f=6.445) and the telephoto end state (f=41.568) of the respective surface spacing in a Fifth Numerical Example are shown in Table 19 together with the focal distances f, the F numbers FNO, and the angles of view $2\omega$.

TABLE 19

(Table of Variable Separations)

| f | 1.000 | 6.445 | 41.568 |
|---|---|---|---|
| FNO | 1.875 | 2.335 | 4.305 |
| $2\omega$ | 65.366 | 11.038 | 2.092 |
| D5 | 0.387 | 8.892 | 12.733 |
| D10 | 12.747 | 4.242 | 0.401 |
| D13 | 2.935 | 1.456 | 4.884 |
| D17 | 3.169 | 4.649 | 1.220 |
| Bf | 0.396 | 0.396 | 0.396 |

Values of the Fifth Numerical Example corresponding to the conditional expressions (1)-(9) and a partial dispersion ratio θgFL1 of the first lens L1 in the first lens group GR1 are shown in Table 20.

TABLE 20

| (1) | f3/f4 = 4.164 |
| (2) | |f2/fw| = 2.396 |
| (3) | dz/fw = 12.346 |
| (4) | Lz/Lf = 1.931 |
| (5) | |β2w| = 0.194 |
| (6) | |f2/(fw · ft) 1/2| = 0.372 |
| (7) | H1'/f1 = −0.064 |
| (8) | νdL1 = 23.78 |
| (9) | θgFL2 = 0.5305, νdL2 = 70.44 |
| (10) | θgFL1 = 0.6191 |

Figure 19:
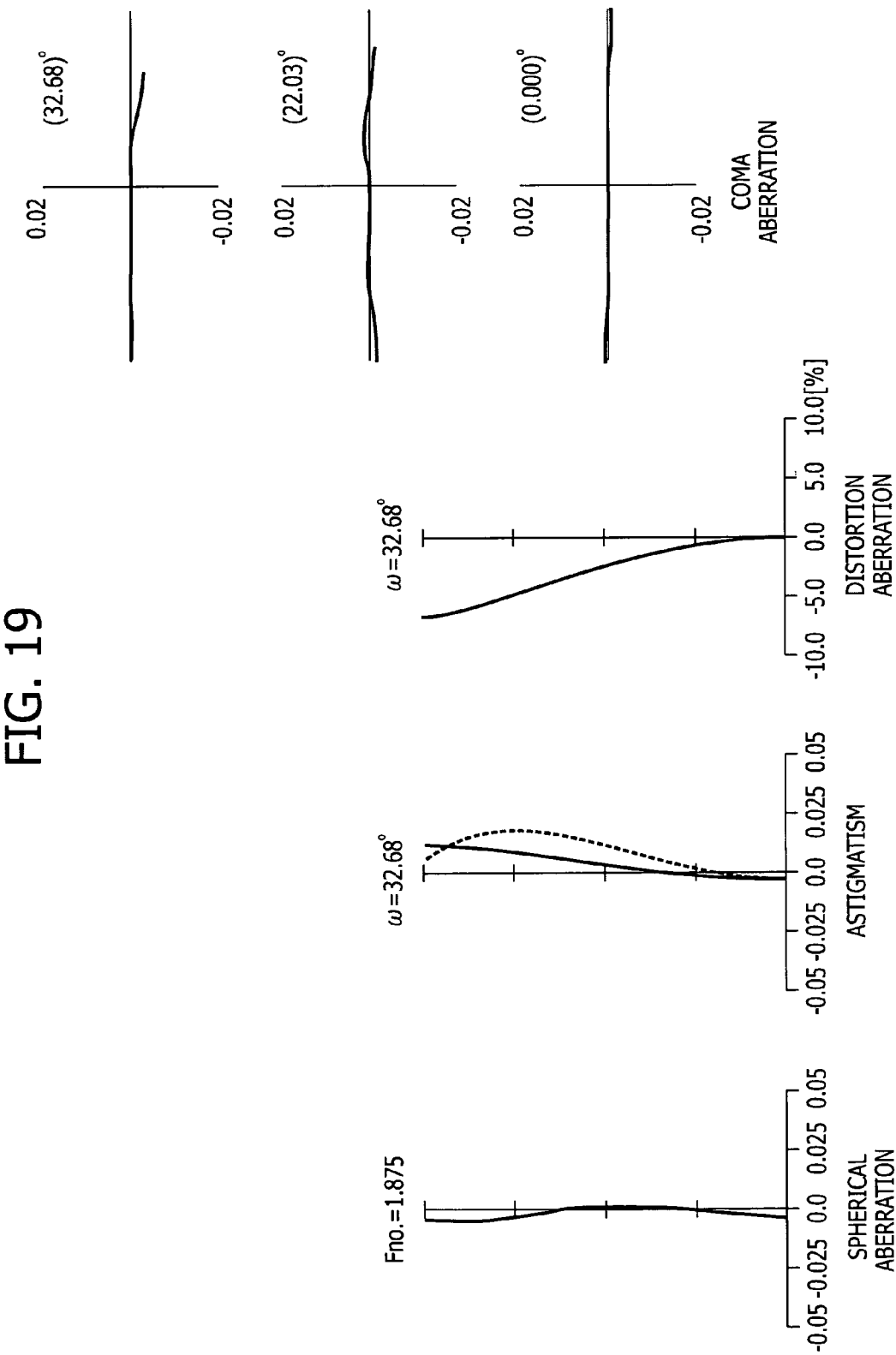
FIGS. 19 to 21 show aberration graphs of a Fifth Numerical Example in which particular values are applied to the fifth embodiment.
Figure 20:
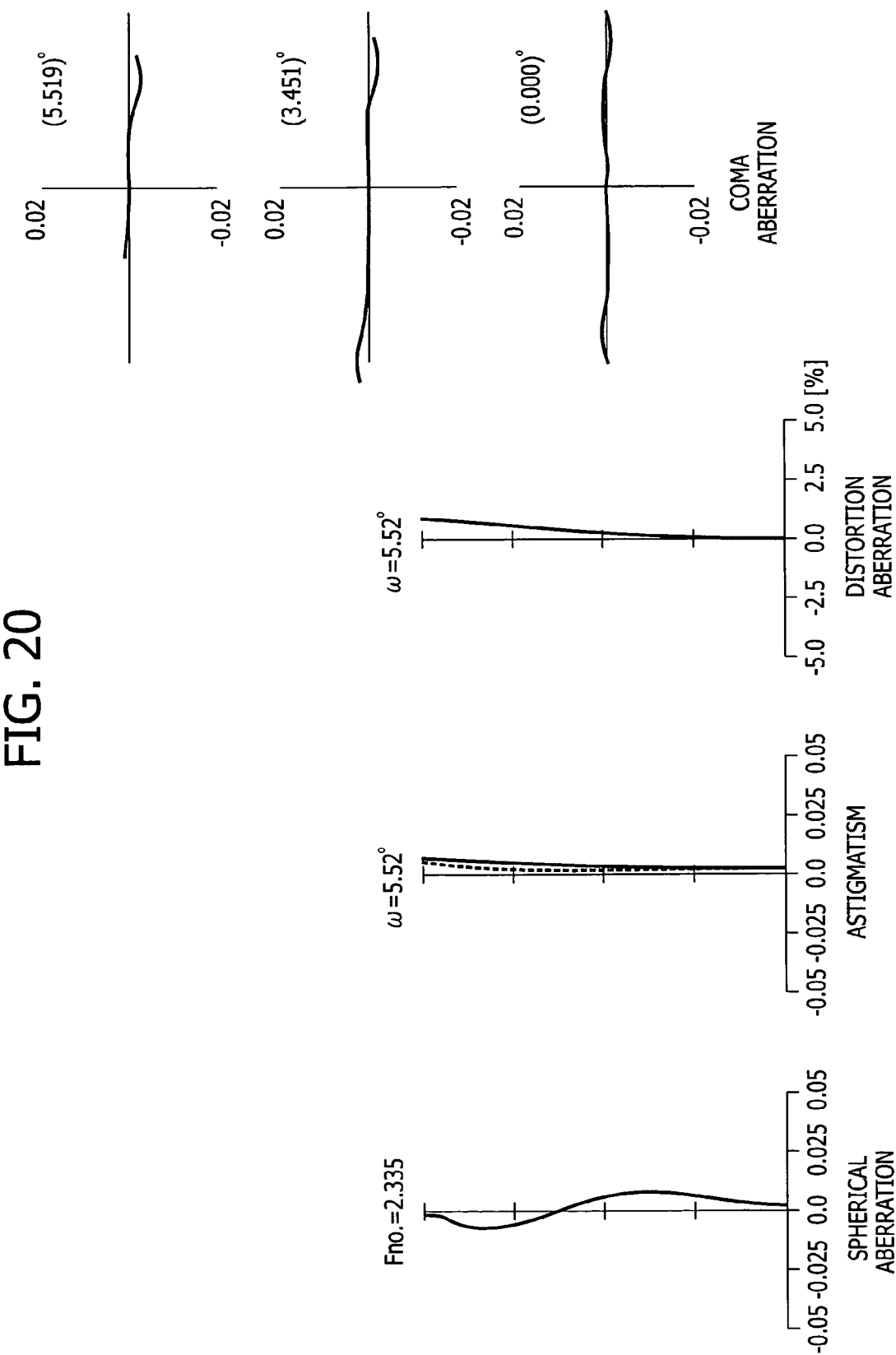
Figure 21:
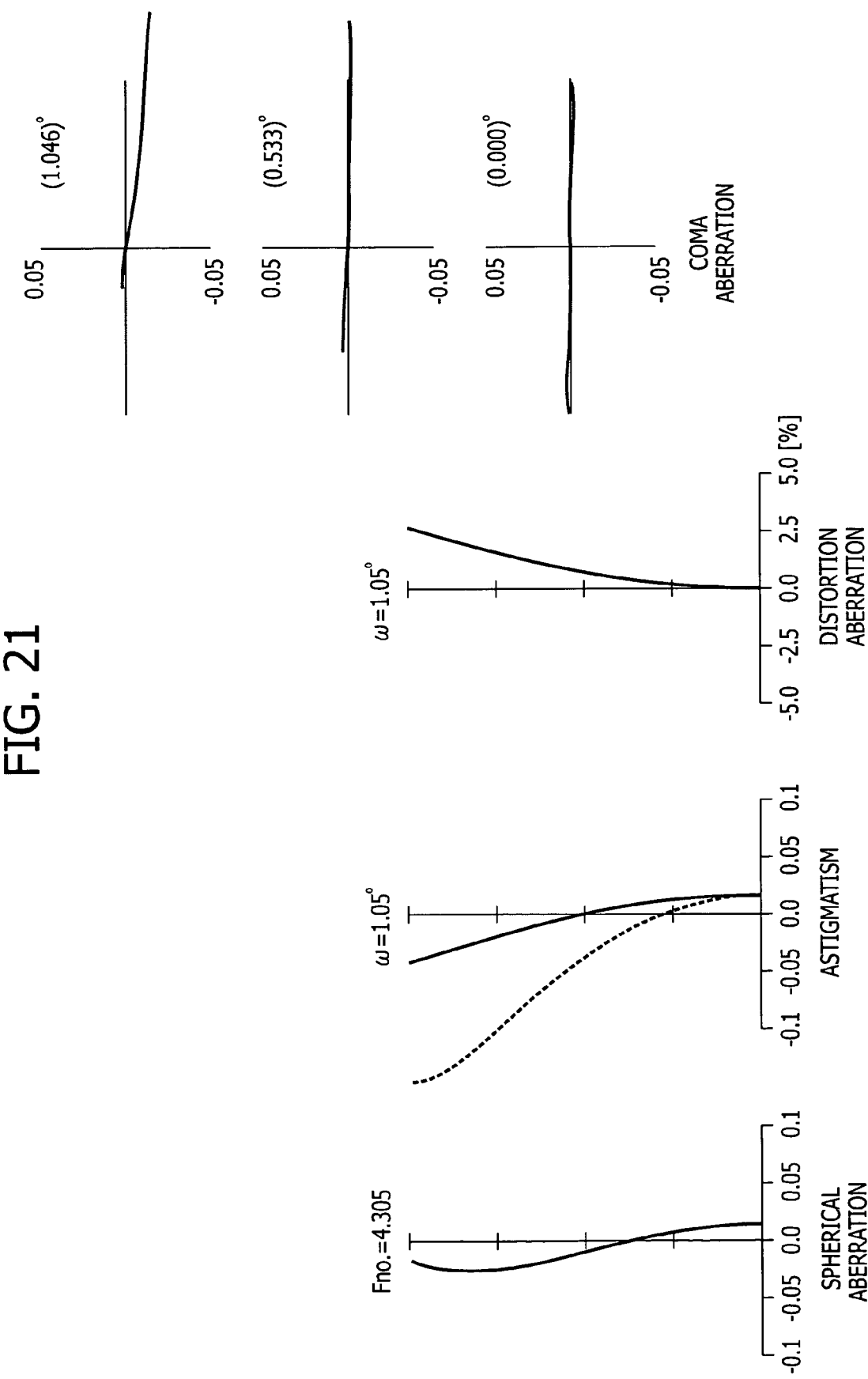

FIGS. 19 to 21 show respective aberration graphs in the infinity focusing state of the Fifth Numerical Example, in which FIG. 19 shows the respective aberration graphs in the wide angle end state (f=1.000), FIG. 20 shows the middle focal distance state (f=6.445), and FIG. 21 shows the telephoto end state (f=41.568).

In the respective aberration graphs of FIGS. 19 to 21, solid lines in the spherical aberration graphs show spherical aberrations, solid lines in the astigmatic graphs show sagittal image planes and broken lines show meridional image planes. In the coma aberration graphs, "A" shows the angle of field and "y" shows an image height, respectively.

It is clear from the respective aberration graphs that the Fifth Numerical Example allows the respective aberrations to be compensated well and has an excellent image forming performance.

Figure 22:
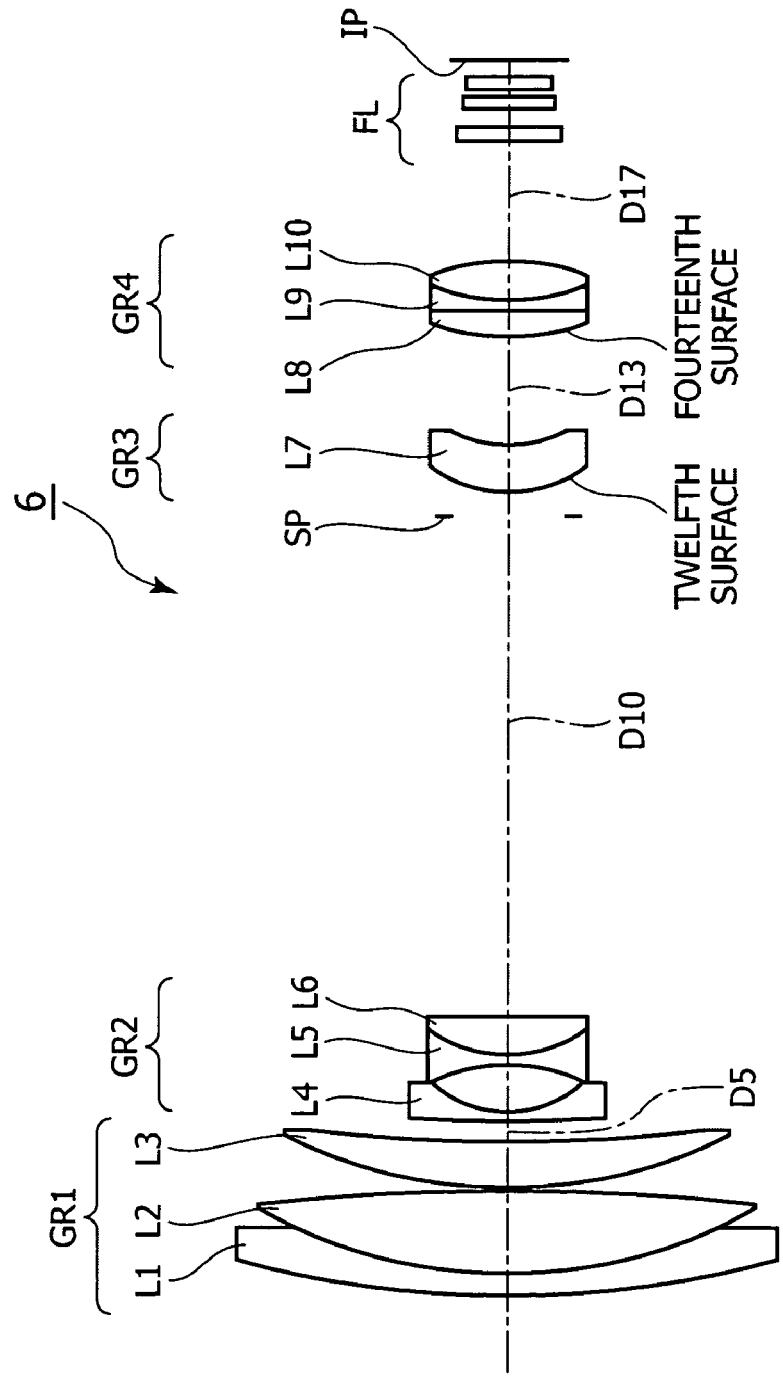
FIG. 22 is a view showing a lens arrangement of a sixth embodiment of the zoom lens in the present invention.

FIG. 22 shows a lens arrangement of a zoom lens 6 in accordance with a sixth embodiment of the present invention. A first lens group GR1 includes lenses which are combination of a meniscus-like negative lens L1 whose convex surface faces toward the object side and a positive lens L2 whose convex surface faces toward the object side, and a positive lens L3 whose convex surface faces toward the object side, the lenses being located in order from the object side to the image side. A second lens group GR2 includes a meniscus-like negative lens L4 whose concave surface faces toward the image side and lenses which are combination of a biconcave lens L5 and a biconvex lens L6, the lenses being located in order from the object side to the image side. A third lens group GR3 includes a positive meniscus lens L7 which has an aspheric surface on the object side surface and whose convex surface faces toward the object side. A fourth lens group GR4 includes lenses which are combination of the following three lenses; a biconvex lens L8 having an aspheric surface on the object side surface, a biconcave lens L9, and a biconvex lens L10, the lenses being located in order from the object side to the image side. Further, an aperture diaphragm SP is located on the object side of the third lens group GR3, and is fixed in an optical axis direction when zooming from the wide angle end state to the telephoto end state. Furthermore, a filter FL is arranged between the fourth lens group GR4 and an image plane IP.

The lens data of a Sixth Numerical Example in which particular values are applied to the zoom lens 6 in accordance with the sixth embodiment are shown in Table 21.

TABLE 21

| Surface No. | Curvature Radius | Surface Separation | Refractive Index | Abbe No. |
|---|---|---|---|---|
| 1: | 24.12917 | 0.49877 | 1.84666 | 23.8 |
| 2: | 11.61400 | 1.86609 | 1.48749 | 70.4 |
| 3: | −54.53137 | 0.07482 | | |
| 4: | 10.83654 | 1.10363 | 1.77250 | 49.6 |
| 5: | 37.72858 | (D5) | | |
| 6: | 37.72858 | 0.22445 | 1.83400 | 37.3 |
| 7: | 2.53491 | 1.07614 | | |
| 8: | −4.47365 | 0.24938 | 1.69680 | 55.5 |
| 9: | 3.03585 | 0.89778 | 1.84666 | 23.8 |
| 10: | −84.61561 | (D10) | | |
| 11: | ∞ | 0.54865 | | |
| 12: | 2.64066 | 1.08308 | 1.52470 | 56.2 |
| 13: | 3.08535 | (D13) | | |
| 14: | 4.51853 | 0.59852 | 1.58313 | 59.4 |
| 15: | ∞ | 0.22445 | 1.84666 | 23.8 |
| 16: | 4.52005 | 0.94492 | 1.69680 | 55.5 |
| 17: | −5.01930 | (D17) | | |
| 18: | ∞ | 0.30425 | 1.55232 | 63.4 |
| 19: | ∞ | 0.44889 | | |
| 20: | ∞ | 0.23442 | 1.55232 | 63.4 |
| 21: | ∞ | 0.19951 | | |
| 22: | ∞ | 0.24938 | 1.51680 | 64.2 |
| 23: | ∞ | (Bf) | | |

In the zoom lens 6, the object side (the twelfth surface) of the positive meniscus lens L7 of the third lens group GR3 and the object side surface (the fourteenth surface) of the three cemented lenses of the fourth lens group GR4 are arranged to be aspheric surfaces. Then, the fourth order, sixth order, eighth order, and tenth order aspheric surface coefficients A, B, C, and D of the respective surfaces in the Sixth Numerical Example are shown in Table 22 together with the cone constant $\kappa$.

TABLE 22

| 12th surface | $\kappa$ = 0.000000 | A = −0.360245E−02 |
| | B = −0.309335E−03 | C = −0.266304E−03 |
| | D = 0.486011E−04 | |
| 14th surface | $\kappa$ = 0.000000 | A = −0.687466E−02 |
| | B = 0.926063E−03 | C = −0.357866E−03 |
| | D = 0.524246E−04 | |

In the zoom lens 6, the surface spacing D5 between the first lens group GR1 and the second lens group GR2, the surface spacing D10 between the second lens group GR2 and the third lens group GR3 (aperture diaphragm SP), the surface spacing D13 between the third lens group GR3 and the fourth lens group GR4 and the surface spacing D17 between the fourth lens group GR4 and the filter FL change when zooming from the wide angle end state to the telephoto end state. Then, respective values in the wide angle end state (f=1.000), the middle focal distance state (f=6.085), and the telephoto end state (f=37.031) of the respective surface spacing in the Sixth Numerical Example are shown in Table 23 together with the focal distances f, the F numbers FNO, and the angles of view $2\omega$.

TABLE 23

(Table of Variable Separations)

| f | 1.000 | 6.085 | 37.031 |
|---|---|---|---|
| FNO | 1.875 | 2.127 | 3.992 |
| $2\omega$ | 61.704 | 10.466 | 1.706 |
| D5 | 0.499 | 8.228 | 11.836 |
| D10 | 11.741 | 4.012 | 0.404 |
| D13 | 2.516 | 1.237 | 4.317 |
| D17 | 2.793 | 4.072 | 0.994 |
| Bf | 0.399 | 0.399 | 0.399 |

Values of the Sixth Numerical Example corresponding to the conditional expressions (1) to (9) and a partial dispersion ratio θgFL1 of the first lens L1 in the first lens group GR1 are shown in Table 24.

TABLE 24

| (1) | f3/f4 = 4.162 |
| (2) | |f2/fw| = 2.339 |
| (3) | dz/fw = 11.337 |
| (4) | Lz/Lf = 2.000 |
| (5) | |β2w| = 0.207 |
| (6) | |f2/(fw · ft) 1/2| = 0.384 |
| (7) | H1'/f1 = −0.068 |
| (8) | vdL1 = 23.78 |
| (9) | θgFL2 = 0.5305, vdL2 = 70.44 |
| (10) | θgFL1 = 0.6191 |

Figure 23:
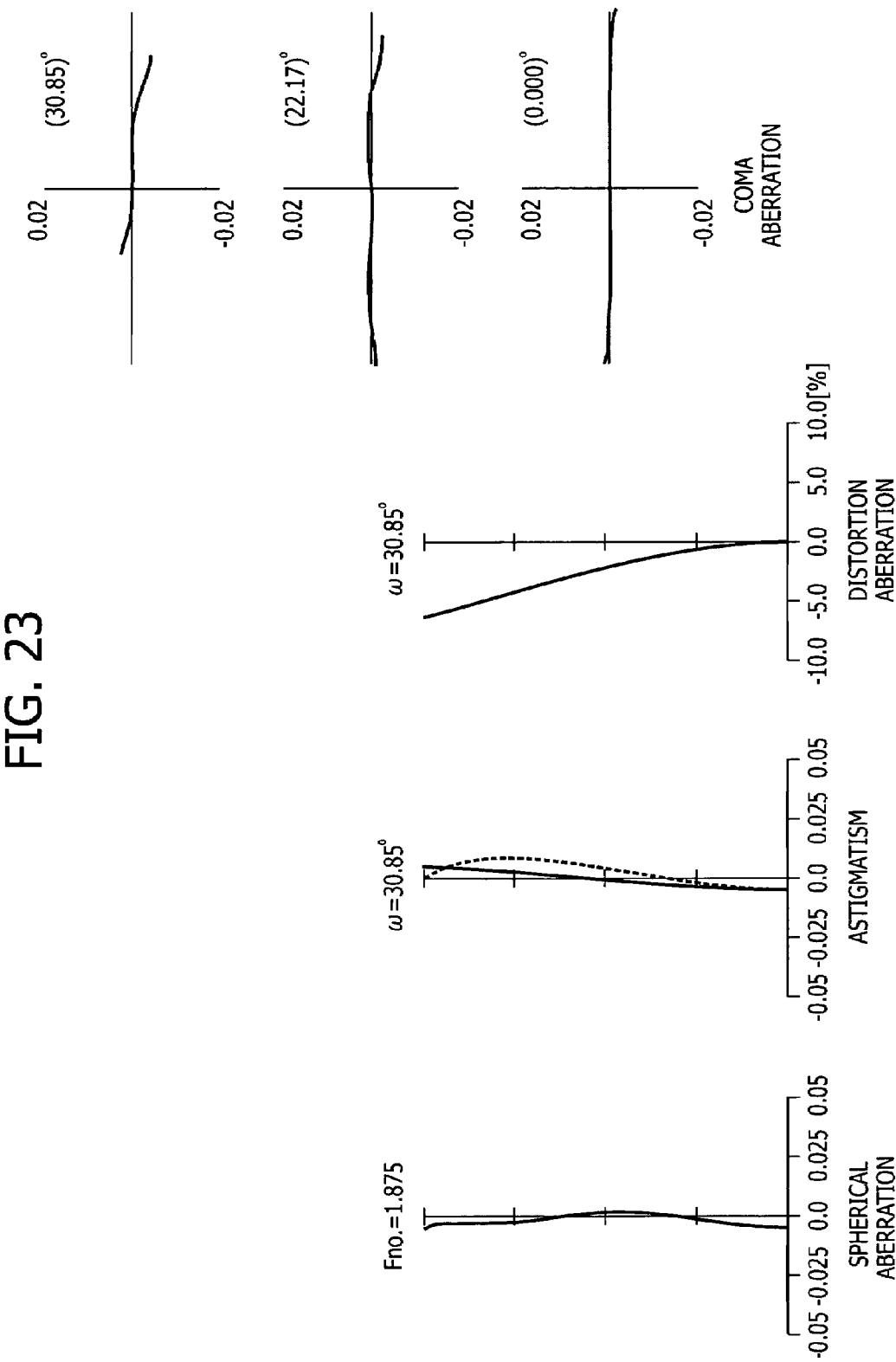
FIGS. 23 to 25 show aberration graphs of a Sixth Numerical Example in which particular values are applied to the sixth embodiment.
Figure 24:
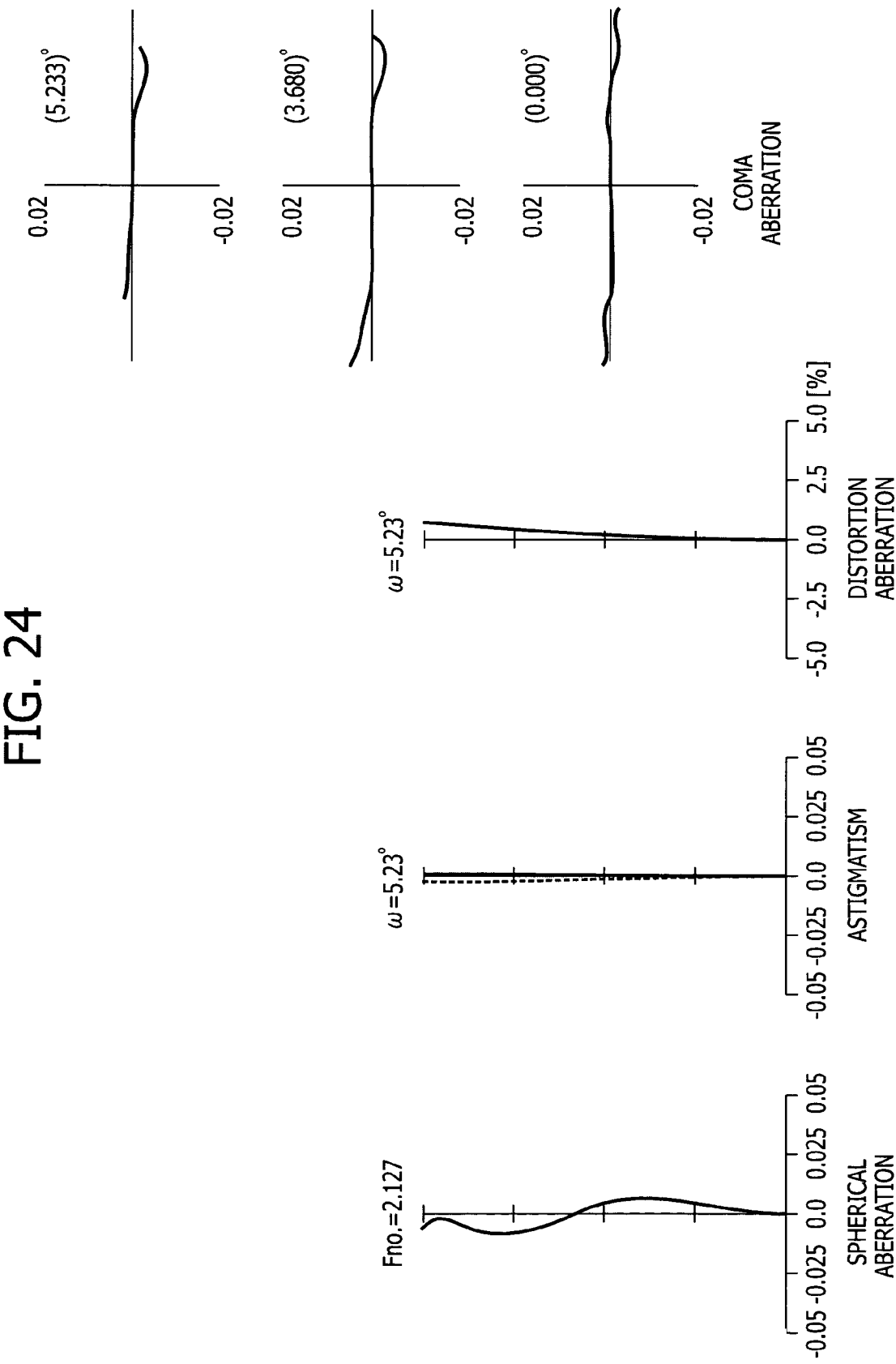
Figure 25:
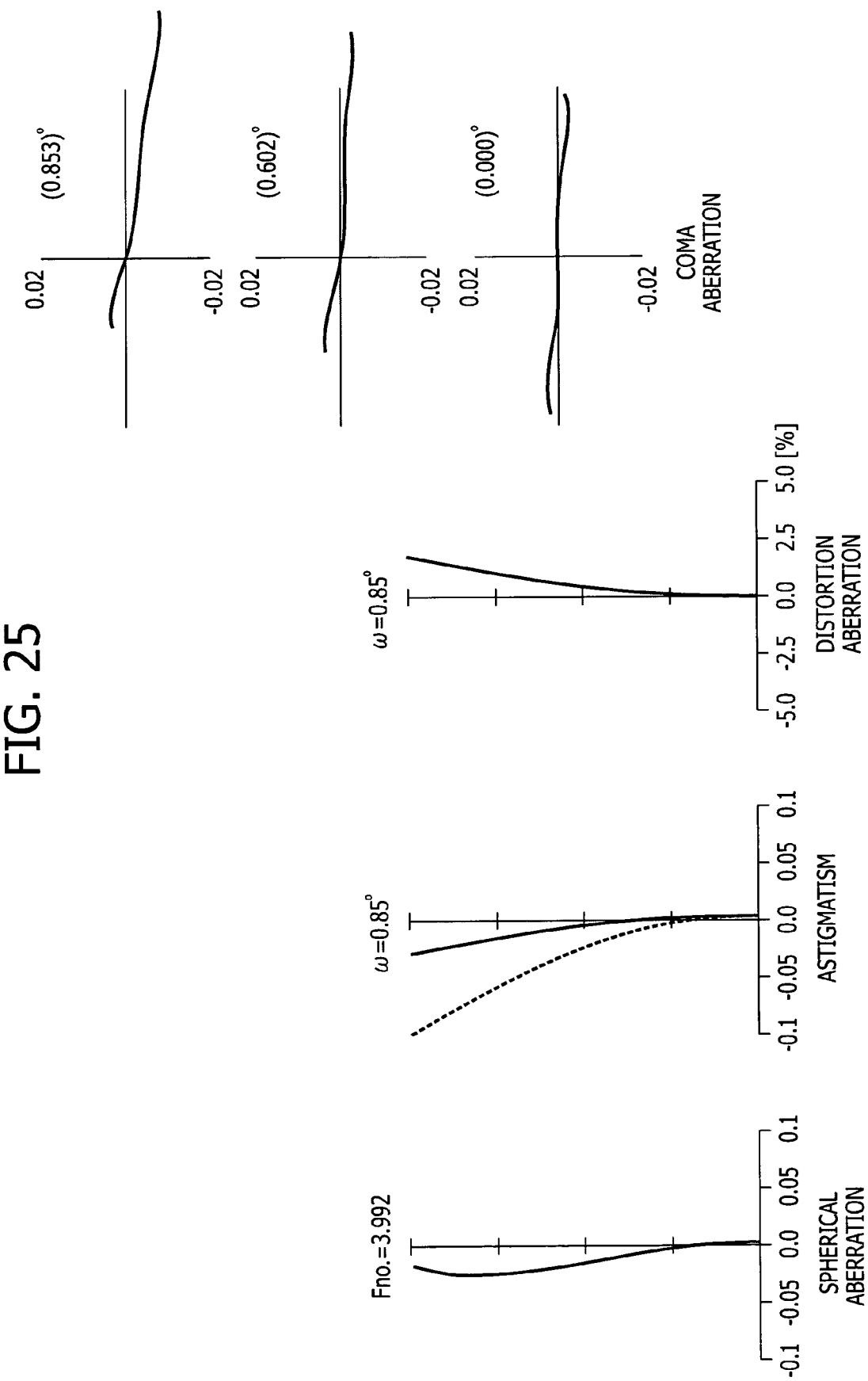

FIGS. 23 to 25 show respective aberration graphs in the infinity focusing state of the Sixth Numerical Example, in which FIG. 23 shows the respective aberration graphs in the wide angle end state (f=1.000), FIG. 24 shows in the middle focal distance state (f=6.085), and FIG. 25 shows in the telephoto end state (f=37.031).

In the respective aberration graphs of FIGS. 23 to 25, solid lines in the spherical aberration graphs show spherical aberrations, solid lines in the astigmatic graphs show sagittal image planes and broken lines show meridional image planes. In the coma aberration graph, "A" shows the angle of field and "y" shows an image height, respectively.

It is clear from the respective aberration graphs that the Sixth Numerical Example allows the respective aberrations to be compensated well and has an excellent image forming performance.

Figure 26:
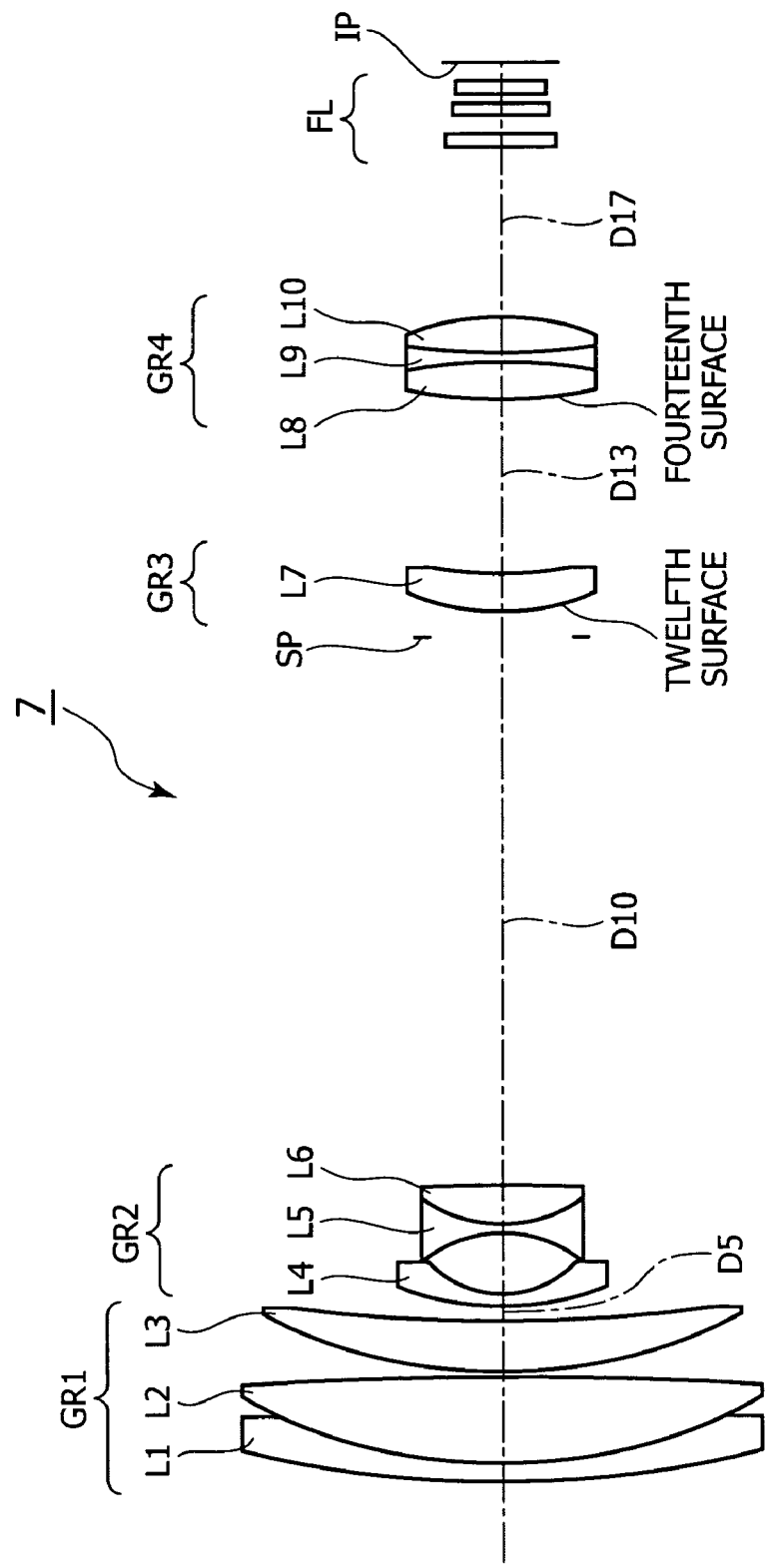
FIG. 26 is a view showing a lens arrangement of a seventh embodiment of the zoom lens in the present invention.

FIG. 26 shows a lens arrangement of a zoom lens 7 in accordance with a seventh embodiment of the present invention. A first lens group GR1 includes lenses which are combination of a meniscus-like negative lens L1 whose convex surface faces toward the object side and a positive lens L2 whose convex surface faces toward the object side, and a positive lens L3 whose convex surface faces toward the object side, the lenses being located in order from the object side to the image side. A second lens group GR2 includes a meniscus-like negative lens L4 whose concave surface faces toward the image side and lenses which are combination of a biconcave lens L5 and a biconvex lens L6, the lenses being located in order from the object side to the image side. A third lens group GR3 includes a positive meniscus lens L7 which has an aspheric surface on the object side surface and whose convex surface faces toward the object side. A fourth lens group GR4 includes lenses which are combination of the following three lenses; a biconvex lens L8 having an aspheric surface on the object side surface, a biconcave lens L9, and a biconvex lens L10, the lenses being located in order from the object side to the image side. Further, an aperture diaphragm SP is located on the object side of the third lens group GR3, and is fixed in an optical axis direction when zooming from the wide angle end state to the telephoto end state. Furthermore, a filter FL is arranged between the fourth lens group GR4 and an image plane IP.

The lens data of a Seventh Numerical Example in which particular values are applied to the zoom lens 7 in accordance with the seventh embodiment are shown in Table 25.

TABLE 25

| Surface No. | Curvature Radius | Surface Separation | Refractive Index | Abbe No. |
|---|---|---|---|---|
| 1: | 22.01062 | 0.39487 | 1.84666 | 23.8 |
| 2: | 11.18465 | 1.85670 | 1.48749 | 70.4 |
| 3: | −74.26675 | 0.07404 | | |
| 4: | 10.60269 | 1.10730 | 1.77250 | 49.6 |
| 5: | 34.11303 | (D5) | | |
| 6: | 6.44401 | 0.22211 | 1.83400 | 37.3 |
| 7: | 2.18064 | 1.29059 | | |
| 8: | −2.91194 | 0.21718 | 1.69680 | 55.5 |
| 9: | 2.76924 | 0.81494 | 1.84666 | 23.8 |
| 10: | 137.35874 | (D10) | | |
| 11: | ∞ | 0.54294 | | |
| 12: | 4.70417 | 0.80325 | 1.52470 | 56.2 |
| 13: | 11.76085 | (D13) | | |
| 14: | 6.94721 | 0.75979 | 1.58313 | 59.4 |
| 15: | −10.65779 | 0.22211 | 1.84666 | 23.8 |
| 16: | 11.81626 | 0.76621 | 1.69680 | 55.5 |
| 17: | −5.16533 | (D17) | | |
| 18: | ∞ | 0.30109 | 1.55232 | 63.4 |
| 19: | ∞ | 0.44423 | | |
| 20: | ∞ | 0.23198 | 1.55232 | 63.4 |
| 21: | ∞ | 0.19743 | | |
| 22: | ∞ | 0.24679 | 1.51680 | 64.2 |
| 23: | ∞ | (Bf) | | |

In the zoom lens 7, the object side (the twelfth surface) of the positive meniscus lens L7 of the third lens group GR3 and the object side surface (the fourteenth surface) of the three cemented lenses of the fourth lens group GR4 are arranged to be aspheric surfaces. Then, the fourth order, sixth order, eighth order, and tenth order aspheric surface coefficients A, B, C, and D of the respective surfaces in the Seventh Numerical Example are shown in Table 26 together with the cone constant κ.

TABLE 26

| 12th surface | κ = 0.000000 | A = −0.153113E−02 |
|---|---|---|
| | B = −0.395243E−03 | C = 0.130904E−03 |
| | D = −0.232212E−04 | |
| 14th surface | κ = 0.000000 | A = −0.417174E−02 |
| | B = 0.509337E−03 | C = −0.229897E−03 |
| | D = 0.363782E−04 | |

In the zoom lens 7, the surface spacing D5 between the first lens group GR1 and the second lens group GR2, the surface spacing D10 between the second lens group GR2 and the third lens group GR3 (aperture diaphragm SP), the surface spacing D13 between the third lens group GR3 and the fourth lens group GR4, and the surface spacing D17 between the fourth lens group GR4 and the filter FL change when zooming from the wide angle end state to the telephoto end state. Then, respective values in the wide angle end state (f=1.000), the middle focal distance state (f=7.036), and the telephoto end state (f=49.500) of the respective surface spacing in the Seventh Numerical Example are shown in Table 27 together with the focal distances f, the F numbers FNO, and the angles of view 2ω.

TABLE 27

(Table of Variable Separations)

| f | 1.000 | 7.036 | 49.500 |
|---|---|---|---|
| FNO | 1.873 | 2.510 | 5.356 |
| 2ω | 61.248 | 9.006 | 1.269 |
| D5 | 0.346 | 8.446 | 11.910 |
| D10 | 11.959 | 3.859 | 0.395 |
| D13 | 3.789 | 1.761 | 6.027 |
| D17 | 3.620 | 5.648 | 1.382 |
| Bf | 0.395 | 0.395 | 0.395 |

Values of the Seventh Numerical Example corresponding to the conditional expressions (1) to (9) and a partial dispersion ratio θgFL1 of the first lens L1 in the first lens group GR1 are shown in Table 28.

TABLE 28

| (1) | f3/f4 = 2.486 |
|---|---|
| (2) | |f2/fw| = 2.021 |
| (3) | dz/fw = 11.564 |
| (4) | Lz/Lf = 1.630 |
| (5) | |β2w| = 0.174 |
| (6) | |f2/(fw · ft) 1/2| = 0.287 |
| (7) | H1'/f1 = −0.070 |
| (8) | νdL1 = 23.78 |
| (9) | θgFL2 = 0.5305, νdL2 = 70.44 |
| (10) | θgFL1 = 0.6191 |

Figure 27:
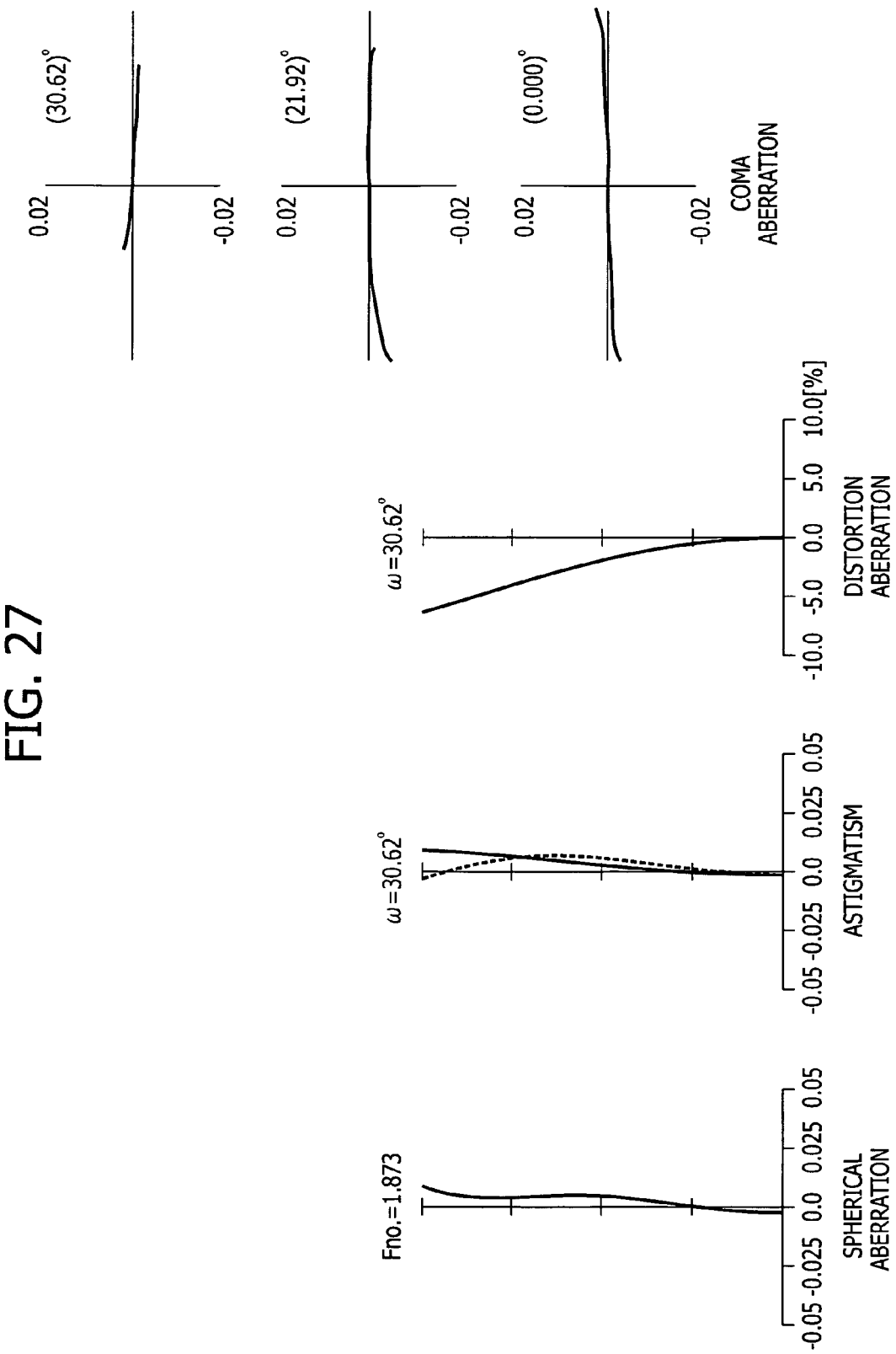
FIGS. 27 to 29 show aberration graphs of a Seventh Numerical Example in which particular values are applied to the seventh embodiment.
Figure 28:
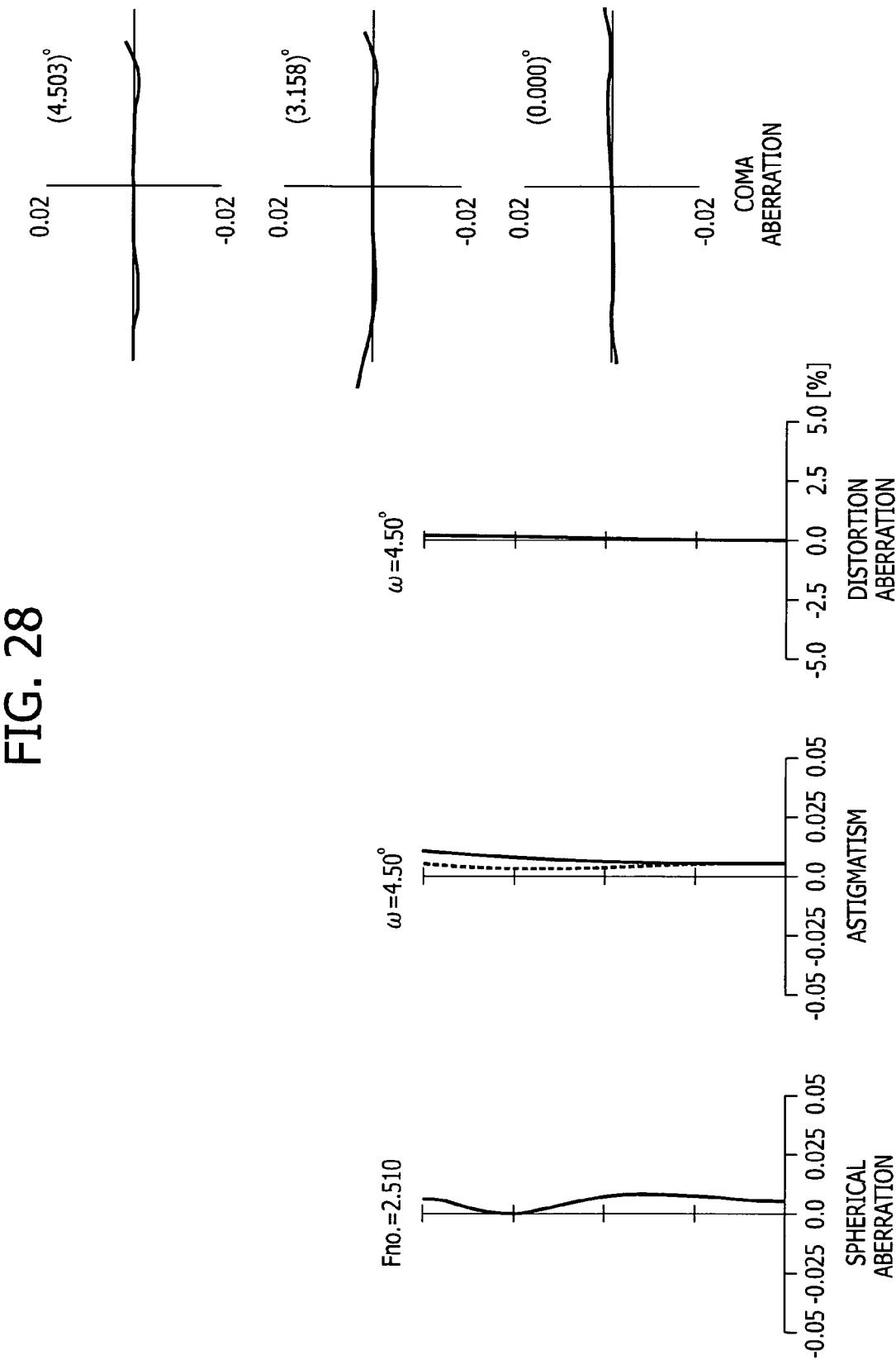
Figure 29:
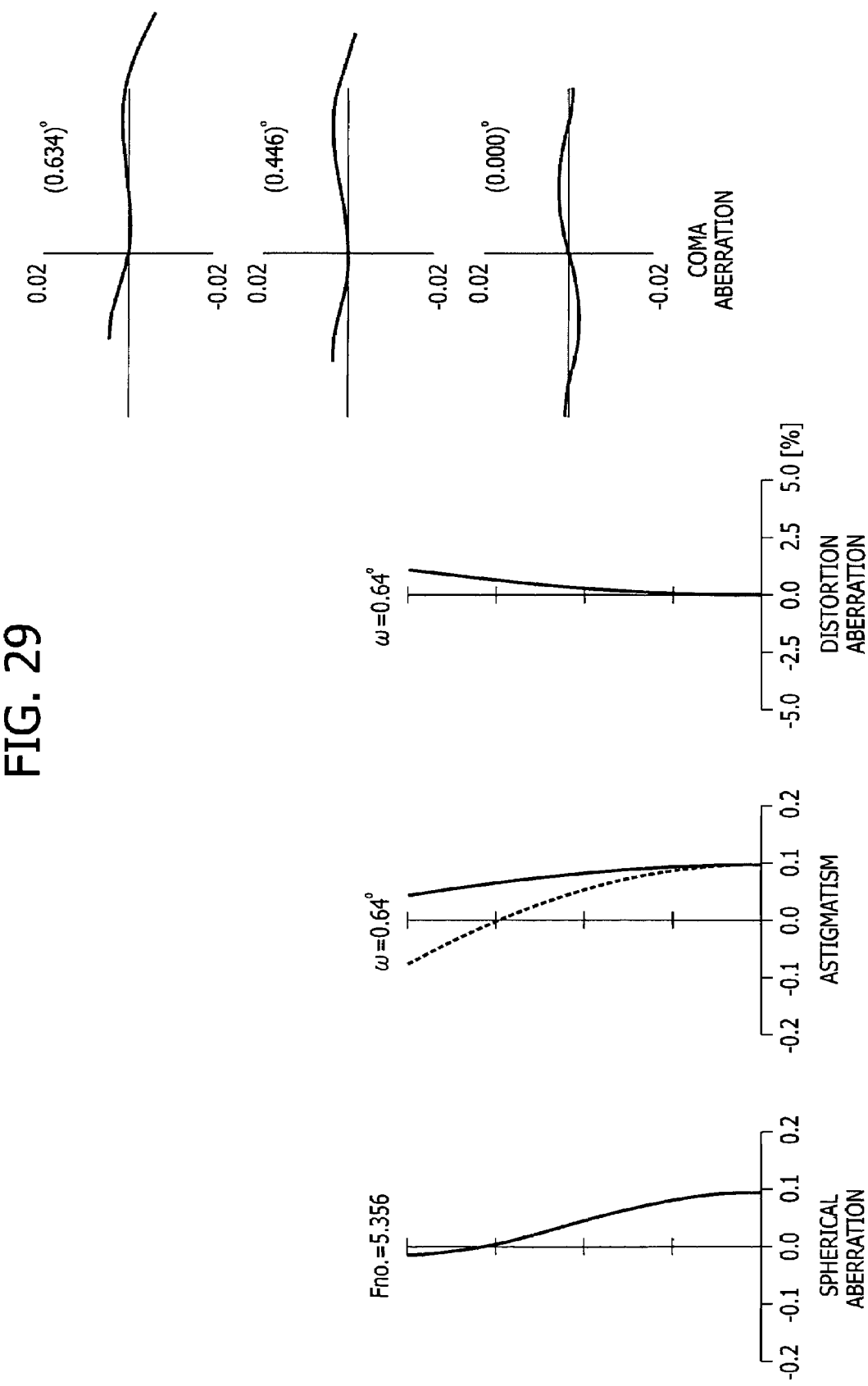

FIGS. 27 to 29 show respective aberration graphs in the infinity focusing state of the Seventh Numerical Example, in which FIG. 27 shows the respective aberration graphs in the wide angle end state (f=1.000), FIG. 28 shows in the middle focal distance state (f=7.036), and FIG. 29 shows in the telephoto end state (f=49.500).

In the respective aberration graphs of FIGS. 27 to 29, solid lines in the spherical aberration graphs show spherical aberrations, solid lines in the astigmatic graphs show sagittal image planes and broken lines show meridional image planes. In the coma aberration graphs, "A" shows the angle of field and "y" shows an image height, respectively.

It is clear from the respective aberration graphs that the Seventh Numerical Example allows the respective aberrations to be compensated well and has an excellent image forming performance.

Figure 30:
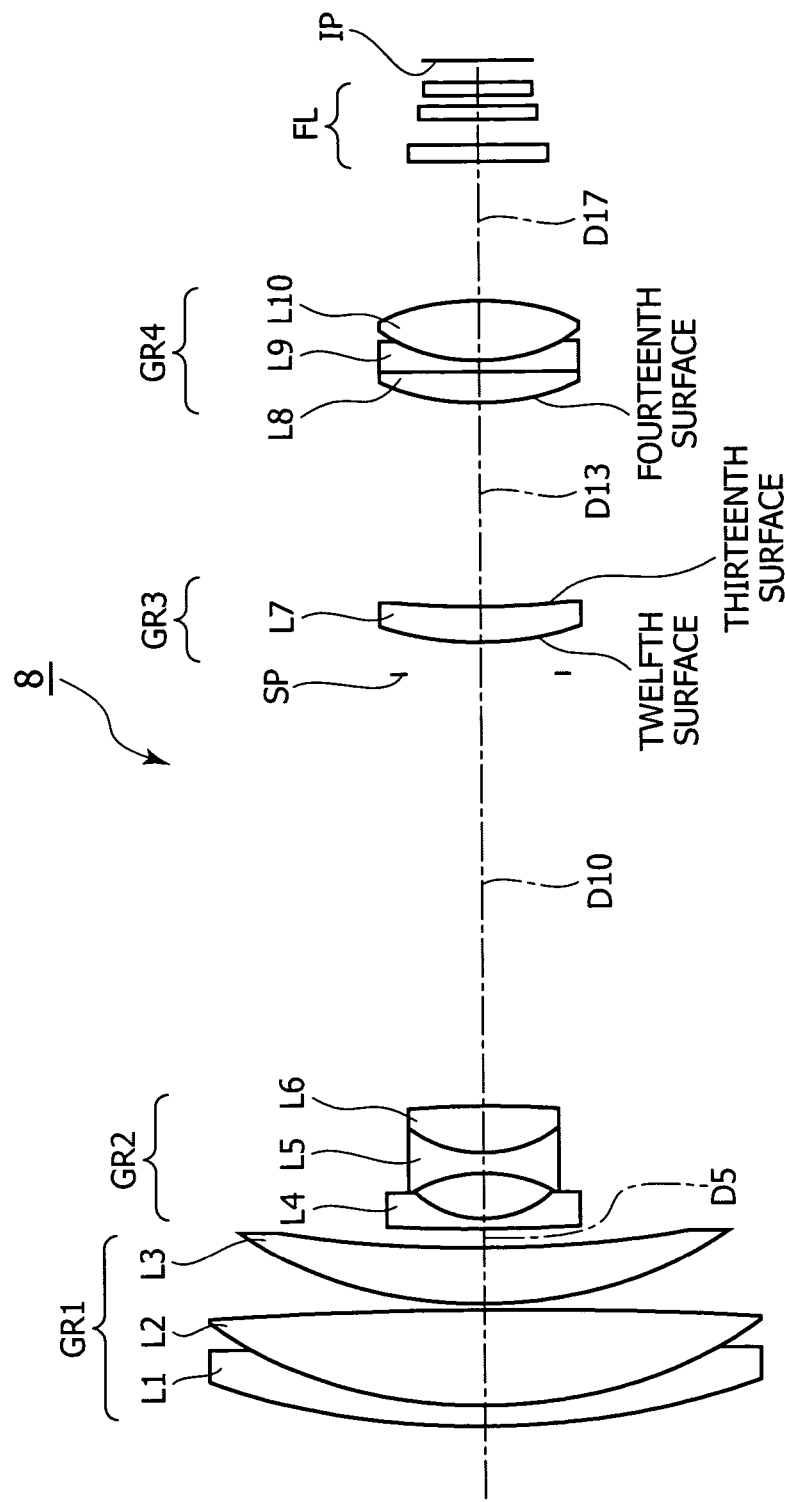
FIG. 30 is a view showing a lens arrangement of an eighth embodiment of the zoom lens in the present invention.

FIG. 30 shows a lens arrangement of a zoom lens 8 in accordance with an eighth embodiment of the present invention. A first lens group GR1 includes lenses which are combination of a meniscus-like negative lens L1 whose convex surface faces toward the object side and a positive lens L2 whose convex surface faces toward the object side, and a positive lens L3 whose convex surface faces toward the object side, the lenses being located in order from the object side to the image side. A second lens group GR2 includes a meniscus-like negative lens L4 whose concave surface faces toward the image side and lenses which are combination of a biconcave lens L5 and a biconvex lens L6, the lenses being located in order from the object side to the image side. A third lens group GR3 includes a positive meniscus lens L7 which has aspheric surfaces on both of the surfaces and whose convex surface faces toward the object side. A fourth lens group GR4 includes lenses which are combination of the following three lenses; a biconvex lens L8 having an aspheric surface on the object side surface, a biconcave lens L9, and a biconvex lens L10, the lenses being located in order from the object side to the image side. Further, an aperture diaphragm SP is located on the object side of the third lens group GR3, and is fixed in an optical axis direction when zooming from the wide angle end state to the telephoto end state. Furthermore, a filter FL is arranged between the fourth lens group GR4 and an image plane IP.

The lens data of an Eighth Numerical Example in which particular values are applied to the zoom lens 8 in accordance with the eighth embodiment are shown in Table 29.

TABLE 29

| Surface No. | Curvature Radius | Surface Separation | Refractive Index | Abbe No. |
|---|---|---|---|---|
| 1: | 16.00399 | 0.35564 | 1.92286 | 20.9 |
| 2: | 9.01748 | 1.73203 | 1.58913 | 61.3 |
| 3: | −65.79373 | 0.07621 | | |
| 4: | 7.95990 | 1.01805 | 1.77250 | 49.6 |
| 5: | 20.69156 | (D5) | | |
| 6: | 20.69156 | 0.20322 | 1.88300 | 40.8 |
| 7: | 1.89281 | 0.81411 | | |
| 8: | −2.90996 | 0.35503 | 1.69680 | 55.5 |
| 9: | 2.24473 | 0.81477 | 1.80518 | 25.5 |
| 10: | −35.83361 | (D10) | | |
| 11: | ∞ | 0.55887 | | |
| 12: | 4.49239 | 0.71347 | 1.52470 | 56.2 |
| 13: | 33.87764 | (D13) | | |
| 14: | 3.70247 | 0.55887 | 1.58313 | 59.4 |
| 15: | ∞ | 0.22863 | 1.92286 | 20.9 |
| 16: | 3.20007 | 1.08359 | 1.64769 | 33.8 |
| 17: | −4.78992 | (D17) | | |
| 18: | ∞ | 0.30992 | 1.55232 | 63.4 |
| 19: | ∞ | 0.45725 | | |
| 20: | ∞ | 0.23879 | 1.55232 | 63.4 |
| 21: | ∞ | 0.20322 | | |
| 22: | ∞ | 0.25403 | 1.51680 | 64.2 |
| 23: | ∞ | (Bf) | | |

In the zoom lens 8, both surfaces (the twelfth surface, the thirteenth surface) of the positive meniscus lens L7 in the third lens group GR3 and the object side surface (the fourteenth surface) of the three cemented lenses in the fourth lens group GR4 are arranged to be aspheric surfaces. Then, the fourth order, sixth order, eighth order, and tenth order aspheric surface coefficients A, B, C, and D of the respective surfaces in the Eighth Numerical Example are shown in Table 30 together with the cone constant κ.

TABLE 30

| 12th surface | κ = 0.000000 | A = −0.407011E−02 |
| | B = 0.883918E−04 | C = −0.221808E−03 |
| | D = 0.412662E−04 | |
| 13th surface | κ = 0.000000 | A = −0.267511E−02 |
| | B = 0.000000E+00 | C = 0.000000E+00 |
| | D = 0.000000E+00 | |
| 14th surface | κ = 0.000000 | A = −0.634381E−02 |
| | B = 0.499924E−03 | C = −0.328674E−03 |
| | D = 0. 703950E−04 | |

In the zoom lens 8, the surface spacing D5 between the first lens group GR1 and the second lens group GR2, the surface spacing D10 between the second lens group GR2 and the third lens group GR3 (aperture diaphragm SP), the surface spacing D13 between the third lens group GR3 and the fourth lens group GR4, and the surface spacing D17 between the fourth lens group GR4 and filter FL change when zooming from the wide angle end state to the telephoto end state. Then, respective values in the wide angle end state (f=1.000), the middle focal distance state (f=5.360), and the telephoto end state (f=28.726) of the respective surface spacing in the Eighth Numerical Example are shown in Table 31 with the focal distances f, the F numbers FNO, and the angles of view 2ω.

TABLE 31

(Table of Variable Separations)

| f | 1.000 | 5.360 | 28.726 |
|---|---|---|---|
| FNO | 1.850 | 2.221 | 3.514 |
| 2ω | 62.519 | 12.083 | 2.238 |
| D5 | 0.351 | 5.512 | 7.874 |
| D10 | 7.930 | 2.769 | 0.406 |
| D13 | 3.611 | 2.122 | 4.411 |
| D17 | 2.456 | 3.945 | 1.656 |
| Bf | 0.406 | 0.406 | 0.406 |

Values of the Eighth Numerical Example corresponding to the conditional expressions (1) to (9) and a partial dispersion ratio θgFL1 of the first lens L1 in the first lens group GR1 are shown in Table 32.

TABLE 32

| (1) | f3/f4 = 1.911 |
| (2) | |f2/fw| = 1.586 |
| (3) | dz/fw = 7.523 |
| (4) | Lz/Lf = 1.350 |
| (5) | |β2w| = 0.206 |
| (6) | |f2/(fw · ft) 1/2| = 0.296 |
| (7) | H1'/f1 = −0.106 |
| (8) | νdL1 = 20.88 |
| (9) | θgFL2 = 0.5402, νdL2 = 61.25 |
| (10) | θgFL1 = 0.6391 |

Figure 31:
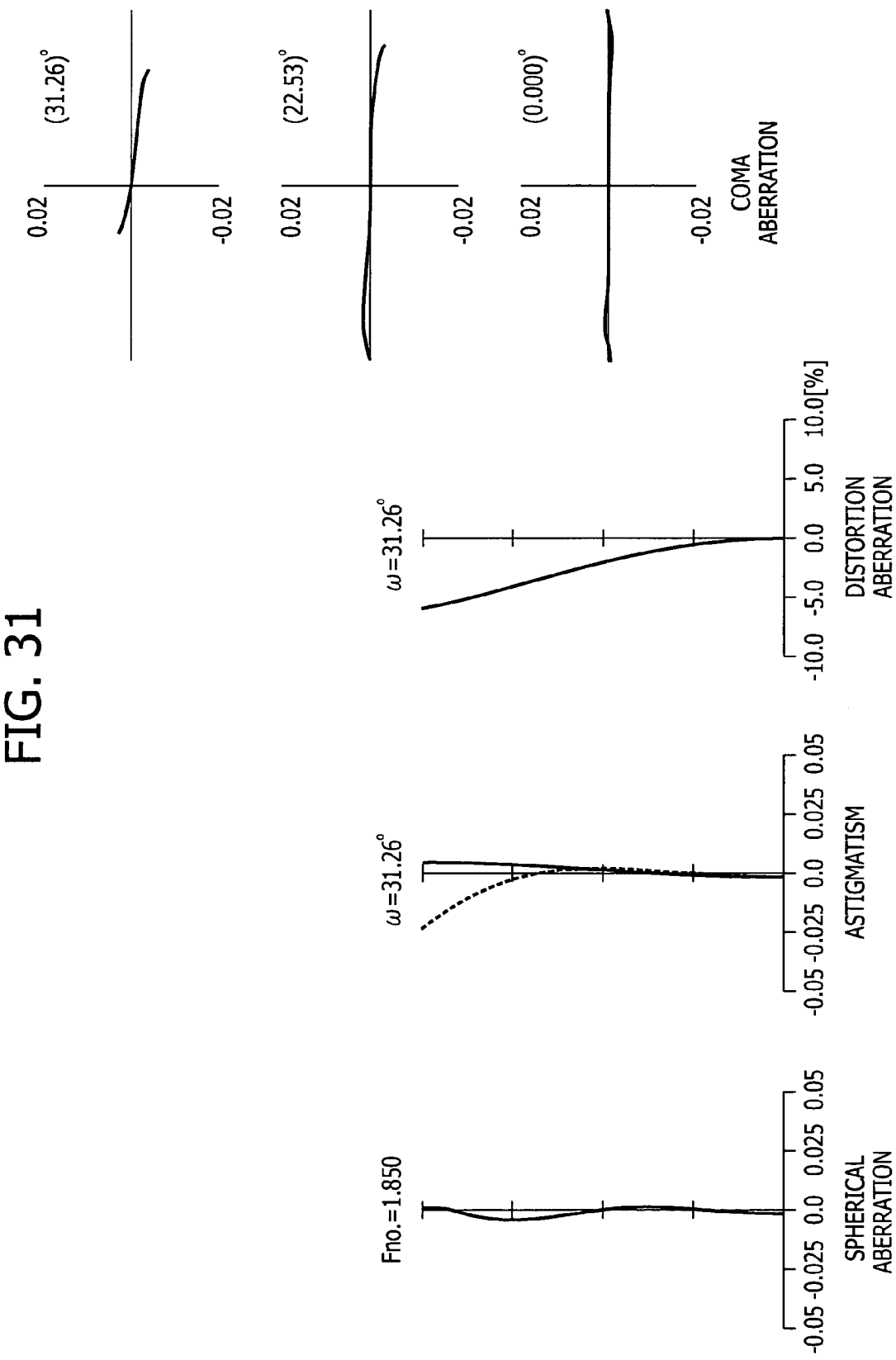
FIGS. 31 to 33 show aberration graphs of an Eighth Numerical Example in which particular values are applied to the eighth embodiment.
Figure 32:
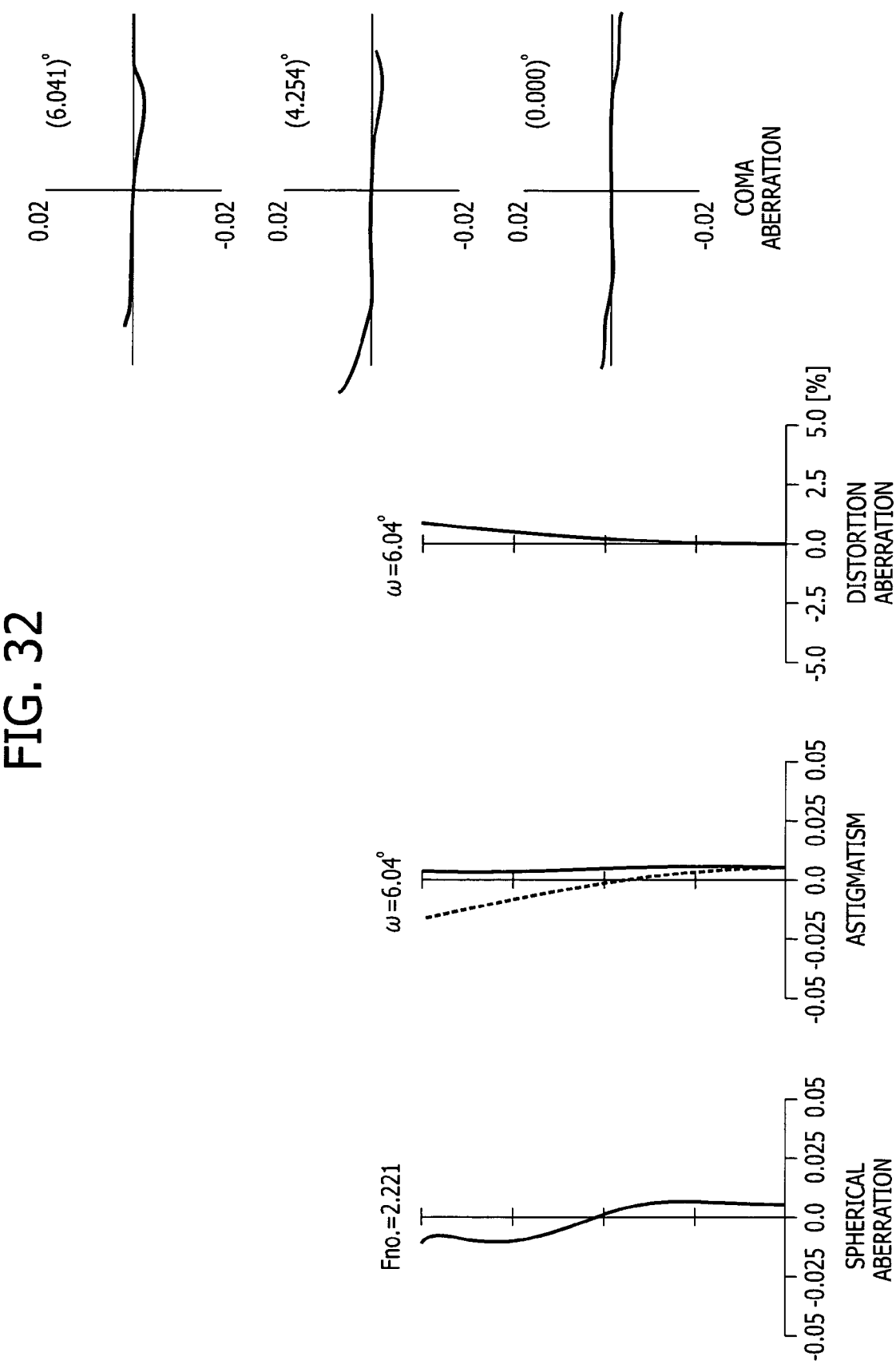
Figure 33:
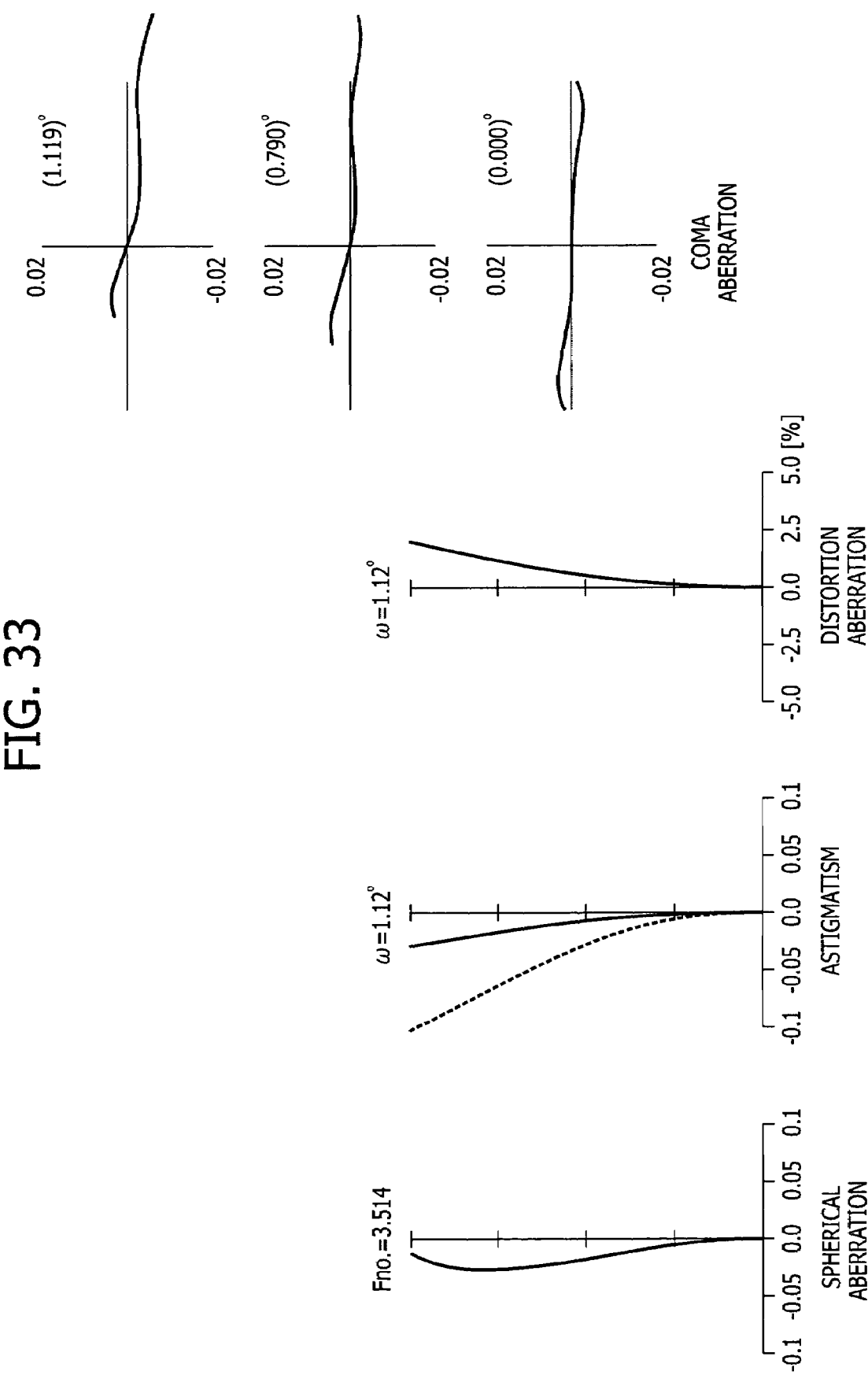

FIGS. 31 to 33 show respective aberration graphs in the infinity focusing state of the Eighth Numerical Example, in which FIG. 31 shows the wide angle end state (f=1.000), FIG. 32 shows the middle focal distance state (f=5.360), and FIG. 33 shows the telephoto end state (f=28.726).

In the respective aberration graphs of FIGS. 31 to 33, solid lines in the spherical aberration graphs show spherical aberrations, solid lines in the astigmatic graphs show sagittal image planes and broken lines show meridional image planes. In the coma aberration graphs, "A" shows the angle of field and "y" shows an image height, respectively.

It is clear from the respective aberration graphs that the Eighth Numerical Example allows the respective aberrations to be compensated well and has an excellent image forming performance.

Figure 34:
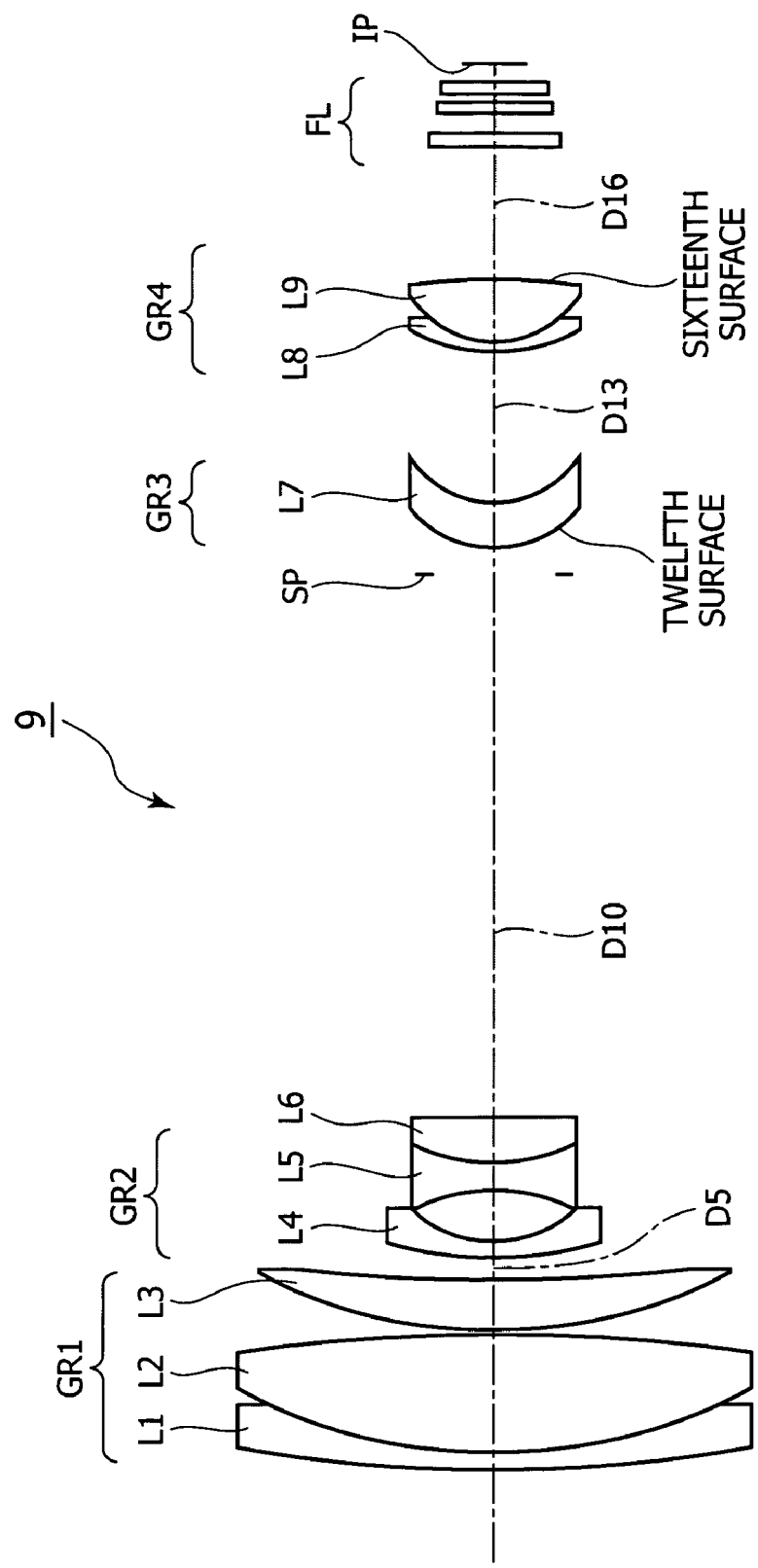
FIG. 34 is a view showing a lens arrangement of a ninth embodiment of the zoom lens in the present invention.

FIG. 34 shows a lens arrangement of a zoom lens 9 in accordance with a ninth embodiment of the present invention. A first lens group GR1 includes lenses which are combination of a meniscus-like negative lens L1 whose convex surface faces toward the object side and a positive lens L2 whose convex surface faces toward the object side, and a positive lens L3 whose convex surface faces toward the object side, in which the lenses are located in order from the object side to the image side. A second lens group GR2 includes a meniscus-like negative lens L4 whose concave surface faces toward the image side and lenses which are combination of a biconcave lens L5 and a biconvex lens L6, the lenses being located in order from the object side to the image side. A third lens group GR3 includes a positive meniscus lens L7 which has an aspheric surface on the object side and whose convex surface faces toward the object side. A fourth lens group GR4 includes lenses which are combination of a meniscus-like negative lens L8 whose convex surface faces toward the object side and a biconvex lens L9 having an aspheric surface on the image side surface, in which the lenses are located in order from the object side to the image side. Further, an aperture diaphragm SP is located on the object side of the third lens group GR3, and is fixed in an optical axis direction when zooming from the wide angle end state to the telephoto end state. Furthermore, a filter FL is arranged between the fourth lens group GR4 and an image plane IP.

The lens data of a Ninth Numerical Example in which particular values are applied to the zoom lens 9 in accordance with the ninth embodiment are shown in Table 33.

TABLE 33

| Surface No. | Curvature Radius | Surface Separation | Refractive Index | Abbe No. |
|---|---|---|---|---|
| 1: | 31.35980 | 0.43591 | 1.84666 | 23.8 |
| 2: | 12.13234 | 2.66143 | 1.48749 | 70.4 |
| 3 | −45.24342 | 0.10257 | | |
| 4 | 11.27247 | 1.13543 | 1.83500 | 43.0 |
| 5 | 38.49961 | (D5) | | |
| 6 | 8.22658 | 0.35899 | 1.88300 | 40.8 |
| 7 | 2.63171 | 1.20040 | | |
| 8 | −3.60657 | 0.66669 | 1.77250 | 49.6 |
| 9 | 4.25284 | 0.97439 | 1.92286 | 20.9 |
| 10 | ∞ | (D10) | | |
| 11: | ∞ | 0.64577 | | |
| 12: | 2.24340 | 1.02568 | 1.52470 | 56.2 |
| 13: | 2.30557 | (D13) | | |
| 14: | 3.71259 | 0.23078 | 1.92286 | 20.9 |
| 15: | 2.29531 | 1.41533 | 1.69350 | 53.2 |
| 16: | −10.09571 | (D16) | | |
| 17: | ∞ | 0.31283 | 1.55232 | 63.4 |
| 18: | ∞ | 0.46155 | | |
| 19: | ∞ | 0.24103 | 1.55232 | 63.4 |
| 20: | ∞ | 0.20514 | | |
| 21: | ∞ | 0.25642 | 1.51680 | 64.2 |
| 22: | ∞ | (Bf) | | |

In the zoom lens 9, the object side (the twelfth surface) of the positive meniscus lens L7 in the third lens group GR3 and the image side surface (the sixteenth surface) of the combined lens in the fourth lens group GR4 are formed of aspheric surfaces. Then, the fourth order, sixth order, eighth order, and tenth order aspheric surface coefficients A, B, C, and D of the respective surfaces in the Ninth Numerical Example are shown in Table 34 with the cone constant κ.

TABLE 34

| 12th surface | κ = 0.000000 | A = −0.492573E−02 |
| --- | --- | --- |
| | B = −0.572856E−03 | C = −0.700730E−04 |
| | D = −0.384138E−04 | |
| 16th surface | κ = 0.000000 | A = 0.269574E−02 |
| | B = 0.994715E−04 | C = −0.213092E−03 |
| | D = 0.465939E−04 | |

In the zoom lens 9, the surface spacing D5 between the first lens group GR1 and the second lens group GR2, the surface spacing D10 between the second lens group GR2 and the third lens group GR3 (aperture diaphragm SP), the surface spacing D13 between the third lens group GR3 and the fourth lens group GR4, and the surface spacing D16 between the fourth lens group GR4 and the filter FL change when zooming from the wide angle end state to the telephoto end state. Then, respective values in the wide angle end state (f=1.000), the middle focal distance state (f=6.304), and the telephoto end state (f=39.735) of the respective surface spacing in the Ninth Numerical Example are shown in Table 35 together with the focal distances f, the F numbers FNO, and the angles of view 2ω.

TABLE 35

(Table of Variable Separations)

| f | 1.000 | 6.304 | 39.735 |
|---|---|---|---|
| FNO | 1.870 | 2.251 | 4.143 |
| 2ω | 63.815 | 11.023 | 2.182 |
| D5 | 0.513 | 8.594 | 12.318 |
| D10 | 12.575 | 4.494 | 0.769 |
| D13 | 3.426 | 1.873 | 5.045 |
| D16 | 3.061 | 4.614 | 1.441 |
| Bf | 0.410 | 0.410 | 0.410 |

Values of the Ninth Numerical Example corresponding to the conditional expressions (1) to (9) and a partial dispersion ratio θgFL1 of the first lens L1 in the first lens group GR1 are shown in Table 36.

TABLE 36

| (1) | f3/f4 = 4.944 |
| --- | --- |
| (2) | |f2/fw| = 2.283 |
| (3) | dz/fw = 11.805 |
| (4) | Lz/Lf = 1.981 |
| (5) | |β2w| = 0.193 |
| (6) | |f2/(fw · ft) 1/2| = 0.362 |
| (7) | H1′/f1 = −0.053 |
| (8) | νdL1 = 23.78 |
| (9) | θgFL2 = 0.5305, νdL2 = 70.44 |
| (10) | θgFL1 = 0.6191 |

Figure 35:
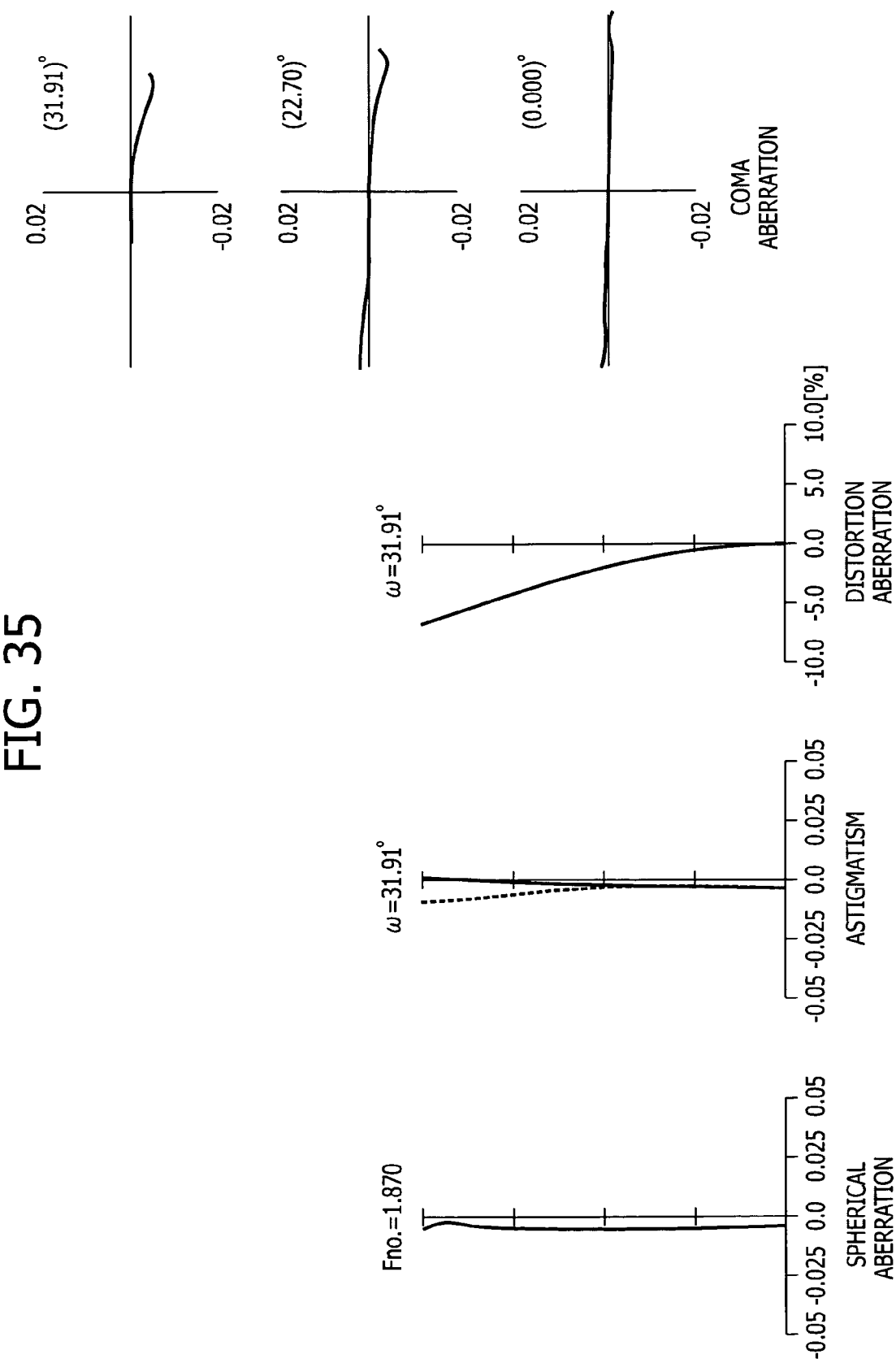
FIGS. 35 to 37 show aberration graphs of a Ninth Numerical Example in which particular values are applied to the ninth embodiment.
Figure 36:
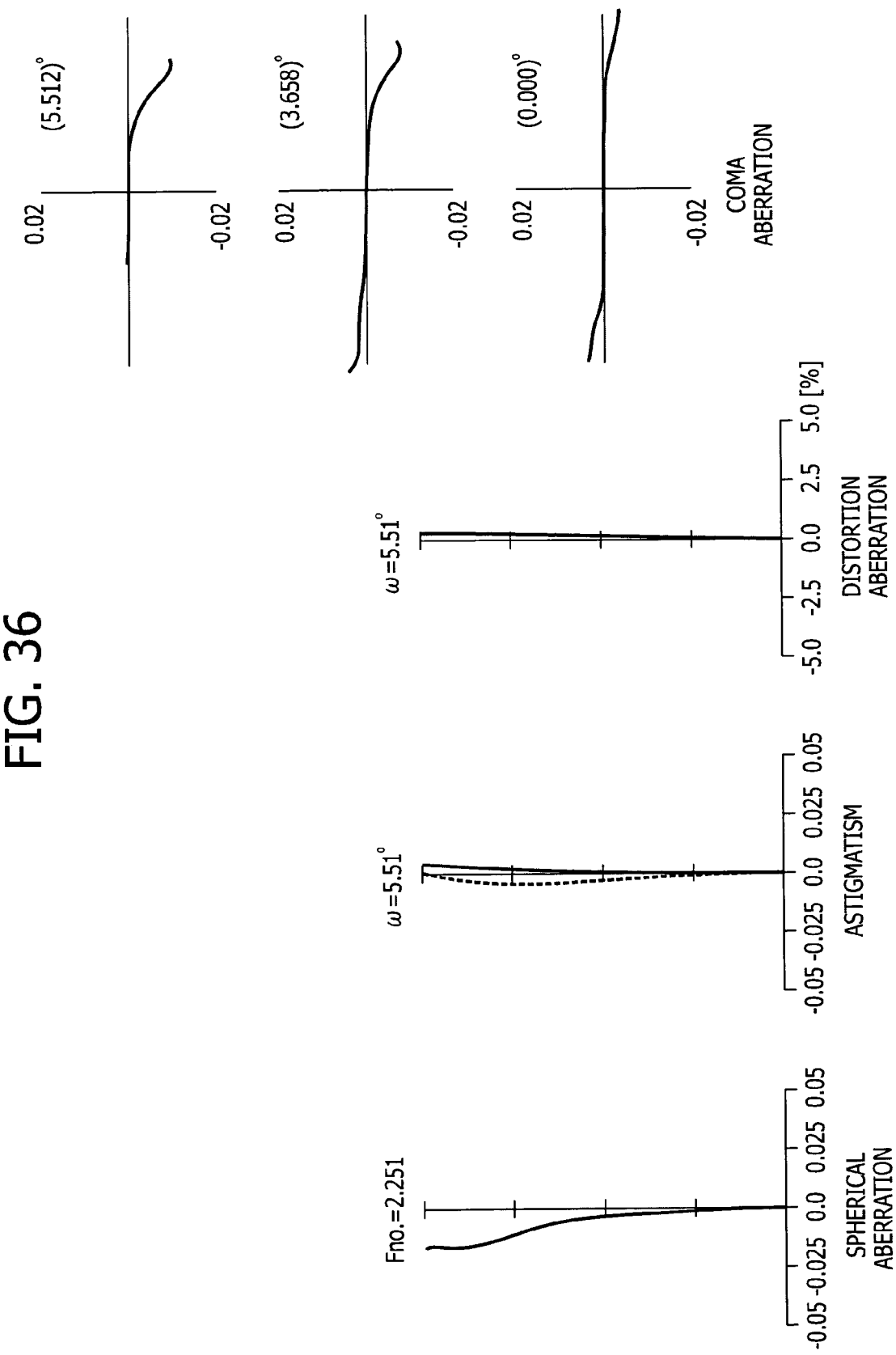
Figure 37:
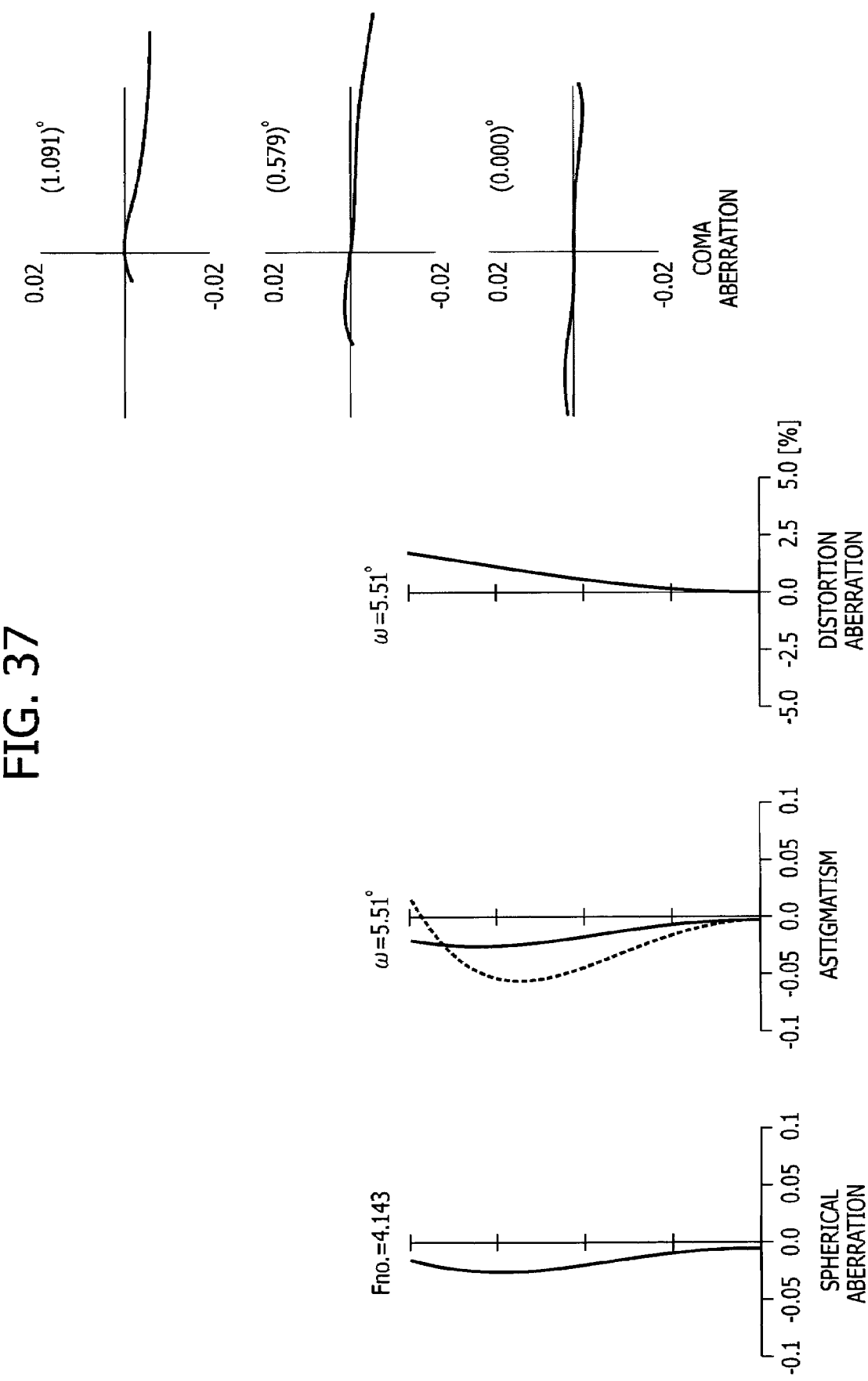

FIGS. 35 to 37 show respective aberration graphs in the infinity focusing state of the Ninth Numerical Example, in which FIG. 35 shows the respective aberration graphs in the wide angle end state (f=1.000), FIG. 36 shows in the middle focal distance state (f=6.304), and FIG. 37 shows in the telephoto end state (f=39.735).

In the respective aberration graphs of FIGS. 35 to 37, solid lines in the spherical aberration graphs show spherical aberrations, solid lines in the astigmatic graphs show sagittal image planes and broken lines show meridional image planes. In the coma aberration graphs, "A" shows the angle of field and "y" shows an image height, respectively.

It is clear from the respective aberration graphs that the Ninth Numerical Example allows the respective aberrations to be compensated well and has an excellent image forming performance.

It can be found from the above description that the zoom lens according to embodiments of the present invention provides the high zooming ratio of 30-50 times and has an excellent optical performance over the whole zooming range from the wide angle end to the telephoto end, and over the whole object distance from an infinity object to a very near object.

Next, an image capture apparatus according to embodiments of the present invention will be described.

The image capture apparatus according to an embodiment of the present invention has a zoom lens and an imaging device for converting an optical image formed by the zoom lens into an electric signal. The zoom lens includes, in order from the object side, a first lens group having a positive refractive power and fixed in an optical axis direction, a second lens group having a negative refractive power and moving along an optical axis to perform a zooming action, a third lens group having a positive refractive power and fixed in the optical axis direction, and a fourth lens group having a positive refractive power and moving nonlinearly along the optical axis to compensate for variations of an image formation position and compensate for variations of the image formation position caused by changes of an object distance.

The first lens group includes lenses which are combination of a first lens of a concave meniscus lens whose convex surface faces toward the object side and a second lens of a convex lens and a third lens of a convex meniscus lens whose convex surface faces toward the object side, in which the lenses are located in order from the object side. The second lens group includes lenses which are combination of a fourth lens of a concave meniscus lens whose convex surface faces toward the object side, a fifth lens of a biconcave lens, and a sixth lens of a convex lens, in which the lenses are located in order from the object side. The third lens group includes a seventh lens of a convex lens. The fourth lens group includes at least two or more cemented lenses. The third lens group and fourth lens group include at least one surface formed of an aspheric surface. The zoom lens satisfies each of the following conditional expressions (1), (2), (3), and (4).

$$1.9 < f3/f4 < 5.1 \quad (1)$$

$$1.5 < |f2/fw| < 2.5 \quad (2)$$

$$7.5 < dz/fw < 12.5 \quad (3)$$

$$1.3 < Lz/Lf < 2.2, \quad (4)$$

where f2: combined focal distance of second lens group,
f3: combined focal distance of third lens group,
f4: combined focal distance of fourth lens group,
dz: amount of movements of second lens group due to zooming action,
fw: focal distance of whole lens system in wide angle end state,
Lz: distance between surface closest to object side and surface closest to image plane side in second lens group in whole lens system at telephoto end, and
Lf: distance between surface closest to image plane side and image plane of whole lens system in third lens group.

Figure 39:
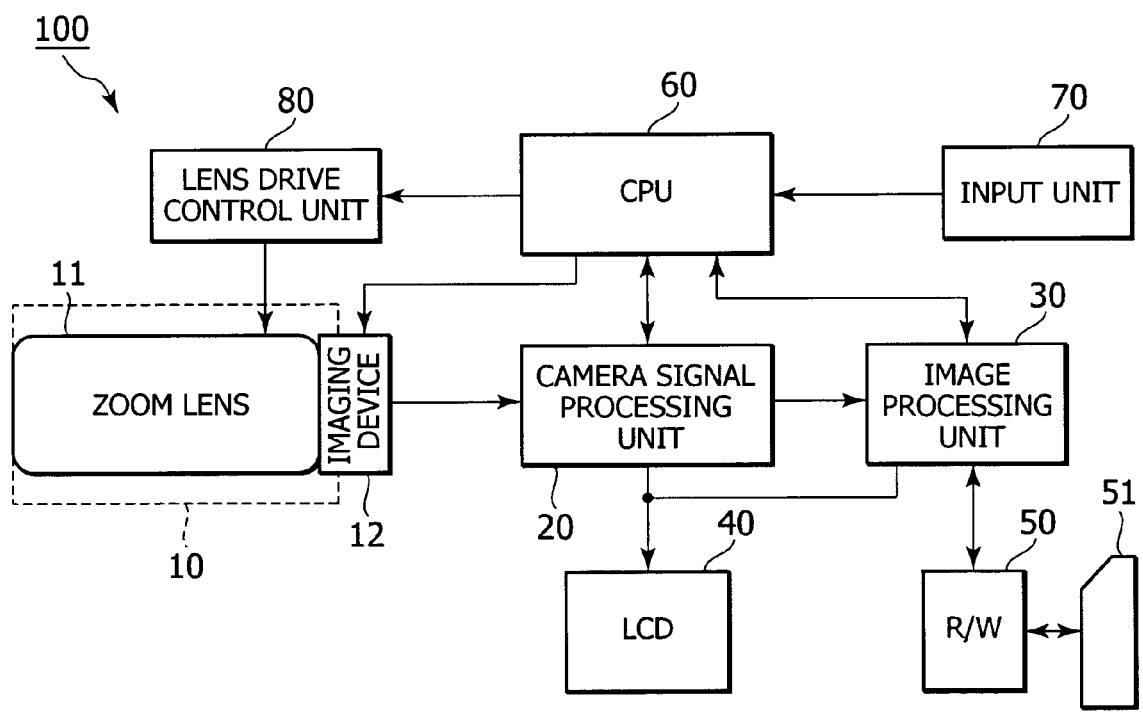
FIG. 39 is a circuit block diagram of an embodiment in which an image capture apparatus of the present invention is applied to a digital video camera.

FIG. 39 shows a block diagram of a digital video camera embodying the image capture apparatus according to an embodiment of the present invention.

A digital video camera 100 includes a lens block 10 which has an image capture function, a camera signal processing unit 20 which performs signal processing, such as analog-to-digital conversion of a captured image signal, an image processing unit 30 which performs a process of recording and reproducing an image signal, an Liquid Crystal Display (LCD) 40 which displays the captured image, Reader/Writer (R/W) 50 which performs writing/reading to/from a memory card 51, a Central Processing Unit (CPU) 60 which controls the whole apparatus, an input unit 70 for operating input by a user, and a lens drive control unit 80 which controls drive of a lens in the lens block 10.

The lens block 10 includes an optical system having a zoom lens 11 to which an embodiment of the present invention is applied, and an imaging device 12, such as CCD, etc. The camera signal processing unit 20 converts signal outputted from the imaging device 12 to a digital signal, and performs noise removal, compensation of image quality and conversion into a luminosity and color difference signal. The image processing unit 30 performs compression coding and decompression decoding processes for an image signal based on a predetermined image data format, a conversion process for data specifications, such as resolution, etc. It should be noted that the zoom lens 11 may employ the zoom lenses 1 to 9 in accordance with an embodiment of the present invention and each of the Numeral Examples 1 to 9, further employ another zoom lens of according to an embodiment of the present invention implemented by embodiments or Numerical Examples other than the above.

The memory card 51 includes a semiconductor memory which is detachable. The reader/writer 50 writes the image data coded by the image processing unit 30 into the memory card 51, and reads the image data recorded in the memory card 51. The CPU 60 is a control processing unit for controlling each circuit block in the digital video camera, and controls each circuit block in response to an instruction input signal from the input unit 70 etc.

The input unit 70 includes, for example, a record ON/OFF button for performing record ON/OFF operation, a mode selection switch for selecting a mode of operation, etc., and outputs to the CPU 60 the instruction input signal in response to operation by the user. The lens drive control unit 80 controls a motor etc. (not shown) for driving the lens in the zoom lens 11 in response to a control signal from the CPU 60.

Hereafter, operation of this digital video camera 100 will be described briefly.

In a standby state of image pick-up, under control of the CPU 60, the image signal captured at the lens block 10 is outputted to the LCD 40 through the camera signal processing unit 20, and is displayed as a camera through image. Further, when the instruction input signal for zooming from the input unit 70 is inputted, the CPU 60 outputs the control signal to the lens drive control unit 80, and a predetermined lens in the zoom lens 11 is moved under control of the lens drive control unit 80.

Further, if the record ON/OFF button (not shown) of the input unit 70 is turned on, the image signal captured at the lens block 10 is outputted from the camera signal processing unit 20 to the image processing unit 30 to be subjected to a compression coding processing, and thereafter, converted into digital data in a predetermined data format. The converted data are outputted to the reader/writer 50, and written into the memory card 51.

Further, when the image data recorded on the memory card 51 is reproduced, predetermined image data are read out of the memory card 51 by the reader/writer 50 in response to operation through the input unit 70 to be subjected to the decompression decoding process in the image processing unit 30, then a reproduction image signal is outputted to the LCD 40, whereby a reproduction image is displayed.

It should be noted that, in the above embodiment, the case is described where the image capture apparatus of the present invention is applied to the digital video camera. However, it may be applied to another image capture apparatus, such as a still camera.

Further, any one of shapes of the parts and values shown in each of the embodiments and the Numerical Examples shows only an example for implementing the present invention and the technical scope of the present invention should not be limitedly interpreted by these.

According to an embodiment of the present invention, the whole lens system is reduced in size, the higher zoom ratio is provided as compared with the related art technologies, and it allows the high optical performance in spite of the high zooming ratio.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2006-344505 filed in the Japanese Patent Office on Dec. 21, 2006, the entire content of which being incorporated herein by reference.

What is claimed is:

1. A zoom lens comprising:

in order from an object side, a first lens group having a positive refractive power and fixed in an optical axis direction;

a second lens group having a negative refractive power and moving along an optical axis to zoom;

a third lens group having a positive refractive power and fixed in the optical axis direction; and a fourth lens group having a positive refractive power and moving in a non straight line along the optical axis to compensate variations of an image formation position and compensate change of the image formation position caused by changes of an object distance, wherein;

the first lens group includes a cemented lens of a first lens of a concave meniscus lens whose convex surface faces towards the object side and a second lens of a convex lens, and a third lens of a convex meniscus lens whose convex surface faces towards the object side, the lenses being located in order from the object side;

the second lens group includes a fourth lens of a concave meniscus lens whose convex surface faces towards the object side, and a cemented lens of a fifth lens of a biconcave lens and a sixth lens of a convex lens, the lenses being located in order from the object side;

the third lens group includes a seventh lens of a convex lens;

the fourth lens group includes at least two or more cemented lenses;

the third lens group and fourth lens group include at least one surface formed of an aspheric surface; and the zoom lens satisfies following conditional expressions (1), (2), (3), and (4):

$$1.9 < f3/f4 < 5.1 \quad (1)$$

$$1.5 < |f2/fw| < 2.5 \quad (2)$$

$$7.5 < dz/fw < 12.5 \quad (3)$$

$$1.3 < Lz/Lf < 2.2, \quad (4)$$

where f2: combined focal distance of the second lens group, f3: combined focal distance of the third lens group, f4: combined focal distance of the fourth lens group, dz: amount of movements of the second lens group when zooming, fw: focal distance of whole lens system in wide angle end state, Lz: distance between a surface closest to the object side and a surface closest to the image plane side in the second lens group in whole lens system at telephoto end, and Lf: distance between a surface closest to the image plane side and the image plane of whole lens system in the third lens group, wherein:

a following conditional expression (5) is satisfied;

$$0.18 < |\beta 2w| < 0.21, \quad (5)$$

where $\beta 2w$ is image forming power ratio of the second lens group in wide angle end state.

2. A zoom lens comprising:

in order from an object side, a first lens group having a positive refractive power and fixed in an optical axis direction:

a second lens group having a negative refractive power and moving along an optical axis to zoom:

a third lens group having a positive refractive power and fixed in the optical axis direction: and a fourth lens group having a positive refractive power and moving in a non straight line along the optical axis to compensate variations of an image formation position and compensate change of the image formation position caused by changes of an object distance, wherein;

the first lens group includes a cemented lens of a first lens of a concave meniscus lens whose convex surface faces towards the object side and a second lens of a convex lens, and a third lens of a convex meniscus lens whose convex surface faces towards the object side, the lenses being located in order from the object side;

the second lens group includes a fourth lens of a concave meniscus lens whose convex surface faces towards the object side, and a cemented lens of a fifth lens of a biconcave lens and a sixth lens of a convex lens, the lenses being located in order from the object side;

the third lens group includes a seventh lens of a convex lens;

the fourth lens group includes at least two or more cemented lenses;

the third lens group and fourth lens group include at least one surface formed of an aspheric surface; and the zoom lens satisfies following conditional expressions (1), (2), (3), and (4):

$$1.9 < f3/f4 < 5.1 \quad (1)$$

$$1.5 < |f2/fw| < 2.5 \quad (2)$$

$$7.5 < dz/fw < 12.5 \quad (3)$$

$$1.3 < Lz/Lf < 2.2, \quad (4)$$

where f2: combined focal distance of the second lens group, f3: combined focal distance of the third lens group, f4: combined focal distance of the fourth lens group, dz: amount of movements of the second lens group when zooming, fw: focal distance of whole lens system in wide angle end state, Lz: distance between a surface closest to the object side and a surface closest to the image plane side in the second lens group in whole lens system at telephoto end, and Lf: distance between a surface closest to the image plane side and the image plane of whole lens system in the third lens group, wherein:

a following conditional expression (5) is satisfied;

$$0.28 < |f2/(fw \cdot ft)^{1/2}| < 0.39, \quad (5)$$

where ft is a focal distance in whole lens system in telephoto end state.

3. A zoom lens comprising:

in order from an object side, a first lens group having a positive refractive power and fixed in an optical axis direction;

a second lens group having a negative refractive power and moving along an optical axis to zoom:

a third lens group having a positive refractive power and fixed in the optical axis direction; and a fourth lens group having a positive refractive power and moving in a non straight line along the optical axis to compensate variations of an image formation position and compensate change of the image formation position caused by changes of an object distance, wherein:

the first lens group includes a cemented lens of a first lens of a concave meniscus lens whose convex surface faces towards the object side and a second lens of a convex lens, and a third lens of a convex meniscus lens whose convex surface faces towards the object side, the lenses being located in order from the object side;

the second lens group includes a fourth lens of a concave meniscus lens whose convex surface faces towards the object side, and a cemented lens of a fifth lens of a biconcave lens and a sixth lens of a convex lens, the lenses being located in order from the object side;

the third lens group includes a seventh lens of a convex lens;

the fourth lens group includes at least two or more cemented lenses, the third lens group and fourth lens group include at least one surface formed of an aspheric surface; and the zoom lens satisfies following conditional expressions (1), (2), (3), and (4):

$$1.9 < f3/f4 < 5.1 \quad (1)$$

$$1.5 < |f2/fw| < 2.5 \quad (2)$$

$$7.5 < dz/fw < 12.5 \quad (3)$$

$$1.3 < Lz/Lf < 2.2, \quad (4)$$

where f2: combined focal distance of the second lens group.
f3: combined focal distance of the third lens group.
f4: combined focal distance of the fourth lens group.
dz: amount of movements of the second lens group when zooming,
fw: focal distance of whole lens system in wide angle end state,
Lz: distance between a surface closest to the object side and a surface closest to the image plane side in the second lens group in whole lens system at telephoto end, and
Lf: distance between a surface closest to the image plane side and the image plane of whole lens system in the third lens group, wherein:

a following conditional expression (5) is satisfied;

$$-0.11 < H1'/f1 < -0.05, \quad (5)$$

where

H1' is interval between top of surface closest to image side in first lens group and main point on image side in first lens group ("−" indicates object side and "+" indicates image side), and f1 is combined focal distance of first lens group.

4. A zoom lens comprising:
in order from an object side,
a first lens group having a positive refractive power and fixed in an optical axis direction;
a second lens group having a negative refractive power and moving along an optical axis to zoom;
a third lens group having a positive refractive power and fixed in the optical axis direction; and
a fourth lens group having a positive refractive power and moving in a non straight line along the optical axis to compensate variations of an image formation position and compensate change of the image formation position caused by changes of an object distance, wherein;

the first lens group includes a cemented lens of a first lens of a concave meniscus lens whose convex surface faces towards the object side and a second lens of a convex lens, and a third lens of a convex meniscus lens whose convex surface faces towards the object side, the lenses being located in order from the object side;

the second lens group includes a fourth lens of a concave meniscus lens whose convex surface faces towards the object side, and a cemented lens of a fifth lens of a biconcave lens and a sixth lens of a convex lens, the lenses being located in order from the object side;

the third lens group includes a seventh lens of a convex lens;

the fourth lens group includes at least two or more cemented lenses;

the third lens group and fourth lens group include at least one surface formed of an aspheric surface; and the zoom lens satisfies following conditional expressions (1), (2), (3), and (4):

$$1.9 < f3/f4 < 5.1 \quad (1)$$

$$1.5 < |f2/fw| < 2.5 \quad (2)$$

$$7.5 < dz/fw < 12.5 \quad (3)$$

$$1.3 < Lz/Lf < 2.2, \quad (4)$$

where f2: combined focal distance of the second lens group,
f3: combined focal distance of the third lens group,
f4: combined focal distance of the fourth lens group,
dz: amount of movements of the second lens group when zooming,
fw: focal distance of whole lens system in wide angle end state,
Lz: distance between a surface closest to the object side and a surface closest to the image plane side in the second lens group in whole lens system at telephoto end, and
Lf: distance between a surface closest to the image plane side and the image plane of whole lens system in the third lens group, wherein:

following conditional expression (5) and (6) are satisfied;

$$vdL1 < 24 \quad (5)$$

$$\theta gFL2 > -0.0019 vdL2 + 0.6643, \quad (6)$$

where vdL1: Abbe number at d-line of first lens in the first lens group
vdL2: Abbe number at d-line of second lens in the first lens group
θFL2: partial dispersion ratio of the second lens in the first lens group (partial dispersion ratio θgF is taken as θgF=(Ng-NF)/(NF-NC) when refractive indices at C-line, F-line, and g-line are respectively NC, NF, and Ng).

* * * * *